US008540392B2

(12) United States Patent
Townsend, Jr.

(10) Patent No.: US 8,540,392 B2
(45) Date of Patent: Sep. 24, 2013

(54) DEVICES AND SYSTEMS FOR IMPROVED TRAFFIC CONTROL SIGNAL ASSEMBLY

(75) Inventor: Robert E. Townsend, Jr., West Palm Beach, FL (US)

(73) Assignee: Robert E. Townsend, Jr., West Palm Beach, FL (US)

( * ) Notice: Subject to any disclaimer, the term of this patent is extended or adjusted under 35 U.S.C. 154(b) by 0 days.

(21) Appl. No.: 13/554,475

(22) Filed: Jul. 20, 2012

(65) Prior Publication Data

US 2013/0095710 A1 Apr. 18, 2013

Related U.S. Application Data

(60) Provisional application No. 61/627,739, filed on Oct. 16, 2011, provisional application No. 61/628,103, filed on Oct. 23, 2011, provisional application No. 61/628,439, filed on Oct. 30, 2011, provisional application No. 61/628,440, filed on Oct. 30, 2011, provisional application No. 61/628,827, filed on Nov. 7, 2011, provisional application No. 61/629,744, filed on Nov. 26, 2011, provisional application No. 61/631,555, filed on Jan. 6, 2012, provisional application No. 61/632,177, filed on Jan. 19, 2012, provisional application No. 61/685,862, filed on Mar. 26, 2012, provisional application No. 61/689,082, filed on May 29, 2012, provisional application No. 61/690,861, filed on Jul. 6, 2012.

(51) Int. Cl.

| | |
|---|---|
| ***B60Q 1/26*** | (2006.01) |
| ***G08G 1/095*** | (2006.01) |
| ***H01R 13/60*** | (2006.01) |
| ***H01R 13/66*** | (2006.01) |

(52) U.S. Cl.
USPC ........... 362/227; 439/529; 439/530; 439/296; 340/907

(58) Field of Classification Search
USPC ............... 362/227, 311.09, 311.14, 382–456; 439/529, 530, 296–373, 527; 340/907–932.1; 174/61, 40 R; 248/342; 361/641, 825; 446/117
See application file for complete search history.

(56) References Cited

U.S. PATENT DOCUMENTS

| | | | |
|---|---|---|---|
| 2,553,906 | A | 5/1951 | Ferguson |
| 2,717,376 | A | 9/1955 | Carpenter et al. |

(Continued)

OTHER PUBLICATIONS

"New Ideas: Not-So-Good Vibrations" *Ignition*, Fall/Winter 2011, Issue 18, p. 6.

(Continued)

*Primary Examiner* — Diane Lee
*Assistant Examiner* — Danielle Allen
(74) *Attorney, Agent, or Firm* — Saliwanchik, Lloyd & Eisenschenk

(57) ABSTRACT

Methods and apparatuses are provided for improved traffic control devices including a continuous central hanger support system that is integral to the traffic control device and provides a central load path. In an embodiment of the invention, the terminal housing and traffic signal housing of the traffic control device can be included in a single unit housing. A single unit housing can also include an integral backplate. Also provided are span wire clamps, tether clamps, and mast arm clamps that can be used to affix the continuous central hanger of the traffic control device to various fixtures such as a single span wire, two span wires, a pole or a mast arm. The continuous central hanger integrated with the single unit housing can provide the traffic control device with improved securement of electrical components and structural stability for survivability during high wind events as compared to conventional traffic signal devices.

30 Claims, 51 Drawing Sheets

(56) References Cited

U.S. PATENT DOCUMENTS

| | | | | |
|---|---|---|---|---|
| 2,925,458 | A * | 2/1960 | Lester | 174/61 |
| 3,424,509 | A | 1/1969 | Siklos | |
| 3,571,791 | A | 3/1971 | Parduhn | |
| 2,891,175 | A | 6/1975 | Hawley et al. | |
| 3,916,265 | A * | 10/1975 | Friedman | 361/641 |
| 3,917,205 | A | 11/1975 | Meadors | |
| 3,989,217 | A * | 11/1976 | Friedman | 248/327 |
| 3,999,160 | A | 12/1976 | McDonnell | |
| 4,117,456 | A | 9/1978 | Albrecht | |
| 4,646,997 | A | 3/1987 | Fadley | |
| 7,258,314 | B1 * | 8/2007 | Parduhn et al. | 248/214 |
| 7,671,760 | B2 | 3/2010 | Vallejo, Sr. | |
| 8,018,350 | B2 | 9/2011 | Townsend, Jr. | |
| 2005/0094407 | A1 | 5/2005 | Heald et al. | |
| 2007/0278376 | A1 | 12/2007 | Townsend | |
| 2008/0158354 | A1 * | 7/2008 | Hutchison | 348/143 |
| 2009/0316419 | A1 | 12/2009 | Godfrey et al. | |
| 2011/0193277 | A1 | 8/2011 | Christenson | |
| 2012/0069561 | A1 | 3/2012 | Burton et al. | |

OTHER PUBLICATIONS

"Benefits: Save Money, Increase Safety, and Protect Your Infrastructure" *Vibration Mitigation Technologies*.
"Product Line" *Vibration Mitigation Technologies*.
International Search Report in International Application No. PCT/US2012/060408, filed Oct. 16, 2012.

* cited by examiner

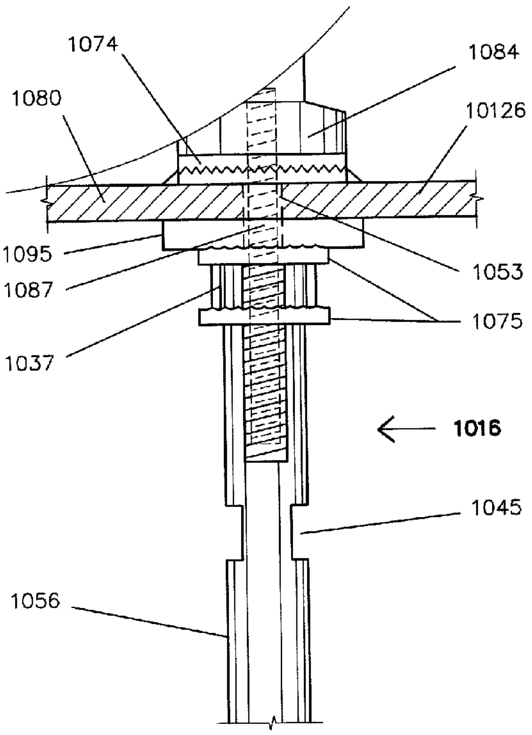
FIGURE 53
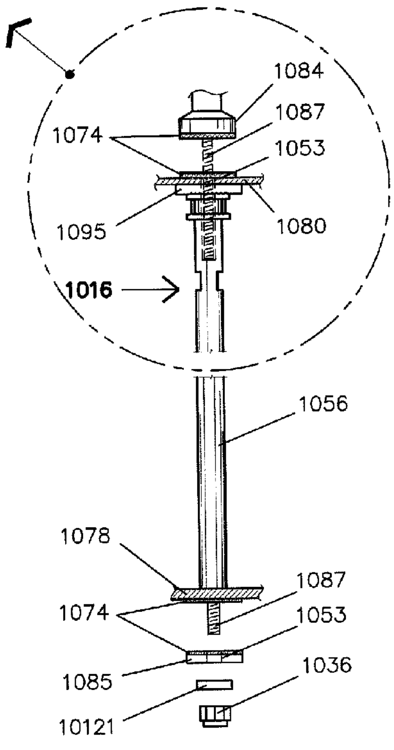
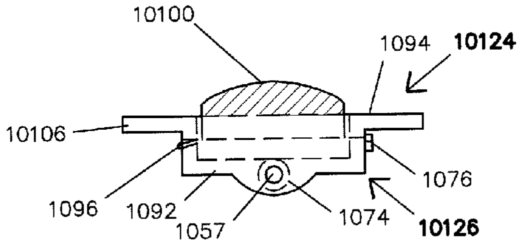
FIGURE 51
FIGURE 52

FIGURE 58
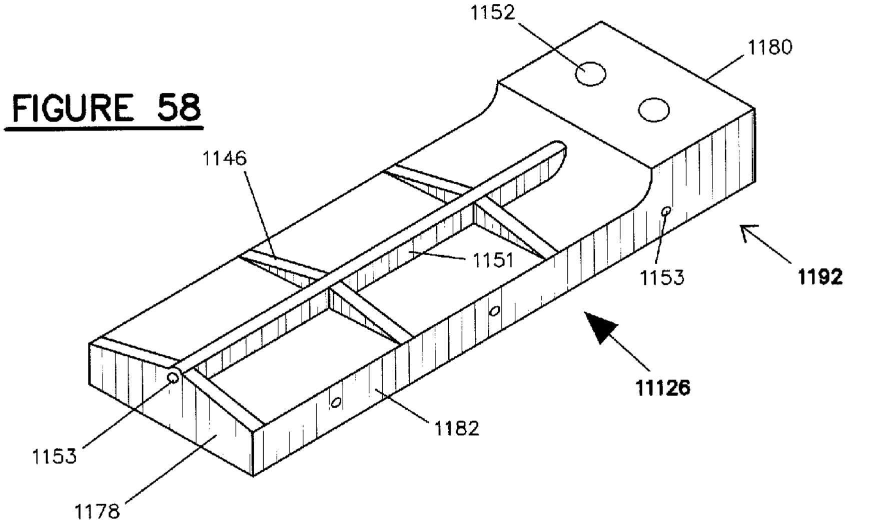
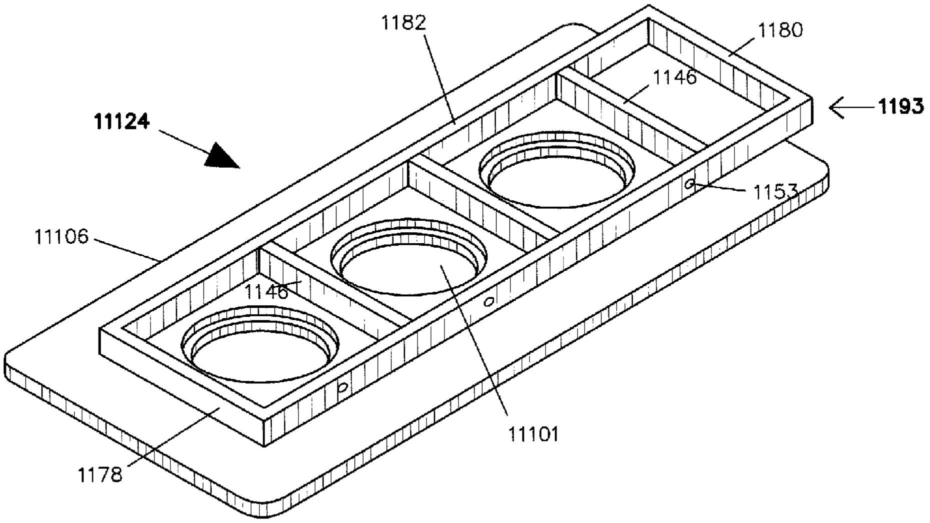
FIGURE 57

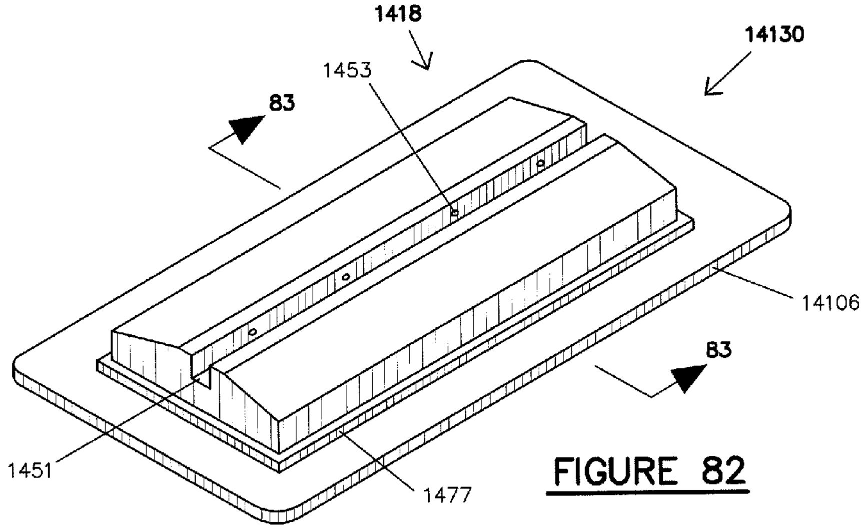
FIGURE 82
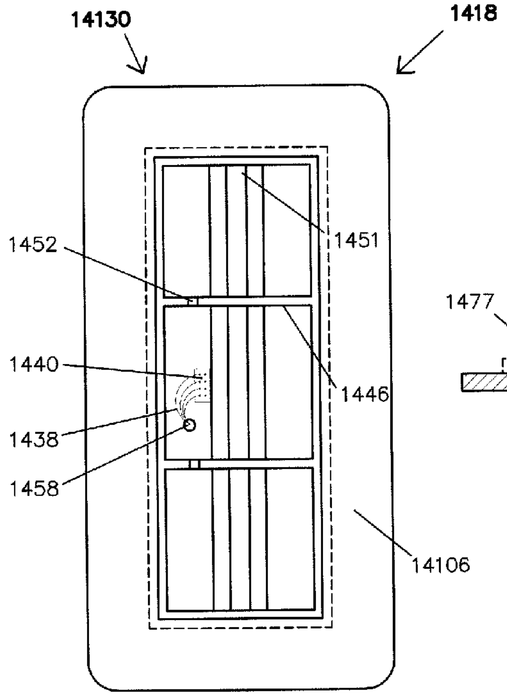
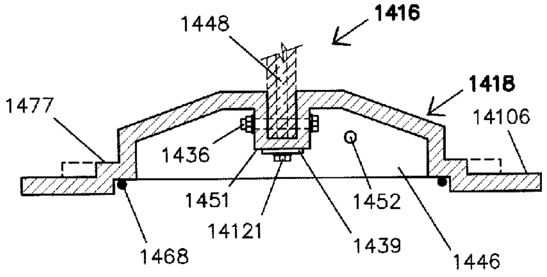
FIGURE 83
FIGURE 84

FIGURE 113
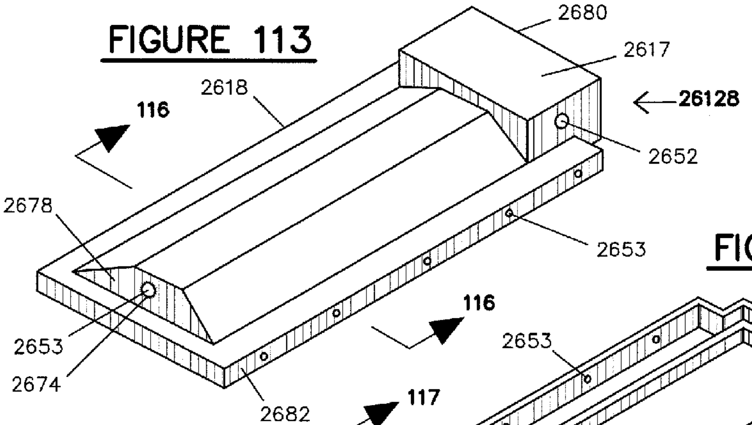
FIGURE 114
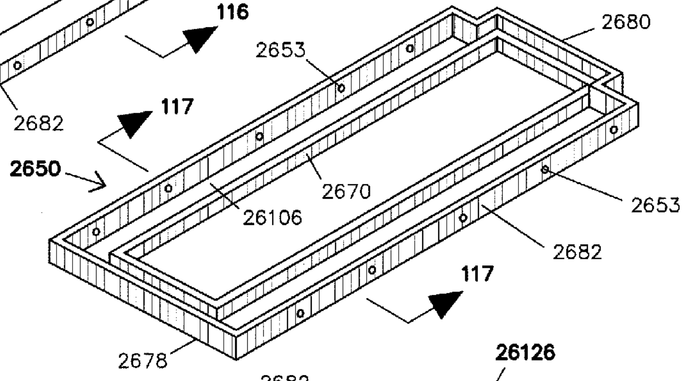
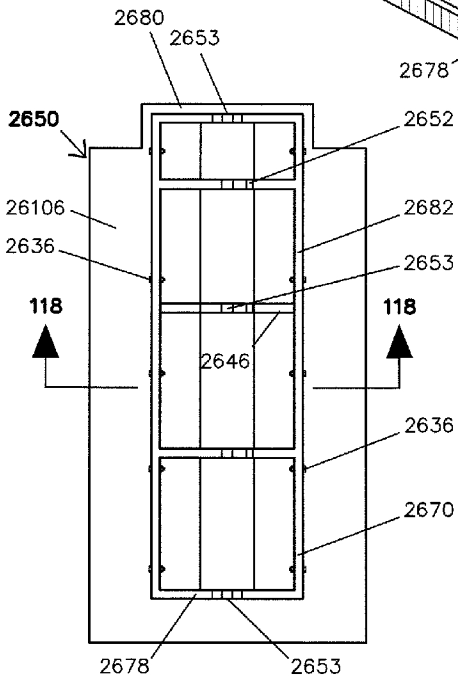
FIGURE 115
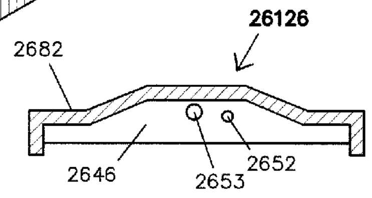
FIGURE 116
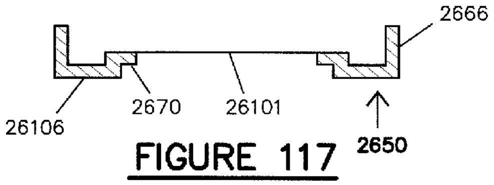
FIGURE 117
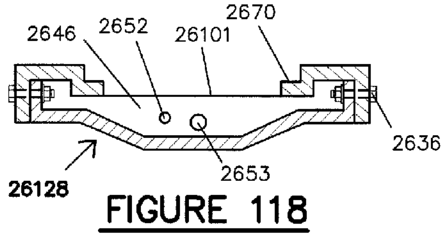
FIGURE 118

DEVICES AND SYSTEMS FOR IMPROVED TRAFFIC CONTROL SIGNAL ASSEMBLY

CROSS-REFERENCE TO RELATED APPLICATIONS

This application claims the benefit under 35 U.S.C. §119 of U.S. Patent Application Nos. 61/627,739, filed Oct. 16, 2011; 61/628,103, filed Oct. 23, 2011; 61/628,439, filed Oct. 30, 2011; 61/628,440, filed Oct. 30, 2011; 61/628,827, filed Nov. 7, 2011; 61/629,744, filed Nov. 26, 2011; 61/631,555, filed Jan. 6, 2012; 61/632,177, filed Jan. 19, 2012, and 61/685,862, filed Mar. 26, 2012, all of which are hereby incorporated by reference in their entirety.

BACKGROUND

During the early development of the traffic signal housing, the major focus was the operational aspect, primarily a securement of lighting displays and a housing for electrical connections. The basic manufacturing and construction, materials, and specifically the structural and mechanical functions of traffic signals, have not been significantly changed or improved upon in approximately 65 years.

There are three basic structures that are commonly used to hold a traffic control signal located over or adjacent to a roadway travel lane and those structures include poles, steel mast arms, and load bearing cables strung between poles; the last being commonly referred to as span wire support systems. The three basic elements of a traffic control signal are one or more indicators (usually bulbs or LED modules); housings to secure the indicators (housings and indicators together are "signal heads" or a "signal face"); and the hardware used to hang the traffic control signals such as hangers, disconnect boxes, and cable attachment hardware.

Traffic signal hangers and housings have a known history of structural failures during hurricanes which sometimes result in injury and even fatalities due to uncontrolled roadway intersections. Traffic control signals, when designed as individual components, are very susceptible to damage from hurricane force winds, and multiple points of failure can occur in more than one specific component.

Prior art devices suffer from flawed design in which the housing of the electronics, known as the "disconnect box" and/or "disconnect hanger," itself is used to support traffic signals by multiple linear load paths around the periphery of the disconnect box, rendering it susceptible to structural failures, especially at the disconnect box's cantilevered shelf areas during high wind events. In some instances, this disconnect box load path results in as much as 10-11 inches or more of horizontal load displacements through and around the periphery of the disconnect box, wherein the vertical loading of the traffic signal is transferred horizontally across the top of the disconnect box, then turns downward at each side of the disconnect box, then back along the bottom floor to an interrupted horizontal plane. An invention that eliminates many of the prior art deficiencies by changing the disconnect box's purpose from including structural loading of traffic signals to merely just the purpose of providing a weather proof housing for electrical components would be a significant improvement.

BRIEF SUMMARY

The subject invention results from a novel approach to avoiding structural failure of traffic control signals utilizing a continuous load path hanger. The continuous load path hanger of the subject invention provides an uninterrupted load path that is distinctly separate from the housing of the electronics. In some embodiments the continuous load path hanger has a direct central load path. In other embodiments, the continuous load path hanger has a circuitous continuous peripheral load path. Methods and apparatuses are also provided for an improved traffic control signal comprising a continuous load hanger support system that is integral to the traffic control signal. In an embodiment of the invention, the housing of the electronics and indicator housing of the traffic control signal can be included in a single unit housing, obviating the need for a traditional-type disconnect box. In another embodiment of the invention, the single unit housing can include a backplate.

The continuous load path hanger integrated with the single unit housing can provide the traffic control signal with increased structural stability (for survivability), storage capacity, and securement of electrical components. Integrating the traffic signal housing, disconnect box and backplate into a single unit housing can enable use of a wider range of materials during fabrication and more efficient means of manufacture. For example, the single unit housing can be made of materials that include, but are not limited to, aluminum, composite fiberglass, thermoplastics, and carbon fiber.

The traffic control signal includes a support system to allow storing and securing the electrical components of the traffic control device. The traffic signal housing can provide a means for securing the indicators (lighting displays or modules) and keeping electrical connectors dry and easily accessible by removing terminal hanger and signal heads from the structural load path of the system.

In another embodiment of the invention, the traffic signal housing and disconnect box can be provided as two separate housings that are integrally connected to a continuous load path hanger support system.

Methods are provided to assemble and install the traffic control device. Although the subject invention is primarily directed to improving span wire signalization, the traffic control signal can be installed on a single span wire, two span wires, a pole, or a mast arm. A span wire clamp can attach directly to a single span wire, or in the event of a two span wire system, directly to the upper and lower span wires. A novel tether clamp is provided that sometimes can be used to attach directly to the continuous load path hanger. The newly designed tether clamp assembly provides an improved means of attaching the continuous load path hanger to a lower span wire. A mast arm clamp can be provided to attach the traffic control signal to a mast arm. The mast arm can be positioned vertically, horizontally, or at any angle in between.

The continuous load path hanger support system can be used to hang the traffic control signal horizontally in both dual span wire and single span wire applications. Two span wire clamps, connection devices, and hanger extensions can be used to hang the traffic control device by attaching the hanger extensions to the continuous load path hanger extending out of the top and bottom ends of the traffic control device.

In an embodiment, the traffic control signal, while being hung vertically, can be integrally attached to a rectangular continuous peripheral load path hanger that is connected to an existing span wire in one location by one span wire claim or sometimes in two locations by two span wire clamps.

The continuous load path hanger support system can also be applied to other types of signal devices that are installed on span wires, poles, and mast arms including, but not limited to, railroad signals, pedestrian walking control signals, caution signals, toll booth signals, highway alert displays, air traffic control signals, tidal signals, and drawbridge signals.

BRIEF DESCRIPTION OF THE DRAWINGS

FIG. 51 shows a cross sectional view of the traffic control device taken along cross sectional plane 51 of FIG. 49.

FIG. 52 shows a vertical view of the continuous hanger according to an embodiment of the invention.

FIG. 53 shows an enlarged view of a portion of the continuous hanger of FIG. 52.

FIG. 57 shows an isometric view of the single door with integral backplate according to an embodiment of the invention.

FIG. 58 shows an isometric view of the single unit signal and terminal housing.

FIG. 82 shows an isometric rear view of the single unit signal housing, backplate and hanger support channel.

FIG. 83 shows a cross sectional view taken along cross sectional plane 83 in FIG. 82.

FIG. 84 shows a front view of the signal housing with the door removed.

FIG. 112 shows a front view of an embodiment of the invention utilizing the span wire clamp to support the traffic signal, and a second tether wire attached below the traffic signal.

FIG. 113 shows an isometric view of an embodiment of a rear portion of the single unit signal and terminal housing with integral backplate.

FIG. 114 shows an isometric view depicting the front cover portion.

FIG. 115 shows a front elevation of the housing without the door.

FIG. 116 shows a cross sectional view taken along cross sectional plane 116 of FIG. 113.

FIG. 117 shows a cross sectional view taken along cross sectional plane 117 of FIG. 114.

FIG. 118 shows a cross sectional view taken along cross sectional plane 118 of FIG. 115.

FIG. 119 shows an isometric view of an embodiment of the single unit signal and terminal housing with integral backplate.

FIG. 120 shows an isometric view depicting an embodiment of the continuous central path hanger.

FIG. 121 shows a side sectional view of taken along cross sectional plane 121 of FIG. 119.

FIG. 122 shows a front elevation of the housing without the door.

FIG. 123 shows a front view of an embodiment of the invention.

Figure 124:
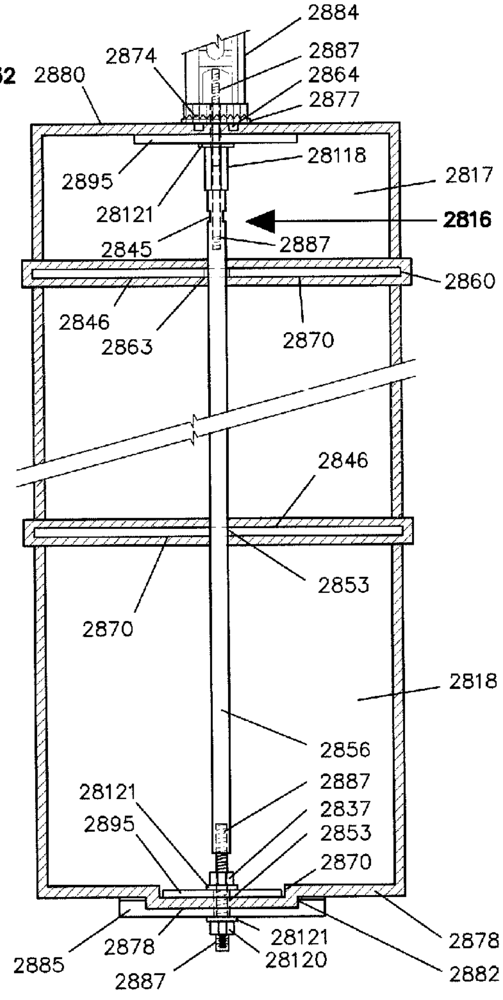

FIG. 124 shows a view of an embodiment of the continuous central path hanger similar to that of FIG. 52 that is a continuous rod installed.

Figure 125:
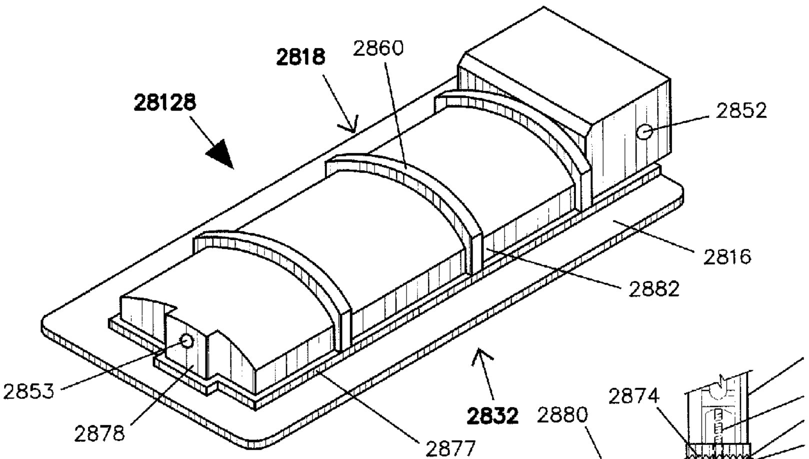

FIG. 125 shows an isometric view of an embodiment of the single unit signal and terminal housing with integral backplate.

DETAILED DESCRIPTION

An apparatus is disclosed herein for an integrated traffic control device comprising a traffic signal housing that is adaptable to a traffic signal support system and that exhibits structural improvement over traditional traffic control signals. The subject invention utilizes a traffic signal support apparatus for a traffic control signal, wherein the traffic control signal has a housing containing electrical connections and has at least one traffic signal indicator electrically connected thereto, and wherein the traffic control signal is held from a mounting structure such as a pole, a mast arm, or a span wire, said traffic signal support apparatus comprising: a continuous load path hanger; mounting structure connection hardware that connects said continuous load path hanger to a span wire, a pole, or a mast arm; and signal connection hardware that fixedly connects said continuous load path hanger to the traffic signal; wherein said continuous load path hanger is not the span wire, the pole, the mast arm, or the housing containing electrical connections (such as a disconnect box); and wherein said continuous load path hanger in operation conveys the load of at least most of the stresses of the traffic signal past the housing containing the electrical connections and to the span wire, pole, or mast arm. In traditional traffic signals the gravitational and wind-loaded stresses of the signal travel a path from the signal housing to the disconnect box and ultimately to the span wire, pole, or mast arm. As such, this is an "interrupted" load path, the stresses passing through a load path that is interrupted by a housing—usually the housing of the disconnect box. In contrast, in the "continuous" load path of the subject invention, the stresses travel a load path to and through a hanger that is not interrupted by a housing such as a disconnect box. The traffic signal support system can be a continuous central load path support system integral to a single unit housing. Alternatively, the traffic signal support system can be a continuous peripheral load path system. In certain embodiments of the invention, the single unit housing is adaptable to the hanger and integrates the electrical terminal housing (replaces the disconnect box), traffic signal housing, and backplate into the single unit housing. The subject traffic control signal provides electrical component housings that maximize the use of a continuous load path type support hanger, to equally distribute loading and associated stresses resulting from wind dynamic loads and gravitational wind-induced impact forces. Wind dynamics can include, for example, vortex sheddings or galloping, shock loads, or self excitations.

The continuous load path hanger support system can increase the durability and survivability of traffic signals during high wind events such as hurricanes. The continuous load path design can be used for vertical mounting of traffic control devices or it can also be used for horizontal mounting of traffic control devices. According to the subject invention, a continuous load path hanger removes most of the gravitational stresses of the traffic signal(s) from the terminal housing. Preferably at least 75% of the gravitational stresses, more preferably at least 90% of the gravitational stresses, and most preferably substantially all of the gravitational stresses are removed from the disconnect box or single unit housing. The continuous load path hanger can be provided in various embodiments, including as a continuous central load path hanger or a continuous peripheral load path hanger. Embodiments of a continuous central load path hanger include hangers that are substantially one piece rods (either solid or hollow) or one piece cable; optionally, the rods or cables may be provided in multi-piece format that can optionally be sequentially connected. A continuous peripheral load path hanger can occur in various embodiments, including substantially rectangular-shaped peripheral load path hangers, elongate ovoid-shaped hangers, or various other shapes. The continuous load path hangers may be attached to signalization mounting structures such as a pole, mast arm, or a span wire via one or more hanger extensions used sequentially or in parallel, as appropriate.

The terms "disconnect box" or "terminal housing", as used herein, are specific to the main electrical component housing and wiring connections. The term "removable", as used herein, is specific to, in some embodiments, the hanger connection of the traffic signal. The traffic control device can adapt to many different traffic control signal configurations including, but not limited to, 1-, 2-, 3-, 4-, and 5-section signal head assemblies, and in some instances multi-type signal assemblies commonly utilized on diagonal span type intersections. In embodiments of the invention, housings to secure the lighting displays or other indicators and the hardware used to suspend the traffic signals such as hangers, hanger extensions, the disconnect box, and cable attachment hardware can be encompassed within the term "traffic control signal."

The terms "beneath," "below," "on," and "above" are all used to describe location of parts relative to one another and encompass, but are not necessarily limited to, parts that are directly next to each other in such relation. The parts so described might also be remote in such relation, having other parts positioned in between.

In an embodiment of the present invention, the signal housing is constructed of a single case adaptable to any combination of signal indicators such as a single light module commonly used as a "flasher" or the commonly-used three light indicators—red, yellow, and green. The single housing can even include four or five lighting displays as a single housing. According to the subject invention, one single housing can be used in lieu of multiple conventional housings stacked and fastened together to direct automobiles in a safe and efficient manner.

In some embodiments, the housing is expanded to include the electrical components previously housed in separate housings, with all electrical components accessible from a single panel type door that secures the lighting modules and performs also as a backplate. The improved housing can increase the accessibility of and provide better access to the electrical components inside and eliminate the need for terminal housings.

In some embodiments, the traffic control signal is adaptable to support systems for signalization, other than wire spans, such as the support attachment for traffic signal housings secured to a steel mast arm structure or a pole.

In certain embodiments, the traffic control device can include "backplates" integral or non-integral to the electrical housings. The backplates would be "integral" in the manufacturing process of vacuum forming, or other like processes, such as ultrasonic welding, solvent welding glues, and injection mold processes. The integration of backplate into the single housing unit enables much lower manufacturing and installation cost, in some cases over 75% reduction in cost can be appreciated.

Surprisingly, linear structural requirements can be minimized or eliminated by the creation of a continuous central or peripheral load path. The increased accessibility to the electrical components inside the improved housings is another unexpected benefit of the traffic control device.

The use of cost effective material in the traffic signal housing fabrication process, such as injection molding and/or thermoforming using thermoplastics and thermosetting plastics, has enabled an improved efficiency of manufacturing. Approximate increase of service life to 15-16 years for plastic signal heads due to the new ability to use improved U.V. resistance materials is now possible due to novel hanger design utilizing continuous load path technology. In addition, the dependence of prior art disconnect boxes on cast metal versus the thermoplastic that can now be used in the electrical housing's fabrication as a result of the continuous load path hanger has created reduction of potentially harmful electrical mis-grounding and shorts. Further, the electrical housing of the subject invention has an improved weather-proofing, resulting in safer, more consistently controlled intersections than with traditional disconnect box and signal housings.

In some embodiments, the material for the subject traffic signal assembly's continuous load path hanger and, in some cases, the disconnect box or terminal housing, can include, but is not limited to, cast aluminum. In an embodiment, a cast aluminum terminal housing with an integral central flange and hub device can support traffic signals over roadways. Extruded type aluminums, stainless steel rods, piping or forged metals, formed and/or metal injection may also be utilized. Fasteners, studs, and other objects used to secure one or more items can be made of stainless steel. In some embodiments, the material for the housings can be from the thermoplastic family such as, but not limited to, thermoplastic and thermoset plastic composites sometimes comprising acrylonitril butadiene styrene (ABS), polypropylene (P.P.), polyethylene (P.E.), polyamide (P.A.) or other polymers, and other like UV protected products such as poly vinyl chloride (PVC) and polycarbonates (PC) or nylons.

Other materials can also be appropriate for the traffic signal and terminal housings and include, but are not limited to the following: extruded or formed metals such as aluminum; pultruded fiberglass; composite fiberglass; additionally reinforced thermoplastic composites (RTC) such as, but not limited to, engineered polyetherimide (PEI), polyphenylene sulfides (PPS), polyetheretherketone (PEEK), and polyetherketoneketone (PEKK). In some instances carbon fiber or other like products can also be used not only for the housing, but also in the manufacturing of the hanger system itself. In some embodiments, a combination of the above materials can each be used to provide maximum benefits to the end user.

The subject invention's hanger and housing system provides additional benefits in that the the installation and subsequent use housing system, such as standard maintenance or directional adjustment, can be easier, more cost effective, and safer due to the decreased risk of possible electrocution from accidental energizing of metal housings resulting from use of non-metal materials.

The shape of the traffic signal or terminal housings can be, but is not limited to, rectangular, curved, spherical, cylindrical, octagonal, pentagonal, hexagonal, or tubular.

EXAMPLE 1

Figure 1:
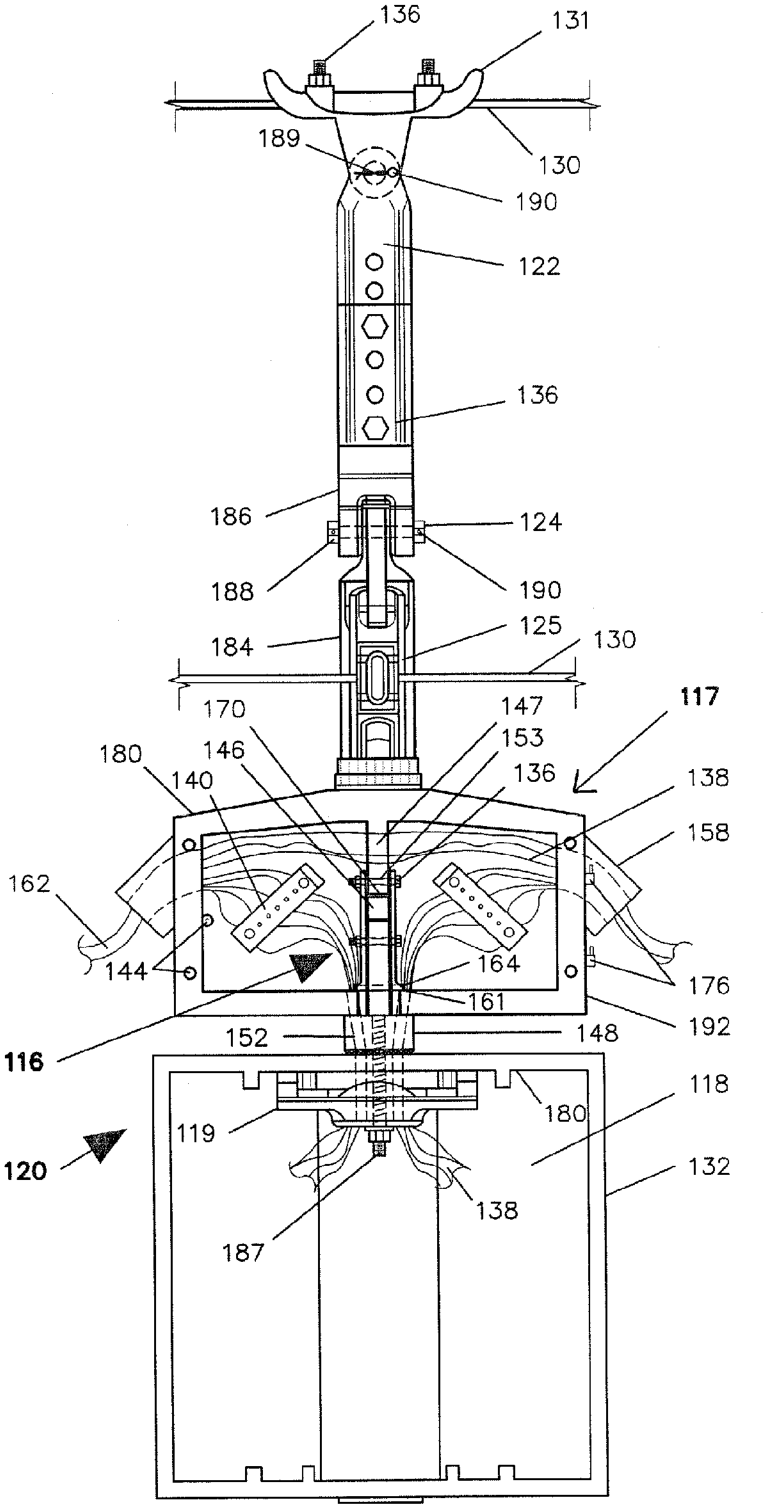
FIG. 1 shows an interior frontal view of the traffic control device with the housing and traffic signal doors removed according to an embodiment of the invention.

Referring now to the drawings, according to a first embodiment of the invention (FIG. 1-FIG. 7), FIG. 1 illustrates an interior frontal view of a traffic control signal with the door removed for clarity. The traffic control device 120 comprises a span wire saddle clamp 131 connected to the existing span wire 130 and an existing hanger 122 with clevis pin 189. In another embodiment of the invention, the structural extension can be connected to the upper connection device 186 that is pivotally connected with pivotal connection 124. The pivot pin 188 pivots about an axis parallel to the above and below existing span wires 130. In one embodiment, multiple pivots with multiple planes can be achieved provided vertical movement is restricted.

Although the traffic control device can accept common single and dual span (upper and lower) wire hangers such as a "tether cable", rigid flat aluminum, and even pipe hangers, in an embodiment of the invention, the hanger is the pivotal assembly shown and described in U.S. Pat. No. 8,018,350 (Townsend), which is incorporated herein by reference. The signal reinforcement 119 is also described in the '350 patent.

The previous mentioned pivot and clevis pins (188, 189) are held from lateral movement by the cotter pin 190. The hanger 122 or an extension (not shown) can be connected to the upper connection device 186 with suitable fasteners 136. The upper device 186 can be pivotally connected to the lower connection device 184, and the connection device 184 can be attached to the lower span wire 130 by tether clamp assembly 125. In a certain embodiment, the lower connection device 184 can be mechanically attached to the terminal housing 117 utilizing integral flange and continuous hanger 116, which in this embodiment comprises integral support flange 147 and removable hub 148. In another embodiment, the lower device 184 can be cast integral with housing 117.

Figure 2:
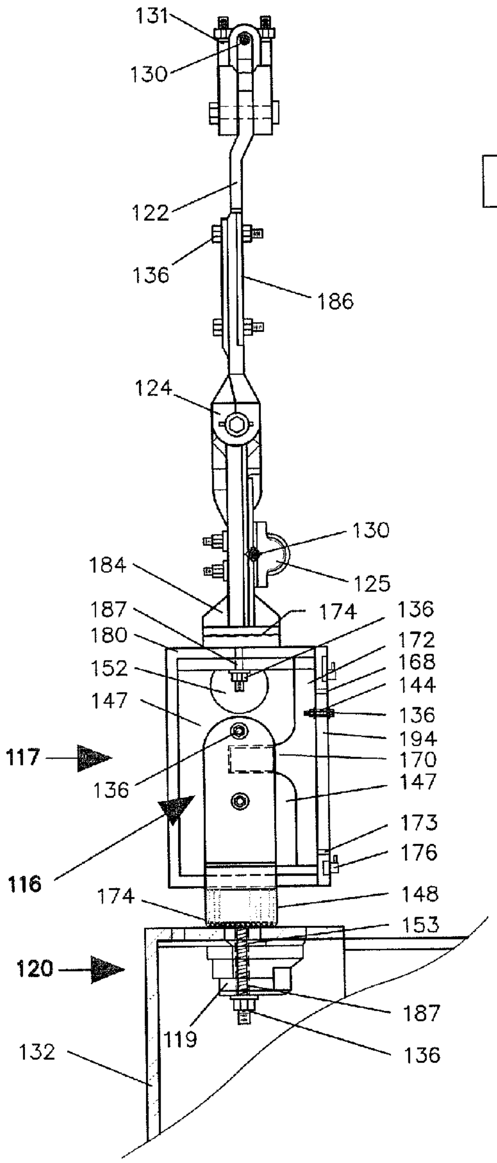
FIG. 2 shows a sectional side view taken at cross sectional plane 4 of FIG. 3.

FIG. 2 illustrates a sectional side view of the embodiment described in FIG. 1. FIG. 2 shows the access aperture 152 for securing the embedded stud 187 to terminal housing 117 by fasteners 136. Also shown is the removable hub system which is more fully described below in reference to FIG. 5, FIG. 6, and FIG. 7. The signal reinforcement 119 can be secured to the removable hub 148 by inserting hub embedded stud 187 through traffic signal 132 aperture 153 and through an aperture in signal reinforcement 119 and completing the compression type connection with appropriate fasteners 136. The integral support flange 147 is shown with receiving slot 170 for removable hub 148, (shown without hub's upper portion for clarity). The door 194 is secured to the housing 117 over the gasket joint 168 by means or placement of door hinge apertures 173 over the boss(es) with pin(s) 176 and mechanically attached to housing 117 integral threaded boss 144 with appropriate fasteners 136. Serrations 174 are also depicted for signal assembly 120 alignment control.

Figure 3:
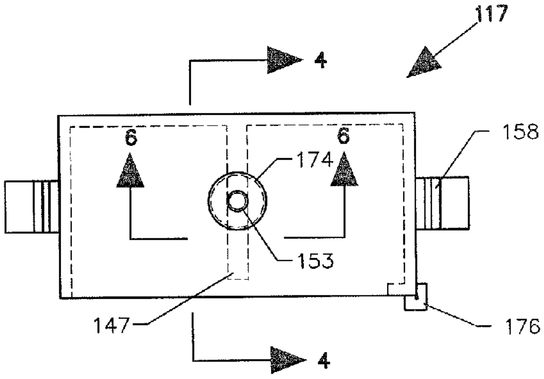
FIG. 3 shows a top view of the traffic control device according to the embodiment shown in FIG. 1.

FIG. 3 shows a top view of the traffic control signal according to an embodiment of the invention and reveals the housing 117 with support flange 147 along with grommetted wire access 158, serrations 174 and receiving aperture 153.

Figure 4:
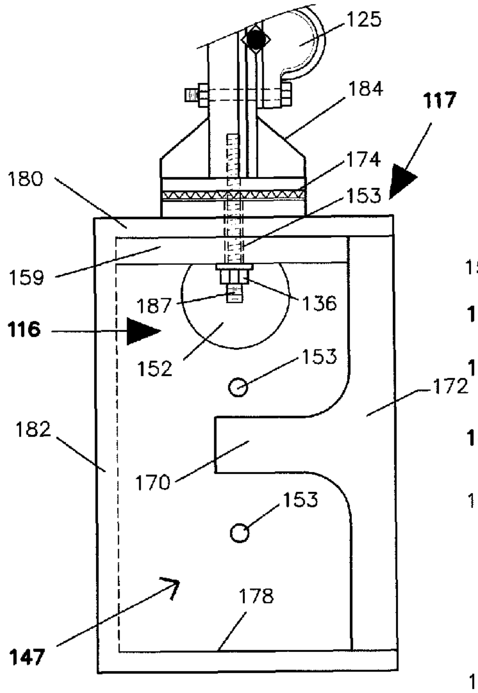
FIG. 4 shows a sectional side view taken at cross sectional plane 4 of FIG. 3.

FIG. 4 shows a cross sectional view taken along cross sectional plane 4 of FIG. 3. FIG. 4 reveals the housing 117, housing floor 178, housing wall 182 housing roof 180 and wall beyond 172. The integral support flange 147 receiving slot 170 is also depicted, along with apertures 153 for the securement of a removable hub. The lower connection device 184 is secured to the housing's integral roof reinforcement 159 by fasteners 136 through apertures 153, 152. Prior to installing, a proper sealant is applied to the serrations 174 to weather proof the top aperture 153, through housing 117 and integral roof reinforcement 159.

Figure 5:
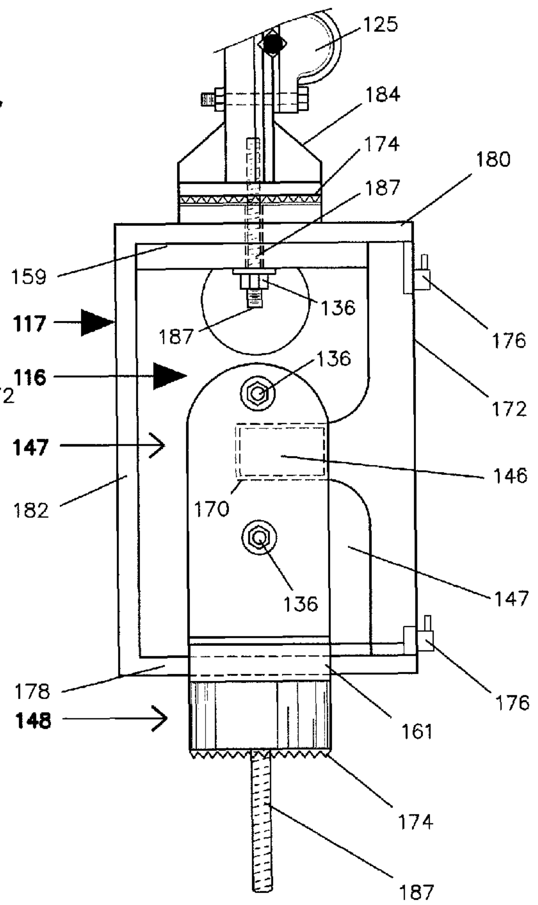
FIG. 5 shows a sectional side view taken at cross sectional plane 4 of FIG. 3 including the housing and removable hub according to an embodiment of the invention.
Figure 7:
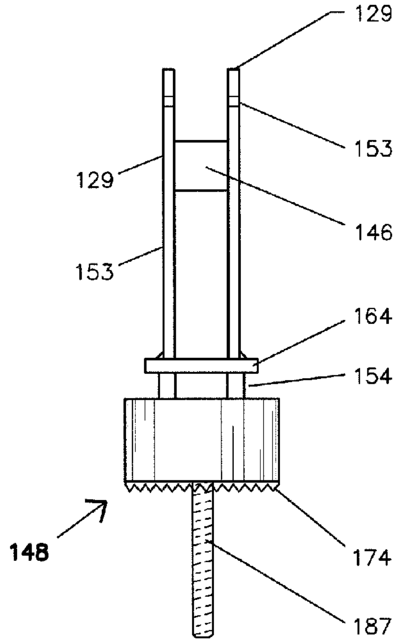
FIG. 7 shows a frontal view of the removable hub according to an embodiment of the invention.

FIG. 5 shows a cross sectional view, taken approximately along cross sectional plane 4 of FIG. 3 showing removable hub 148 in place. The removable hub 148 can be installed into the integral support flange 147 by sliding the hub 148 with integral support beam 146 into the housing's receiving slot 170 and then mechanically connecting with fasteners 136 through apertures 153 (as shown in FIG. 4 and FIG. 7). This installation of continuous central load path hanger 116 completes the continuous load path from an upper span wire down through the top of the signal as shown in FIG. 1 and FIG. 2 according to an embodiment of the invention. Door attachment bosses with pins 176 are also depicted along with the serrations 174.

Figure 6:
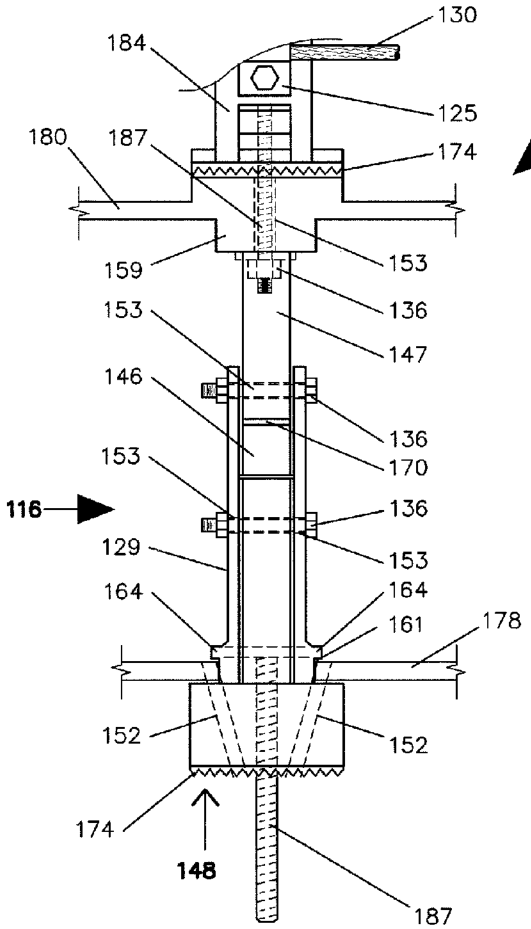
FIG. 6 shows a front sectional portioned view taken at cross sectional plane 6 of FIG. 3.

FIG. 6 illustrates a front elevation of a portion the continuous central load path hanger 116 (with removable hub 148 already installed) according to an embodiment of the invention. The central continuous load path comprises the lower connection device 184, as previously described with reference to FIG. 1, secured to the terminal housing 117 over serrations 174 by inserting an embedded stud 187 through the integral roof reinforcement 159 using a fastener aperture 153 and then securing with fasteners as appropriate, such as, for example, with a threaded nut. At this stage, in operation and prior to installing removable hub 148, the housing 117 is secured from an upper span wire (not shown here, but depicted in FIG. 1) through a continuous central load path extending from the uppermost span wire down to the bottom of the housing's floor 178. Removable hub 148 can be attached to a conventional traffic signal housing as can be seen depicted in FIG. 1 and FIG. 2. In an embodiment of the invention, the removable hub can be attached to a traffic control device reinforcement that is positioned beneath the roof of a traffic signal housing of a traffic control device. The traffic control signal's wiring can be completed prior to hanging the traffic signal housing to save maintenance cost while working in an intersection with traffic flow.

After attaching the hub 148 to the traffic signal housing, the installation of the continuous central load path support system 116 can be completed by inserting the hub's integral support beam 146 into the support hanger's receiving slot 170 and hub access slot 161. Fasteners 136 can be used to secure fastener apertures 153 in integral support flange 147 and the hub's vertical support flanges 129. Slot covers 164 can be used for weather-proofing with an appropriate sealant such as silicone-type exterior grade caulk. The wire access to the signal housing is by way of the removable hub's wire apertures 152. The removable hub's embedded stud 187 (for connection to the traffic signal housing) and serrations 174 are also shown. The terminal housing's floor 178 and roof 180 are shown for reference.

FIG. 7 shows a front view of the removable hub 148 comprising ascending vertical support flange 129 and transverse support beam 146. The removable hub's ascending vertical support flanges 129 are integral to and support the transverse support beam 146. The hub's receiving slots 154 are located below the slot covers 164. The removable hub's fastener apertures 153 are utilized for final securement.

EXAMPLE 2

Figure 8:
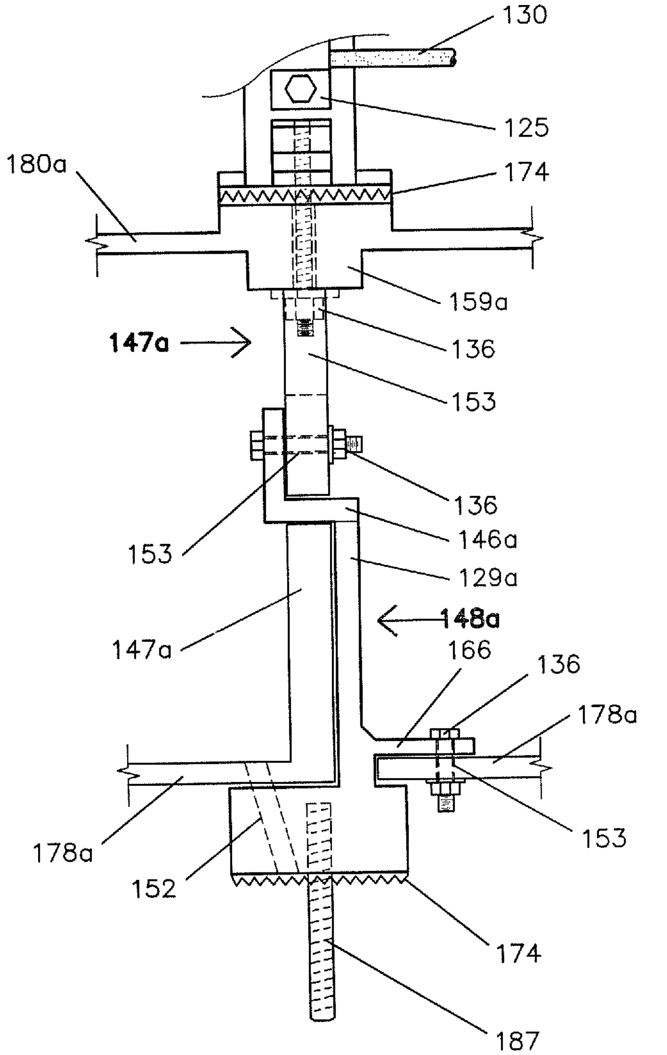
FIG. 8 shows the integral support flange taken at cross sectional plane 6 of FIG. 3 according to an embodiment of the invention.

FIG. 8 illustrates a slight modification of the embodiment described above and depicted in FIGS. 1-7. In this embodiment the integral support flange **147*a* is supporting the removable hub 148*a* integral ascending vertical support 129*a* using the removable hub's integral transverse support bar 146*a* to carry the primary loads along with the associate support flange 166, which is secured by bolting the support flange 166 to the housing using fasteners 136 through each of the fastener apertures 153. The housing's roof 180*a* and floor 178*a*** are depicted for ease of reference.

EXAMPLE 3

Another embodiment of the invention is depicted in FIGS. 9-12, wherein the traffic control signal includes a continuous central load path traffic signal hanger and a removable terminal housing supported by the continuous load path traffic signal hanger.

Figure 9:
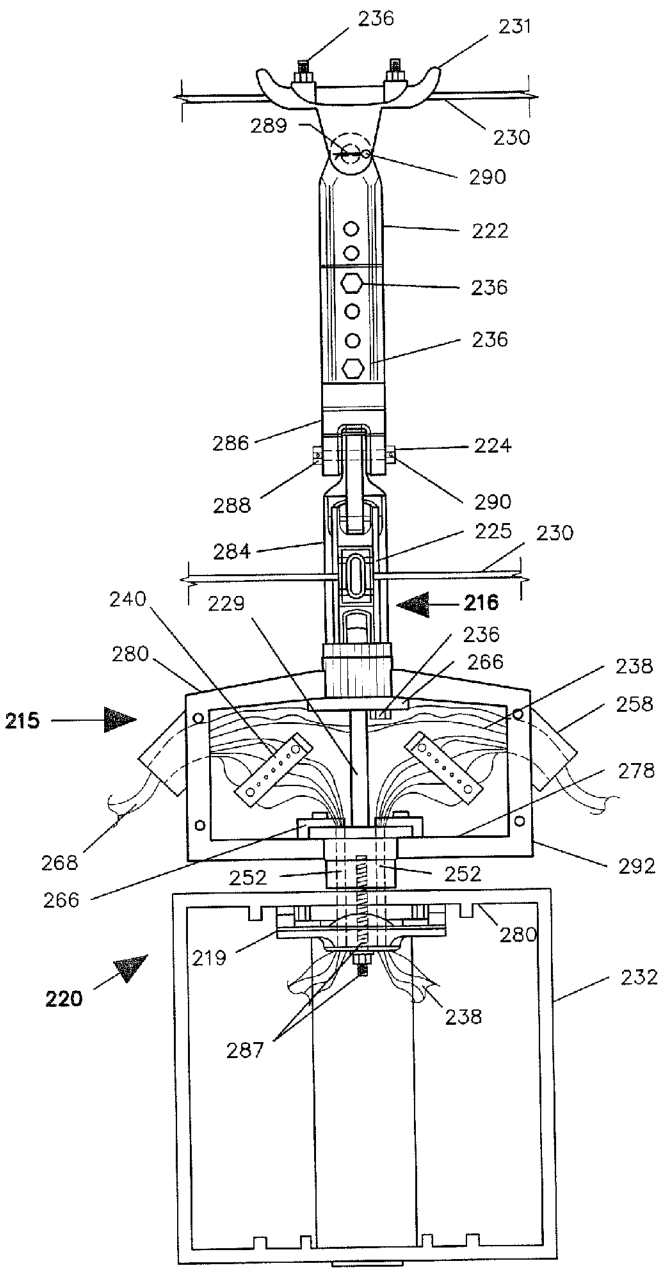
FIG. 9 shows a frontal interior view according to an embodiment of the invention.

FIG. 9 depicts the primary components of an embodiment of the present invention including a continuous central load path hanger 216 and removable terminal housing 215. Sometimes a signal reinforcement 219 can be included. This embodiment of the invention can be provided without a removable hub. The terminal housing can provide a weatherproof housing for electrical components of traffic control devices.

In this embodiment of the invention, a dual span wire system is depicted with the existing upper span wire 230 used to support the gravitational load of the traffic control device 220. The saddle clamp 231 is fastened to the span wire 230 by utilizing the appropriate fasteners 236. The hanger/extension 222 is secured to the clamp 231 by a clevis pin 289 inserted into the clamp's clevis yokes. A final attachment can be made by inserting cotter pin 290. The upper connection device 286 is mated and attached to the hanger/extension utilizing appropriate fasteners 236. The upper connection device 286 is connected to the lower connection device 284 with pivot pin 288 to allow rotational movement about an axis parallel to the span wires. The pivotal connection is secured with cotter pin 290. The lower device 284 is mechanically attached to the lower span wire 230 with tether clamp assembly 225.

The continuous load path hanger 216 can now receive the removable terminal housing 215. The removable terminal housing 215 can be manufactured from a thermoplastic material. The continuous load path hanger system 216 provides structural support such that plastic can be used in the fabrication process in lieu of the prior art practice of using materials such as a cast aluminum alloy that were required to allow the terminal housing to provide structural support for the traffic control signal in a load-bearing capacity to support the weight of the traffic signal housing. In embodiments of the subject invention, the terminal housing now functions primarily as a means to provide weather-proofing of the traffic control signal's electrical components. The removable terminal housing's rear portion 292 is adaptable to the hanger system 216 by sliding the terminal housing from the rear such that the terminal housing is placed over and around the continuous load path hanger's upper and lower attachment 266 and is temporarily secured utilizing fasteners 236. The traffic signal housing 232 is then attached to the continuous load path hanger 216 by securing the signal reinforcement 219 directly under the interior surface of signal housing roof 280. An appropriate fastener 236 and embedded stud 287 can be utilized.

For clarity, in FIG. 9 the terminal housing's front portion is not shown. The electrical components, such as wiring 238, main conductors 268, and terminal blocks 240, are shown. The wire access is provided through apertures 252 and grommetted access 258.

Figure 10:
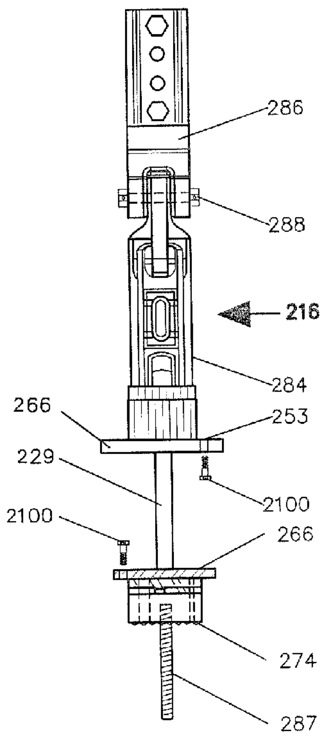
FIG. 10 shows a front view of the continuous hanger support device shown in FIG. 9.

FIG. 10 shows a front view of the continuous load path hanger 216. The upper connection 286 is pivotally connected to the lower connection device 284 by pivot pin 288. The attachment flanges 266 provide a shelf, and can also provide a grooved support plate for the securement of the two part housings 292, 293 (not shown). The attachment flanges 266 can be round so that rotational adjustments to the traffic control assembly can be provided when required. Set screws 2100 are tightened after final, rotational position is established to prevent unwanted movement of the traffic control signal. Also shown is the embedded stud 287 used to secure and attach the traffic signal housing. The central load bearing member 229 is also shown along with lower integral hub connection with serrations 274. The housing's retainer flange 266*a* is shown over the hub attachment flange 266.

Figure 11:
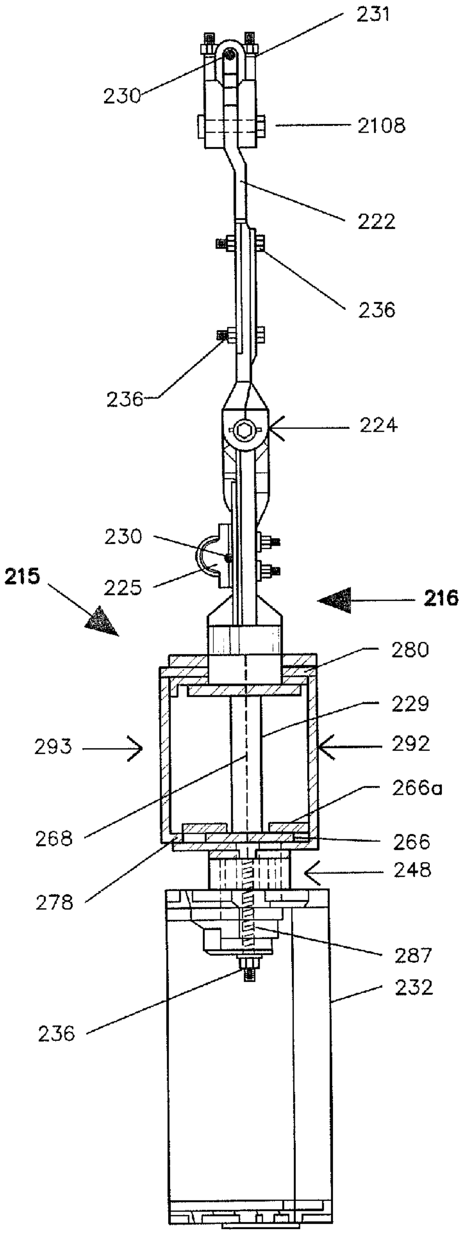
FIG. 11 shows a sectional side view of FIG. 9 according to an embodiment of the invention.

FIG. 11 illustrates a sectional side view of the view depicted in FIG. 9. The housing's retainer flange 266*a* is located over hub support/attachment flange 266. The terminal housing's rear portion 292 and front portion 293 can join together at gasketed joint 268.

Figure 12:
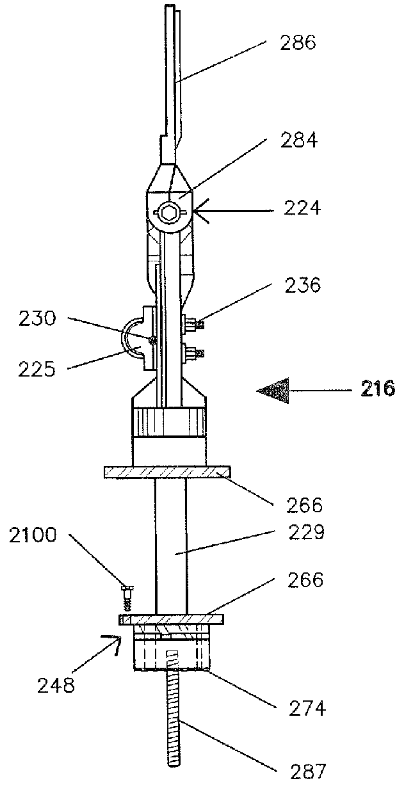
FIG. 12 shows a side view of the continuous hanger support device shown in FIG. 9.

FIG. 12 illustrates a side view of the hanger as described in FIG. 9, FIG. 10, and FIG. 11 with the terminal housing 215 and traffic signal housing 232 is removed.

EXAMPLE 4

Figure 13:
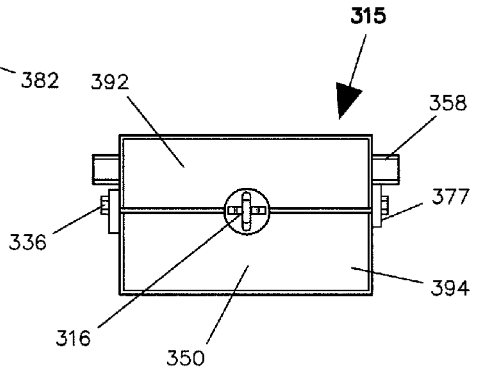
FIG. 13 shows a top view of the traffic control device according to an embodiment of the invention.

FIG. 13 shows a top view of the continuous load path hanger with removable terminal housing 315, continuous load path hanger 316, and the two-part housing comprising a rear portion 392 providing access to the electrical components and related attachments which can include access for the main conductors through the grommetted wire access 358 according to another embodiment of the invention. Final securement for front portion 394 can be provided by mechanically attaching the connection flanges 377 with appropriate fasteners 336 that optionally can be integrally constructed to form a receiving flange along the front or rear housing's periphery.

Figure 14:
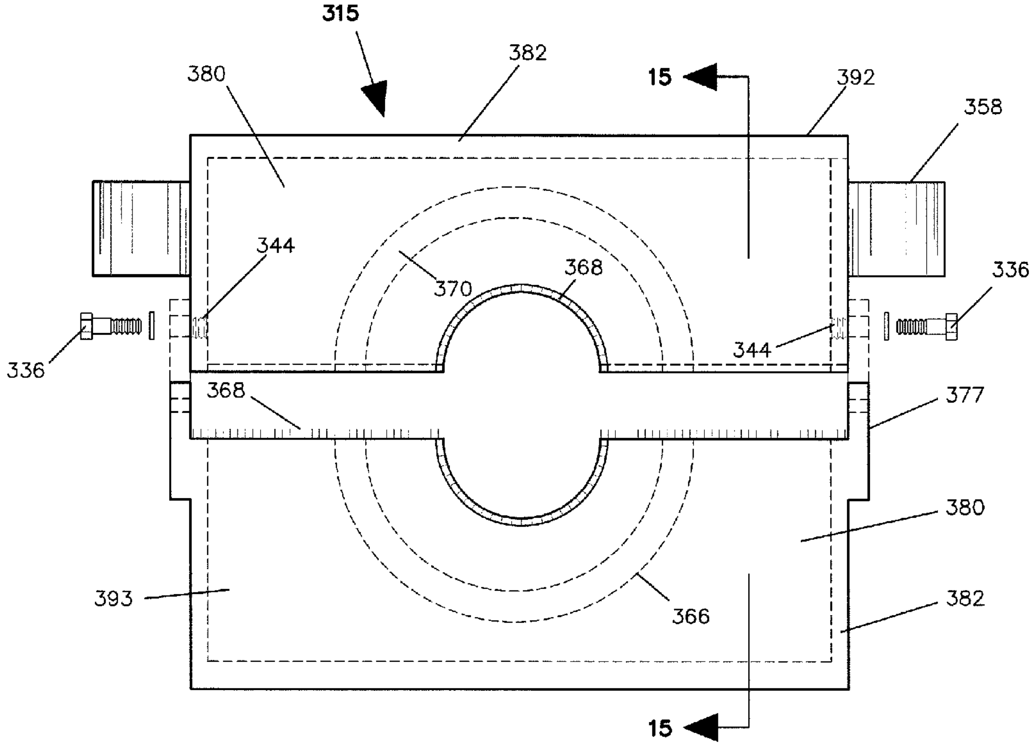
FIG. 14 shows an enlarged top view of the housing according to an embodiment of the invention.

FIG. 14 shows a top view of the two-part housing embodiment (FIG. 13) in slight separation. The terminal housing's rear portion 392 and the terminal housing's front portion 393 each have walls 382 and roofs 380. The gasketed joint 368 is common to each portion's periphery. The hanger integral support/retainer flange 366*a* (not shown) can be used in supporting each housing portions 392, 393 by inserting the integral support/attachment flange 366 (shown in FIGS. 11 and 12) into the receiving slot 370. The final connection can be completed by sliding each portion towards one another such that the connection flange 377 overlaps the area providing the threaded bosses. The appropriate fasteners 336 can be inserted through the connection flange 377 and into the threaded bosses 344.

Figure 15:
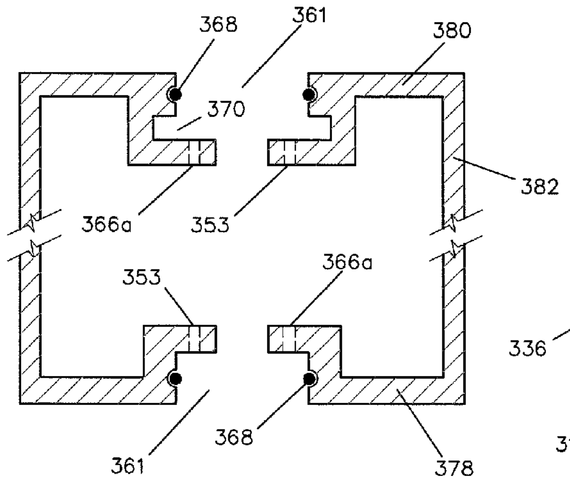
FIG. 15 shows a side sectional view of the housing taken along cross sectional plane 15 of FIG. 14 according to an embodiment of the invention.

FIG. 15 illustrates a side sectional view taken along cross sectional plane 15 of FIG. 14 of the two piece housing embodiment. The housing's roof 380 is shown with integral retainer flange 366*a* comprising a receiving slot 370 and gasketing 368 to hub access 361 for providing a weather proof connection upon final attachment of the housing portion. Also shown are attachment apertures 353.

EXAMPLE 5

FIGS. 16-20 illustrate an additional embodiment of the invention. The removable hub 448 system can be utilized for additional ease of operation. The continuous load path hanger 416 is connected to a lower span wire by the tether clamp assembly 425. The tether clamp assembly (similar to 225 as depicted in FIGS. 11 and 12) includes the span wire's capture and securement with a grooved boss integral to the hanger. Another grooved boss is captured by a u-bolt through the second boss and around the span wire, then back through the hanger's apertures and over the integral boss. The tethered clamp can be secured by appropriate washers and nuts to complete the attachment of the hanger 416 lower connection device 484 to lower span wire 430.

The new tether clamp assembly can provide the added support to enable the lower span wire to stay in connection with the continuous load path hanger. In the event of high winds, the tethered clamp is less likely to disengage the lower span wire and cause the traffic control signal to fall from the span wires.

After attaching the removable hub 448 to the traffic signal housing 432 and installing the signal reinforcement 419 (as appropriate), the removable hub 448 and attached traffic signal housing 432 can be lifted and the hub's transverse support beam 446 is easily slid into the hanger's receiving slot 470. At this point, the hub is then positioned such that the hub and hanger connection apertures 453 are aligned and can be mechanically connected using the appropriate fasteners 436. The housing's rear portion is attached by inserting the appropriate fasteners 436 through the housing attachment flange 466. This connection rigidifies the hanger 416, the removable hub 448, and the electrical housing 492 together. The threaded bosses 444 can provide for final attachment of the housings front cover (not shown), and the electrical connections (not shown) can be completed as previously described.

Figure 16:
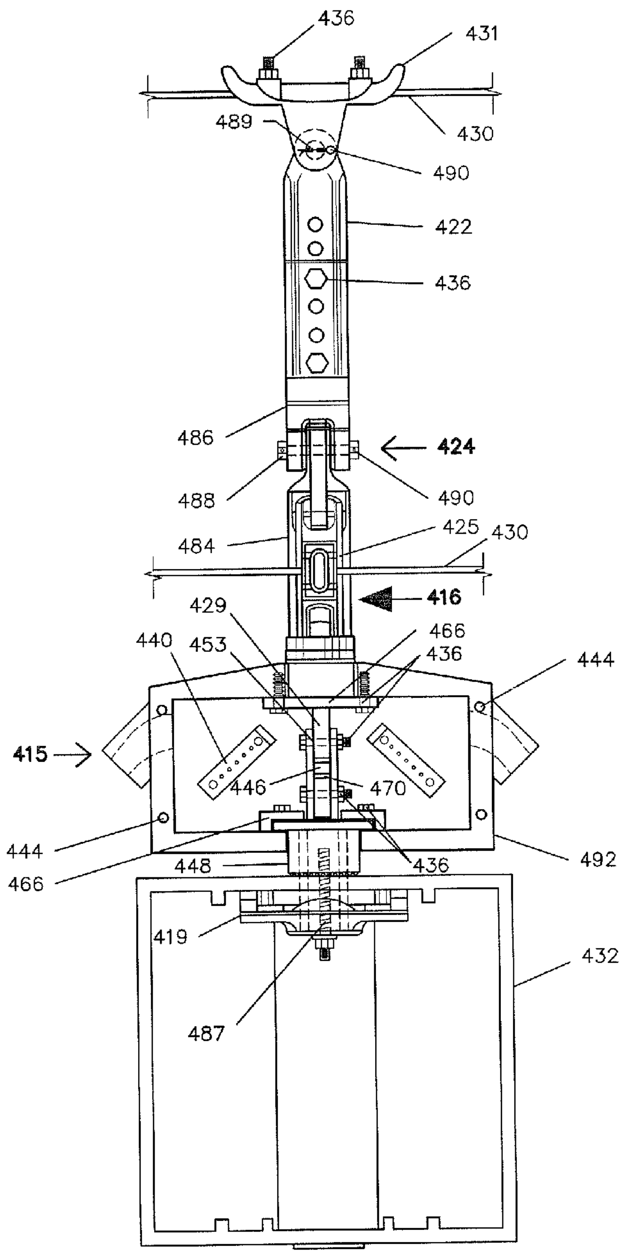
FIG. 16 shows a front view of the traffic control device including the hanger system according to an embodiment of the invention.
Figure 17:
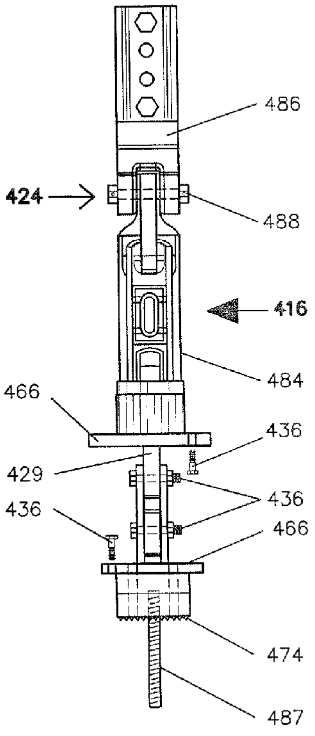
FIG. 17 shows a frontal view of the continuous hanger system according to an embodiment of the invention.

FIG. 17 depicts a front view of the embodiment of the continuous load path hanger shown in FIG. 16, but here depicted without the removable housings in place.

Figure 18:
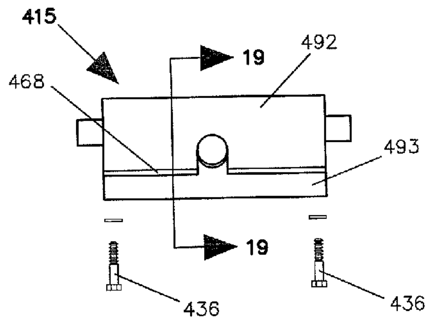
FIG. 18 shows a top view of the embodiment of the invention shown in FIG. 16.

FIG. 18 shows a top view of the terminal housing rear portion 492 and front portion 493 in approximate proportions. The front/cover portion 493 is attached to the terminal housing rear portion 492 using fasteners 436. The attachment of the two portions produces a weather-tight connection over gasketing 468 after final tightening. In some embodiments, the proportions of the housing's depths can vary, and the front and rear portions can be reversed or varied in size as shown in FIG. 18.

Figure 19:
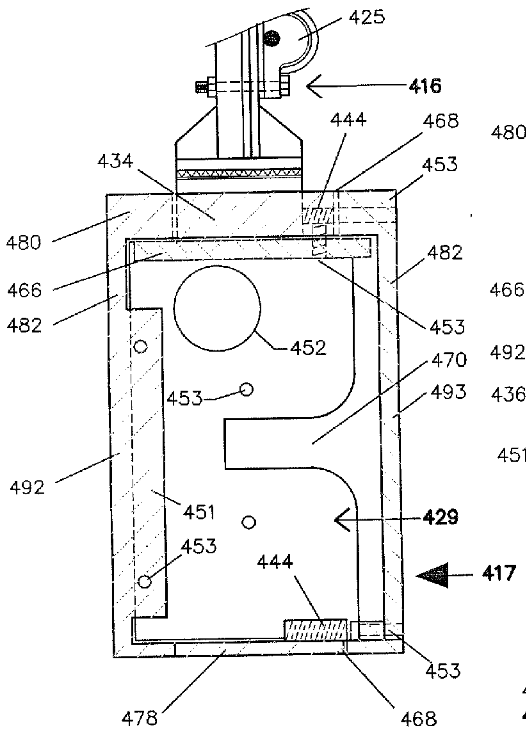
FIG. 19 shows a through section taken at cross sectional plane 19 of FIG. 18.

FIG. 19 illustrates a through section taken at cross sectional plane 19 of FIG. 18. The terminal housing's rear portion 492 and the front portion 493 are secured to the vertical support flange 429 which is integral to the hanger 416 mid-portion and is designed to support the terminal housing rear portion 492 and front portion 493. The housing rear portion 492 utilized an integral vertical support channel-type flange 451 that receives the hanger's vertical support flange 429, each having fastener apertures 453 complementary to each other for attachment. Access for wiring, including the main conductors is provided with aperture 452 in hanger's vertical support flange 429. Vertical support flange 429 also provides the support as previously described with receiving slot 470 along with apertures 453 for final securement of a removable hub. Apertures for additional means of securement of the housing rear portion 492 are also shown at upper support flange 466. The housing's front portion 493 is also supported in part by flange 466. Threaded bosses 444 can be provided for final attachment the of housing's portion 493.

Figure 20:
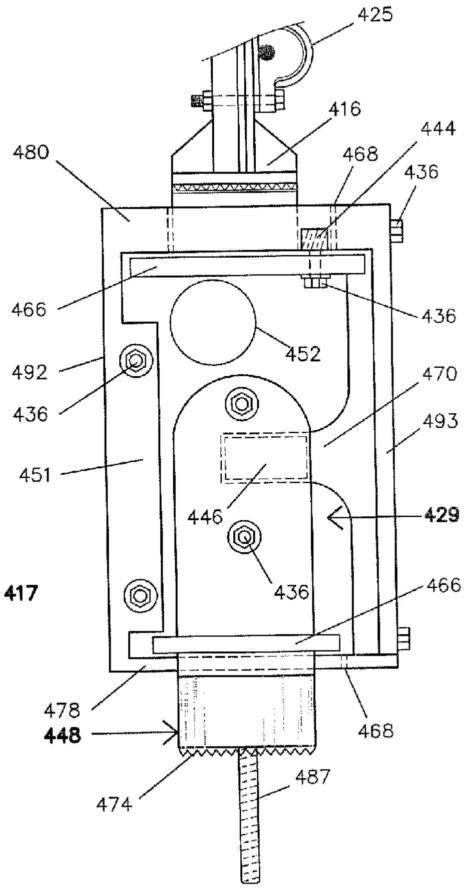
FIG. 20 shows a through section taken approximately at cross section 19 of FIG. 18 according to an embodiment of the invention.

FIG. 20 also illustrates a through section taken at approximately cross sectional plane 19 of FIG. 18. The rear housing 492 can be attached to the hanger's vertical support flange 429 by the fasteners 436. The final connection at the housing's roof 480 is also secured to upper support flange 466 by fastener 436 into threaded boss 444 (shown in FIG. 19. The final attachment of the removable hub 448 is shown using fasteners 436. The hub's integral support beam 446 is shown in phantom resting in the hanger's receiving slot 470. Housing front portion 493 is shown mechanically attached over the gasketed joint 468 using appropriate fasteners 436 to complete a water-tight, compression-type connection.

The gasketed connection joint 468 between the terminal housing's front and rear portions can be located toward the front of the housing in certain embodiments, while in others at the center, and in still others, the gasketed connection joint can be toward the rear of the housing, having a lesser portion, smaller depth rear housing 492 to allow even greater access to electrical components.

EXAMPLE 6

Figure 21:
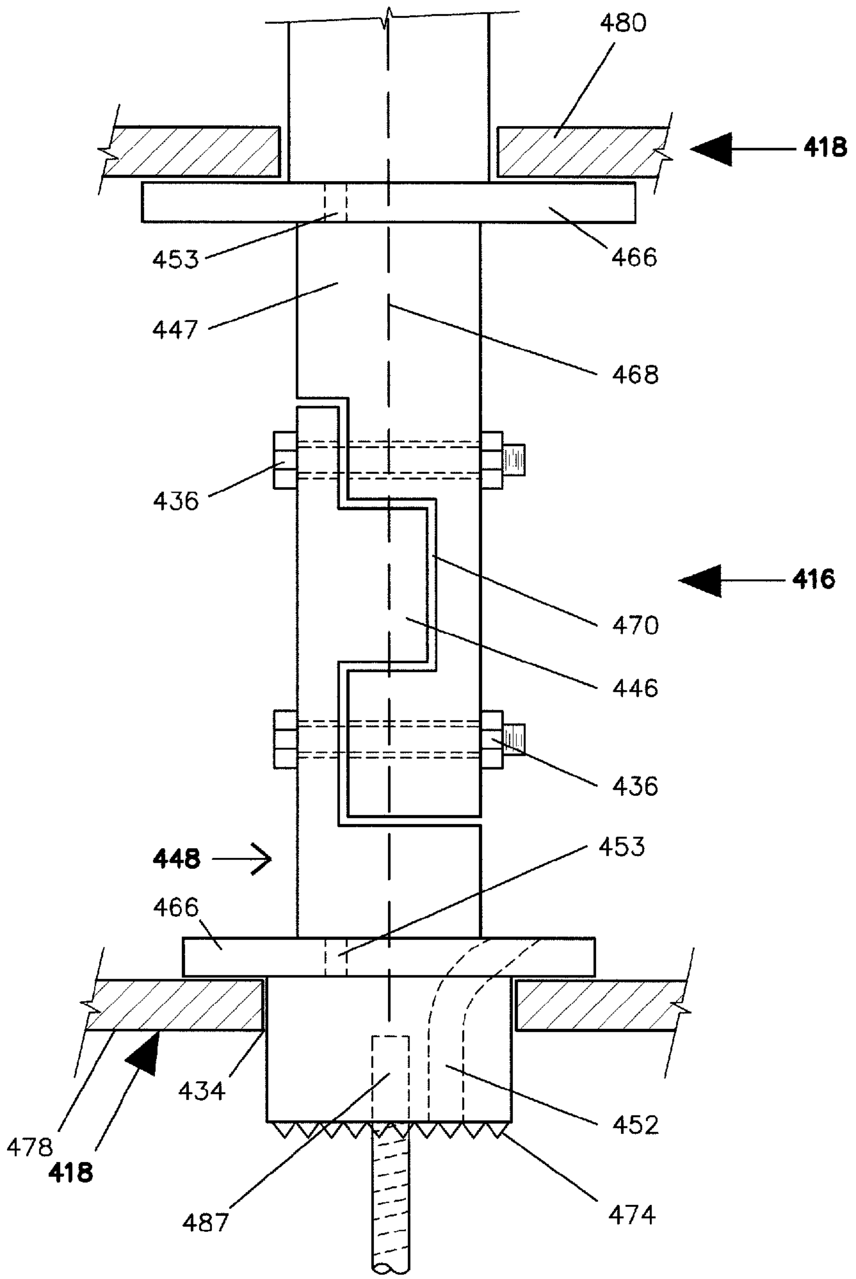
FIG. 21 shows a front view of continuous hanger according to an embodiment of the invention.
Figure 22:
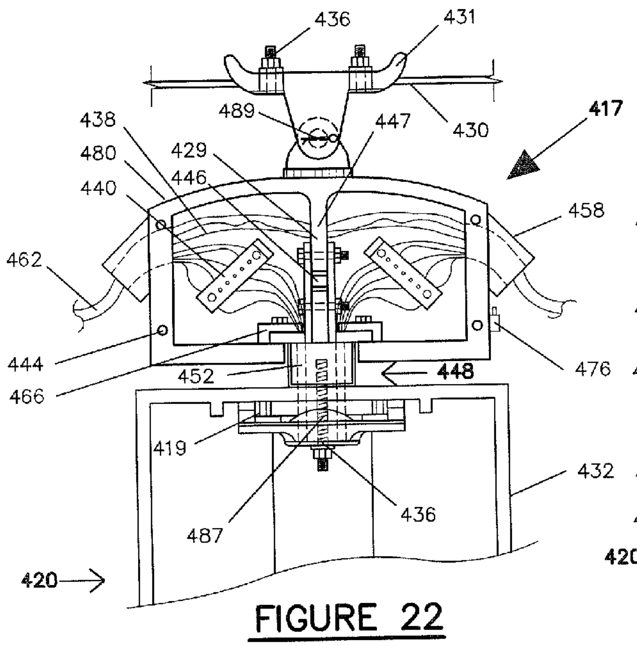
FIG. 22 shows a front view of the hanger system attached to a single span wire system according to an embodiment of the invention.
Figure 23:
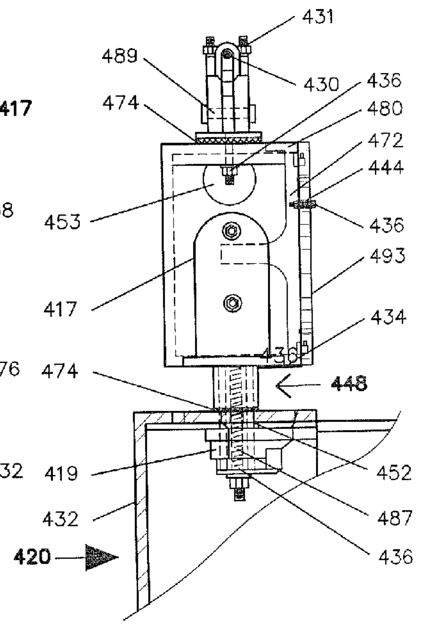
FIG. 23 shows a side view of the hanger support system's removable hub according to an embodiment of the invention.
Figure 24:
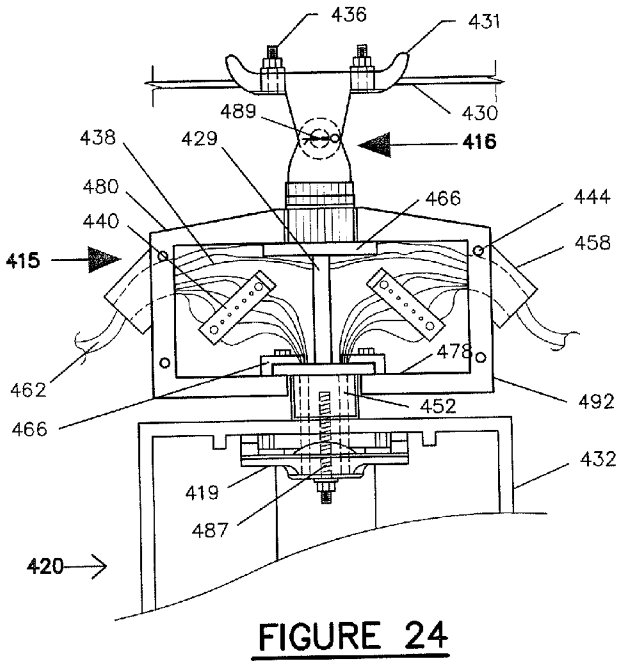
FIG. 24 shows a front view of the hanger system attached to a single span wire system according to an embodiment of the invention.
Figure 25:
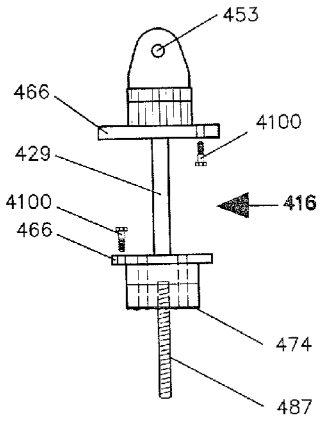
FIG. 25 shows a front view of the continuous hanger system according to an embodiment of the invention.
Figure 27:
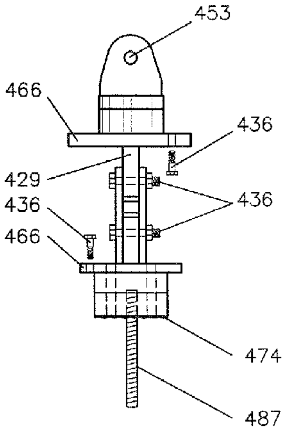
FIG. 27 shows a front view of a continuous hanger system utilizing a single span wire system according to an embodiment of the invention.

FIG. 21 illustrates a slight modification of the embodiment described with regard to FIGS. 16-20, and shows the continuous load path hanger 416 with removable hub 448 connection. The hub's vertical support flange 429 comprises removable hub's support beam 446 and is designed to be complementary to the hanger's integral support flange 447 that comprises a receiving slot 470 to accept and mate with support beam 446. The integral support flange 447 and vertical support flange 429 are connected using fasteners 436 through apertures 453 to complete the continuous load path. Next, the two-part housing 492, 493 installation can be performed as previously described.

EXAMPLE 7

FIG. 22, FIG. 23, FIG. 24, FIG. 25, FIG. 26, and FIG. 27 illustrate the upper part of the same basic hanger system depicted in FIGS. 16-20, but modified for attachment to a single wire system.

Figure 26:
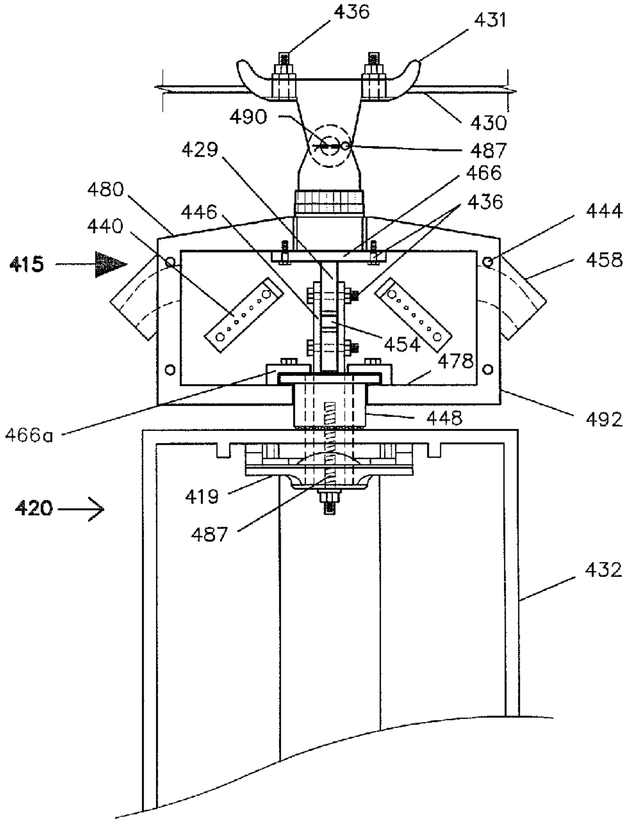
FIG. 26 shows a front view of the hanger system attached to a single span wire system according to an embodiment of the invention.
Figure 26A:
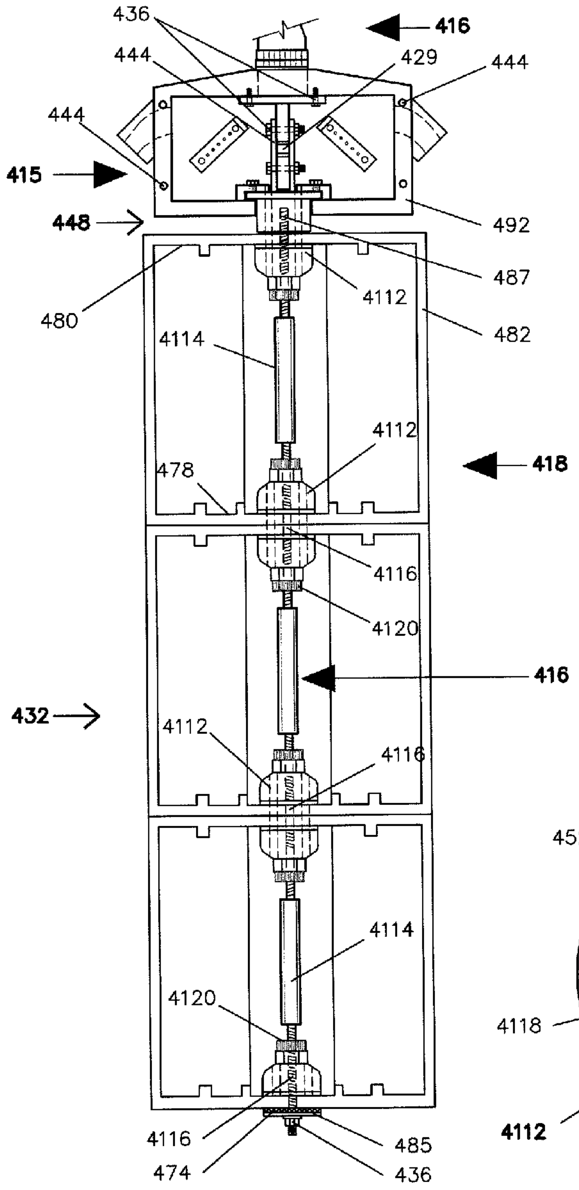
FIG. 26A shows a front view of an adaptable continuous hanger according to an embodiment of the invention.

FIG. 26A shows the continuous load path hanger system 416 in an embodiment adaptable to common/conventional signal housings that are currently in use today. The support hub 4112 can be utilized as a primary connection or can fit over existing tri-stud or other similar attachments used to connect individual signal heads. Two hubs 4112 are positioned opposing one another and loosely connected together by inserting the threaded ends of a connection rod 4114 and pre-adjusting to the appropriate length to fit snugly into the signal head. The upper hub is then positioned below either the existing removable hub 448, embedded stud 487, or the extension threaded rod 4116 and screwed together until tight and secured to the housings as appropriate. The lower hub 4112 with the protruding extension rod 4116 is secured evenly by adjusting the connecting rod 4114 and final securement using stay nuts 4120. The process can be repeated as necessary to complete the continuous hanger system to any multi-signal head application.

Figure 27A:
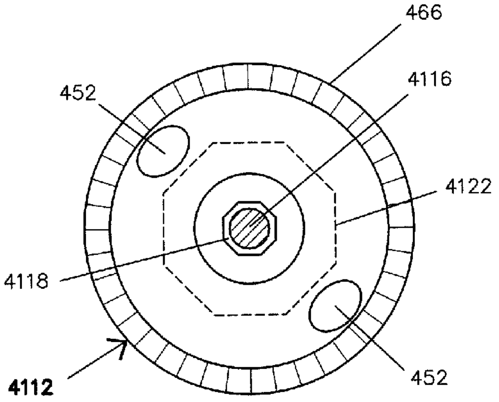
FIG. 27A shows an end-on perspective view from the larger end of the support hub according to an embodiment of the invention.

FIG. 27A shows an end-on perspective view from the larger end of the support hub 4112 with apertures 452 used to complete electrical connections. The surface-pressure area of the hub 4112 is shown in "hatch" lines. The integral nut 4122, shown in phantom, is used to secure the hub 4112 to the signal housing's roof or floor. It creates a surface pressure type connection that is rigidly connected by the extension threaded rod 4116 into the integral coupling 4118 during installation.

EXAMPLE 8

Figure 28:
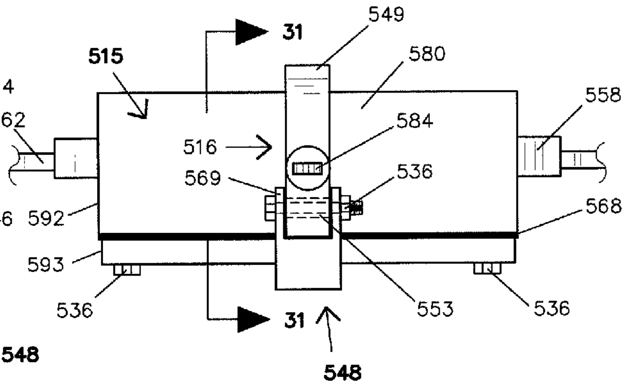
FIG. 28 shows a top view of an embodiment of the invention.

FIG. 28, FIG. 29, FIG. 30, and FIG. 31 illustrate yet another embodiment of the present invention by depicting the novel continuous load path hanger system mounted externally to the terminal housing, which provides an uninterrupted, circuitous central load path that is distinctly separate from the terminal housing and therefore provides improved structural integrity as compared to prior art devices by removing substantially all of the weight, and wind induced loads of the traffic signal housing from the terminal housing. FIG. 28 shows a top view of an embodiment of the invention having a continuous load path hanger around a removable terminal housing 515 and utilizing a span wire attachment as previously described (either single wire or dual wires are acceptable). The hanger system's removable hub 548 is connected to the rear hanger support frame 549 portion by utilization of the yoke-type connection flange 569 with the appropriate fasteners 536 through apertures 553. Also shown is the removable housing's rear portion 592 mechanically fastened to the front housing portion 593 using the appropriate fasteners 536.

Figure 29:
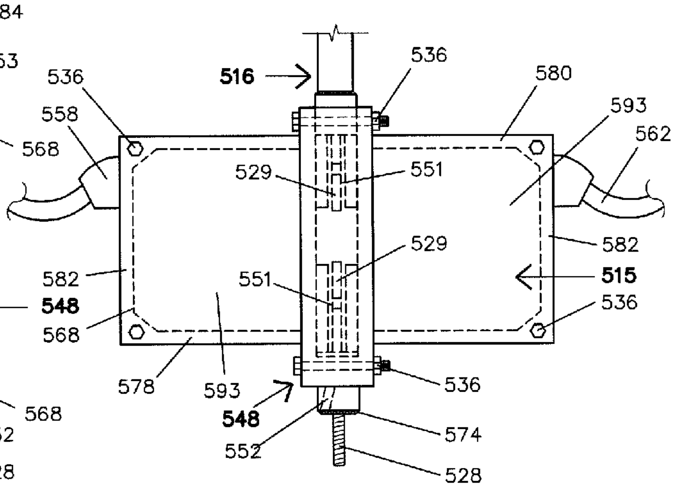
FIG. 29 shows a front view of an embodiment of the invention in FIG. 28.

FIG. 29 shows a front view of the continuous load path hanger 516 and terminal housing 515, preferably made of plastic. Also shown are the main conductor's 562 access apertures 558. The removable hub 548 is shown along with the lower attachment fasteners 536 used to attach the hub to the hanger, completing the circuitous support structure. The removable front covers 593 of the housing 515 are also depicted with fasteners 536. The hanger's internal support flanges 529 (shown in phantom) are fastened to each other with appropriate fasteners to secure the terminal housing 515 to the hanger 516.

Figure 30:
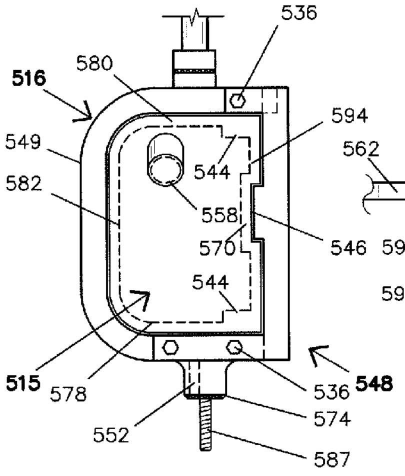
FIG. 30 shows a side view of an embodiment of the invention shown in FIG. 28.

FIG. 30 shows a side view of the hanger system 516 securing the terminal housing 515. The removable hub's 548 integral support bar 546 can mate with the housing's receiving slot 570 to help align the final securement of the hanger to the hub using fasteners 536.

Figure 31:
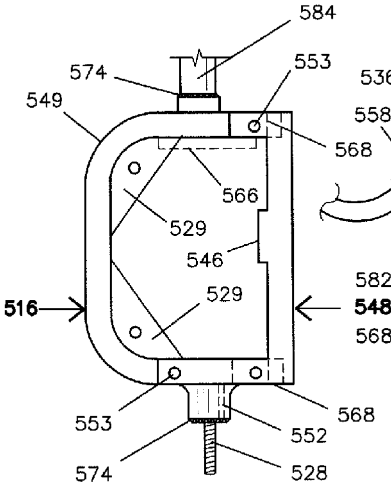
FIG. 31 shows a cross sectional view taken at cross sectional plane 31 of FIG. 28.

FIG. 31 shows a section view taken at cross sectional plane 31 of FIG. 28 without the terminal housing 515. The integral support flanges 529 with apertures 553 for fasteners are depicted and are utilized to secure terminal housing. The removable hub's support bar 546 used to align and secure the housing is also shown. In certain embodiments, a support/attachment flange 566 (shown in phantom) may also be utilized as long as the housing has a receiving slot or recess. The hanger support frame 549 is shown for reference.

In operation, the hanger's rear portion is secured to one or more span wires as appropriate and as previously described, thereby suspending the hanger. The terminal housing's rear portion is then placed into the suspended hanger and secured, allowing for the electrical portion to be installed. The removable hub is attached to the traffic signal housing, also previously described, along with appropriate electrical wiring. The attached traffic signal housing and hub support flange are aligned and placed into the terminal housing's receiving slot and then the structural attachment of the removable hub to the hanger is completed using appropriate fasteners. The final electrical connections can be completed and the two weatherproof cover panels/front of the terminal housing can be installed.

Figure 32:
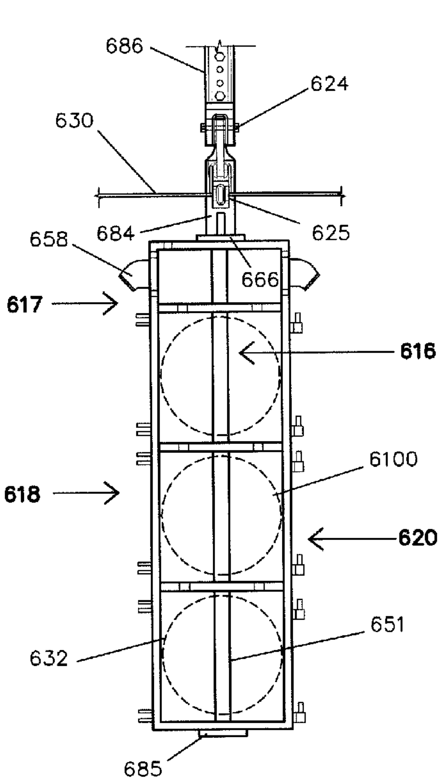
FIG. 32 shows a front view of an embodiment of the invention with the terminal housing and traffic signal doors removed.

FIG. 32 shows another embodiment of a continuous central load path hanger 616, with terminal housing 617 and traffic signal housing 618 together comprising a single unit traffic control device 620. The lower connection device 684 can be mechanically attached to the existing lower span wire 630 using an appropriate tether clamp assembly 625. The lower connection device 684 is pivotally connected 624 to upper connection device 686. The terminal and signal housings 617, 618 vertical support channel attachment flange 651 is shown primarily as a point of reference in this drawing. Also for reference, the hanger 616, grommetted wire access 658, signal housing support shoe 685 and the signal LED modules 6100 (shown in phantom) are illustrated as points of reference.

Figure 33:
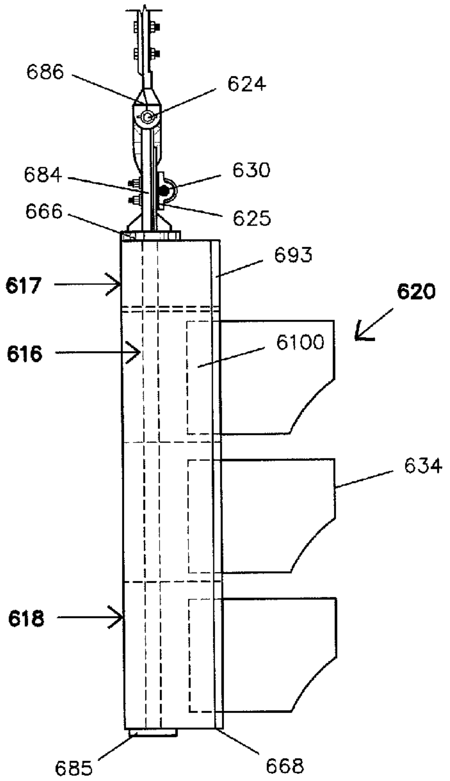
FIG. 33 shows a side view of the continuous hanger and LED modules in phantom according to an embodiment of the invention.

FIG. 33 shows a side view of FIG. 32's single unit housing traffic control signal. The continuous central load path hanger 616 is shown in phantom between the hanger connection device 684 and the hanger's support shoe 685. The hanger's support flange 666 works in conjunction with the shoe 685 to capture housings 617, 618 to further secure the traffic control device 620 and support the single unit housing.

Figure 34:
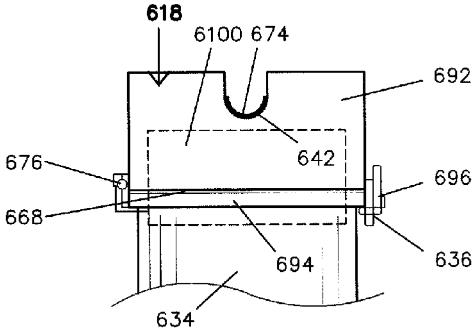
FIG. 34 shows a bottom view of the signal housing of an embodiment of the invention shown in FIG. 32.

FIG. 34 illustrates a bottom view of the signal housing 618 serrations 674 used to secure the signal housing's directional requirements. The housing's door 694 is shown pivotally connected by boss with pin 676 and secured over the gasketed joint 668 using the signal's door latch 696. The housing door can be secured by tightening with appropriate fasteners 636. The traffic control device's LED modules 6100 and visor 634 are shown in phantom as reference.

Figure 35:
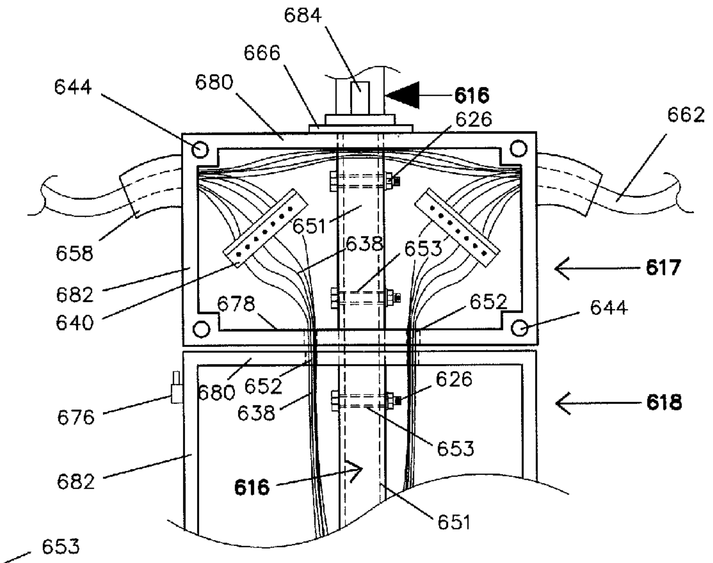
FIG. 35 shows a larger portional interior view of an embodiment of the invention.

FIG. 35 shows a portional and larger front view of the interior of the housings comprising the continuous central load path hanger 616, the terminal housing 617, and signal housing 618. The housings 617, 618 are mechanically attached to the hanger 616. Clamping fasteners 626 are inserted and secured through apertures 653 that are provided and aligned in the housing's vertical support channel 651. In some embodiments, additional metal reinforcement flanges can be incorporated into the support channel 651. The terminal housing 617 provides a weather proof grommetted wire access 658 for the main conductors 662 entering and exiting the device. Electrical terminal blocks 640 are provided as a means to connect terminal wiring 638 between the signal's LED modules (not shown) and the main conductors 662 as appropriate to the traffic control signal/device's primary function in directing traffic. The terminal housing's door (not shown) connection bosses 644 are shown, as are roofs 680, walls 682, and the terminal housing floor 678. The hanger's support flange 666 is shown also as a point of reference.

Figure 36:
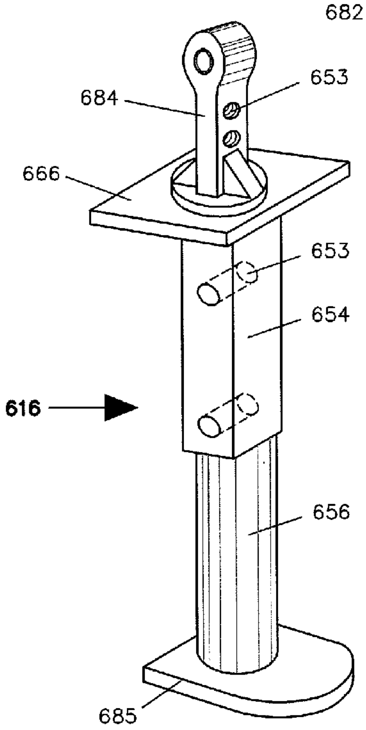
FIG. 36 shows an isometric view of the continuous hanger.

FIG. 36 shows an isometric portional view of an embodiment of the continuous load path hanger 616. Apertures 653 in the lower connection portion 684 are used to secure a lower span wire (not shown) utilizing an appropriate span wire clamp assembly (not shown). The stabilizing, integral support flange 666 is shown above the hanger's square tubular portion 654. In an embodiment of the invention, the square tubular portion 654 can be integrally connected to the round tubular portion 656, which itself can be integrally connected to the continuous hanger's support shoe 685. The hanger's square portion 654 is configured to mate and mechanically attach to the terminal housing 617 (not shown). The hanger's round portion 656 is configured to mate with the signal housing 618 (not shown), allowing for rotational adjustments and final securement using appropriate fasteners.

Figure 37:
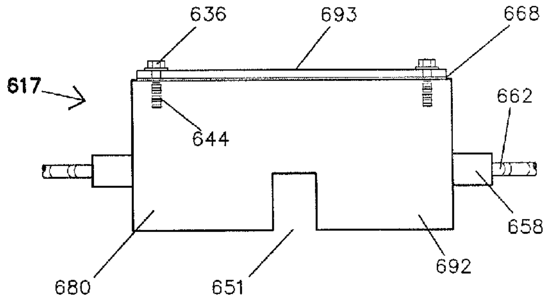
FIG. 37 shows a top view of the terminal housing without the continuous hanger.

FIG. 37 illustrates a top view of the terminal housing 617 without the continuous hanger to reveal the receiving area for the hanger into the terminal housing's vertical support channel 651. The housing's removable front cover 693 can be secured over the gasketed joint 668 using appropriate fasteners 636 into threaded bosses 644.

Figure 38:
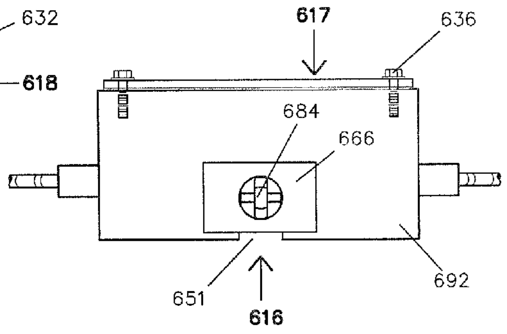
FIG. 38 shows a top view of both the terminal housing and the hanger device according to an embodiment of the present invention.

FIG. 38 illustrates a top view of the terminal housing 617, and depicts the hanger 616 as placed into the housing's support channel 651 below the hanger 684 integral support flange 666.

Figure 39:
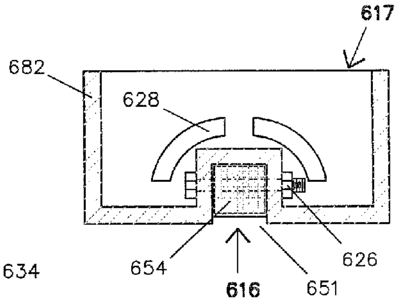
FIG. 39 shows a through sectional view of the terminal housing and hanger device.

FIG. 39 shows a through sectional view of the terminal housing 617 and the hanger 616. The hanger's square tubular portion 654 is depicted positioned into the housing's support channel and secured by clamping type fasteners 626 as appropriate. Arcuate slots 628 can align and mate with wire apertures 652 to provide access between the upper and lower housings (terminal housing 617 and traffic signal housing 618, respectively) for wiring as necessary. The arcuate slots 628 and the wire apertures 652 share a common radius central to the hanger.

Figure 40:
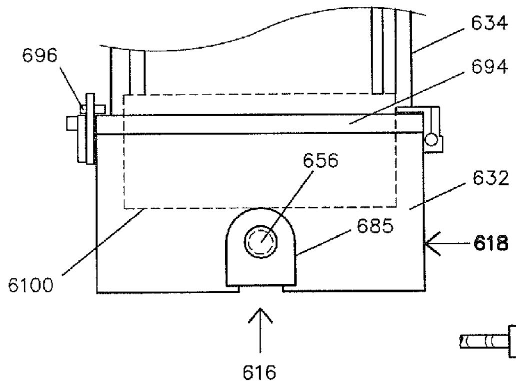
FIG. 40 shows a bottom view of the traffic signal housing and hanger support shoe with the continuous hanger shown and LED module shown in phantom.

FIG. 40 illustrates a bottom view of the traffic signal housing 618 and hanger system 616. The solid round tubular portion 656 of the continuous hanger 616, shown in phantom, is integral to the support shoe 685.

Figure 41:
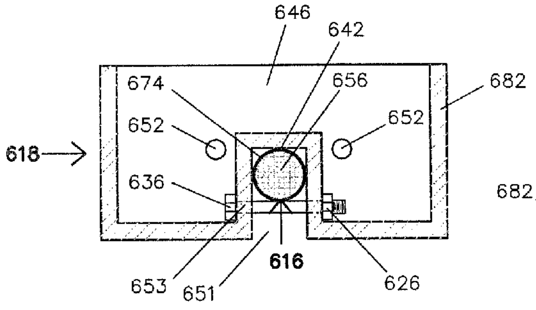
FIG. 41 shows a through sectional view of the traffic signal housing and hanger device.

FIG. 41 shows a through sectional view of the traffic signal housing 618 and continuous hanger 616, more specifically the solid round tubular portion 656 positioned into the support attachment channel 651. The solid round tubular portion 656 can be aligned such that it is directly over the cradle base 642 of the housing. After a final determination of rotation, the housing is secured to the continuous hanger 616 in a fixed position by utilizing the appropriate fasteners 636 through and placing them through the apertures 653. Wire access is provided utilizing the apertures 652 as previously described in the embodiment illustrated in FIG. 39.

Figure 42:
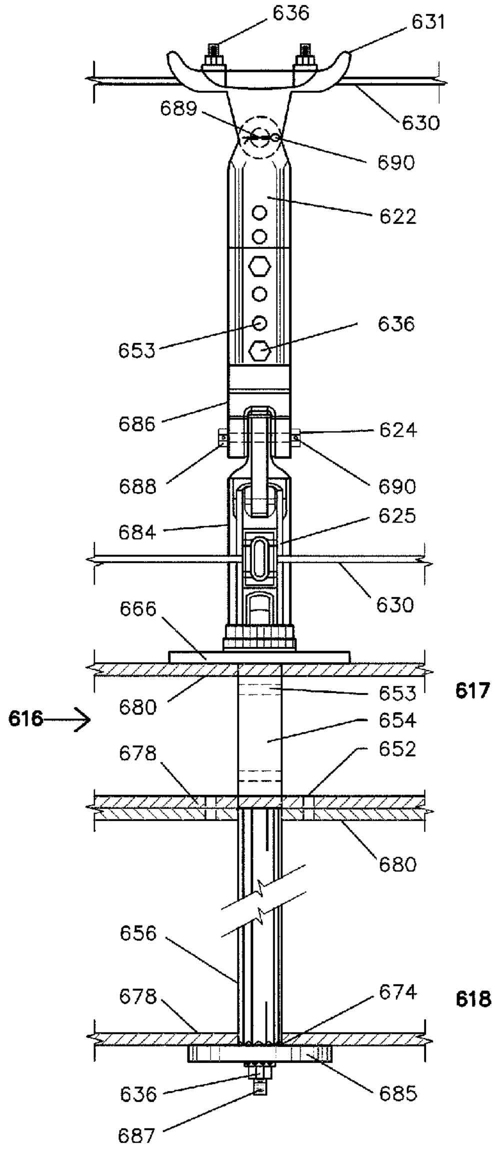
FIG. 42 shows a front view of the continuous support hanger excluding electrical component housings utilizing a two span wire installation according to an embodiment of the invention.

FIG. 42 illustrates a front view of one embodiment of the continuous load path hanger system 616. As reference, and in portion, the upper terminal housing 617 and lower traffic signal housing 618, housing roofs 680 and housing floors 678 are shown. The continuous central load path provides several distinct advantages, particularly when combined with the single unit traffic control signal housing.

The single unit traffic control signal housing can provide the functionality of securing the lighting displays (modules) and keeping electrical connectors dry and easily accessible by combining the terminal housing and the traffic signal housing. The single unit housing is more durable to high velocity winds, as the terminal housing and signal heads are removed from the structural load path of the system. Utilizing the single unit housing with a central continuous load path instead of an interrupted circuitous load path, (as found in traditional traffic signals) can provide better structural integrity.

The single unit housing provides a more efficient routing of signal wiring and access for same. The improved electrical wire routing reduces the stresses the cabling experiences with age by allowing the attachments to remain in the line of flow of the conductors. Containing the electrical wiring within a single unit housing can help mitigate the risk of breaking electrical connections, thereby minimizing operational problems with signalization.

In the present invention, the terminal housing, whether provided separately or contained within a single unit housing, can primarily provide a weather proof housing for electrical components and connections of traffic signals rather than provide a means for structural loading. For example, instead of using the terminal housing to support the traffic signal by requiring multiple linear load paths, the single unit housing can decrease the likelihood of structural failure that can be caused by interrupting the floor of the terminal housing to accept removable hubs attached to traffic signals. Breakage as commonly occurs with traditional traffic signals, especially at the cantilevered shelf area of the disconnect box, during high wind events is totally eliminated.

In an embodiment of the invention depicted in FIG. 42, the complete traffic signal hanger system comprises the following: An upper connection device 686 mechanically connected to an existing hanger extension 622. The existing hanger is connected to a span wire saddle clamp 631, which is mechanically connected to the upper-load-bearing span wire 630. The existing hanger extension 622 and clamp 631 can be connected by a clevis pin 689 on an axis 90 degrees in plane to the upper and lower span wires 630 and secured to the span wire clamp 631 with a cotter pin 690. The clevis pin 689 is positioned perpendicular to the described span wires 630 and can have limited, if any, movement. The clevis pin 689 can function to support the hanger extension 622 below in a fixed position. The upper connection device 686 is mechanically connected to the continuous hanger 616 below using a pivot pin 688, which is parallel to the upper and lower span wires 630 allowing for rotational movement of the traffic control assembly 620 in a direction approximately 90 degrees to the span wires 630.

The present invention's hanger system can accept commonly used single and dual span (upper and lower) wire vertical hangers such as tether cables, rigid flat aluminum hangers, and pipe hangers. In an embodiment of the invention, the preferred span wire hanger system is the pivotal assembly as described. The continuous hanger 616 is connected to a second lower span wire by the tether clamp assembly 625. The tether clamp assembly 625 can be used to capture the span wire and secure the span wire to the lower connection device. The tether clamp assembly can comprise a u-bolt, a grooved boss integral to the hanger, another grooved boss, and appropriate washers, nuts, and fasteners 636. The span wire is captured between both grooved bosses and secured by a u-bolt placed through the second grooved boss, through the apertures within the hanger and then over the integral boss. The u-bolt is secured by appropriate washers, nuts, and fasteners 636 to complete the attachment of the hanger's lower connection device 684 to the lower span wire 630 using the tether clamp assembly 625.

The hanger support plate 666 is utilized for placement and additional stability for the terminal housing 617. The square tubular portion 654 is designed to accept the housing's support channel type flange (not shown). The hanger's round tubular portion 656 is designed to accept the traffic signal housing 618. Also shown is the hanger support shoe 685 which can be used during the placement of the hanger to provide additional stability for securement of the traffic signal housing. In an embodiment of the invention, the support shoe 685 can be integral to the traffic signal housing. In some instances, the support shoe 685 is adjustable and can accept varying height assemblies. The shoe serrations, protrusions or grooves on the traffic signal housing can mate with the support shoe 685 to provide a secure attachment.

Figure 43:
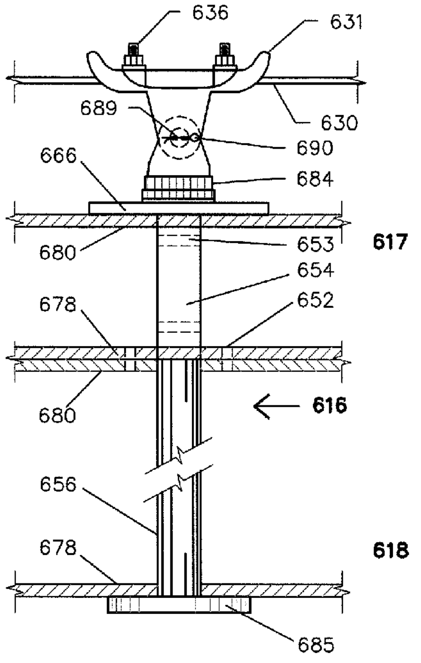
FIG. 43 shows a front view of the continuous support hanger excluding electrical component housings utilizing a single span wire installation.

FIG. 43 shows a front view of another embodiment depicting the invention's adaptability to a single span wire installation. In this application, the lower connection device 684 is modified to accept, but is not limited to accepting, a span wire saddle clamp 631 with a connecting type clevis pin secured with a cotter pin 690.

EXAMPLE 10

Figure 44:
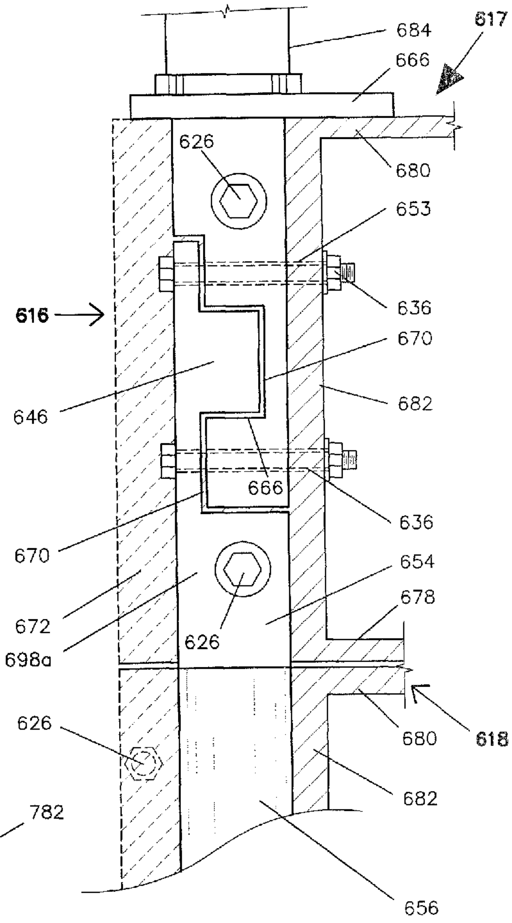
FIG. 44 shows a side view of the continuous load path hanger and housings with removable hub.

FIG. 44 illustrates a portional side view of an embodiment of a continuous load path hanger and housings with removable hub 648 depicting the connection at the terminal housing 617. In this embodiment of the invention, the removable hub 648 contains an integral solid round tubular portion 656 that is mechanically connected to the traffic signal housing 618 as previously described. This can be done prior to installing the hanger's square tubular portion. The hanger portion above is installed as previously described to the existing span or span wires as appropriate.

The terminal housing 617 is positioned and temporarily secured to the upper hanger and housing apertures 653 utilizing clamping fastener(s) 626. The hub 648, with attached signal housing 618, is lifted and easily slid into the hangers' receiving slot 670. The hub is then positioned such that the hub's vertical transverse support beam 646 is aligned so that the hub and hanger connection apertures 653 of the hanger 616 and of removable removable hub 648 can be mechanically connected using appropriate fasteners 636. The rear walls of the housing are mechanically attached by inserting the appropriate fasteners 636 and/or clamping fasteners 626 through the housing wall apertures 653 and hanger's apertures 653 and tightening as appropriate. This connection rigidifies the continuous hanger 616, the removable hub 648 and the terminal housing 617 together. In these embodiments, as well as in others of the subject invention, it may sometimes be desirable to add load spreading reinforcement plates in securing the plastic housings to the metal support system, i.e. added overlay flanges, for example, at fastener attachment points of at areas of connection of plastic to metal. At this stage the electrical connections (not shown) can be completed as previously described.

EXAMPLE 11

Figure 45:
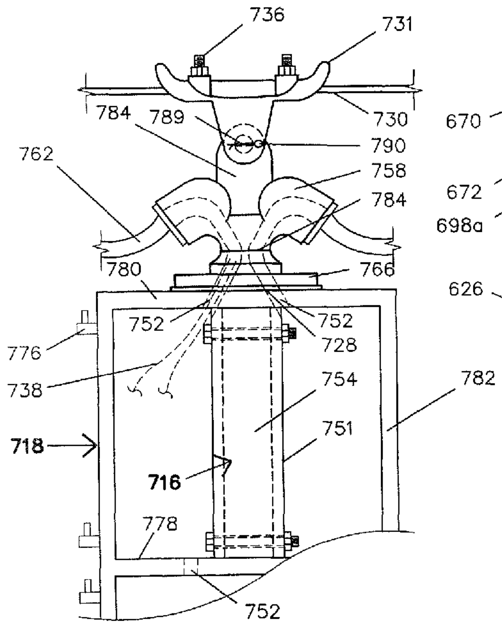
FIG. 45 shows a front view of the hanger system and the signal housing (no terminal housing) according to an embodiment of the invention.

FIG. 45 illustrates an additional embodiment of the hanger and signal housing device, wherein the terminal housing is omitted and all electrical connections are contained within the signal housing 718. The lower connection device 784 in this embodiment is adaptable to the span wire clamp 731 as previously described. The device 784 is also integral to the hanger's "gooseneck" weather-proof conductor access apertures 758 while also providing a portion of the hanger's 716 structural requirement. The hanger's sometimes round tubular portion 754 and the hanger's support flange 766 are both integral to the hanger as described above. The apertures 752, including arcuate slot 728 that mates with hanger apertures allowing final signal rotational adjustment as applicable, can provide access to electrical wiring and electrical wire routing. The installation is completed as previously described.

EXAMPLE 12

Figure 46:
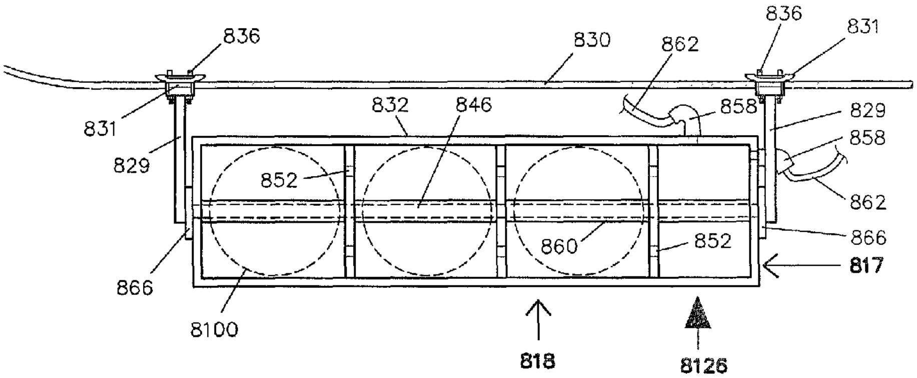
FIG. 46 shows a front view of an embodiment of the invention installed horizontally with hanger and span wire attachment device (doors omitted).

FIG. 46 illustrates an embodiment of the invention wherein the continuous load path hanger system 816 is used to horizontally install a traffic control device wherein terminal housing 817 and traffic signal housing 818 are combined in a single unit housing 8126. In an embodiment, the continuous load path hanger system comprises two vertical support flanges 829 that can be integral to the hanger's signal support flanges 866 that themselves can be integral to the transverse support beam 846. In some embodiments, the traverse support beam 846 is a solid round tubular portion and in other embodiments, the traverse support beam 846 can be square tubular or triangular tubular. The signal housing can comprise a single door or multiple doors, but the door is not shown for clarity. In some embodiments an integral backplate is also utilized.

The combined single unit housing 8126 (comprising terminal housing 817 and signal housings 818), and the electrical installation is performed generally as described above with reference to FIG. 35, FIG. 39, and FIG. 41. Wire access through mating cast supports is provided by apertures 852.

Figure 47:
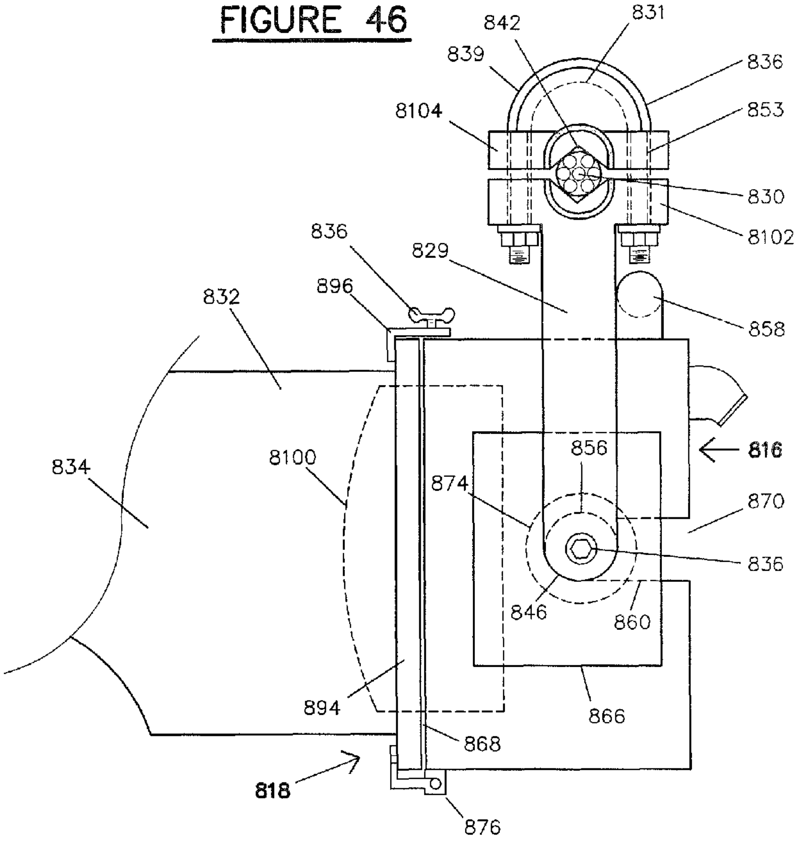
FIG. 47 shows a large side view of the hanger system according to an embodiment of the invention.

FIG. 47 shows a side compositional view of the hanger system 816 according to an embodiment of the invention. The hanger's vertical flanges 829 are integral to the lower span wire clamp portion 8102 that captures and secures the span wire 830 by mechanically attaching the upper span wire clamp portion 8104 using appropriate fasteners 836. In an embodiment of the invention, an appropriate fastener is placing a u-bolt through the apertures 853. The upper span wire clamp portion 8104 and lower span wire clamp portion 8102 each have cradle bases 842 that are also shown. The weather proof wire accesses 858 are depicted and are integral to the assembly's terminal housing 817 to provide a means to bring electrical conductors into the terminal housing 817 and signal housing 818 and a means for the conductors to exit the housings as appropriate. The receiving slot 870 is shown as a gateway to the horizontal support channel flange 860 used to secure the transverse support beam 846 and is attached as previously described with respect to FIG. 35, FIG. 39, and FIG. 41. In some embodiments, the flange 829 is mechanically connected using the appropriate fasteners 836 to secure the housings with rotational adjustments and securement over mating serrations 874. The signal's LED lighting display module 8100 is shown in phantom as a point of reference along with the traffic signal's visor 834 and door 894 with attachments such as fasteners 836, bosses with pins 876, and door latch 896.

EXAMPLE 13

Figure 48:
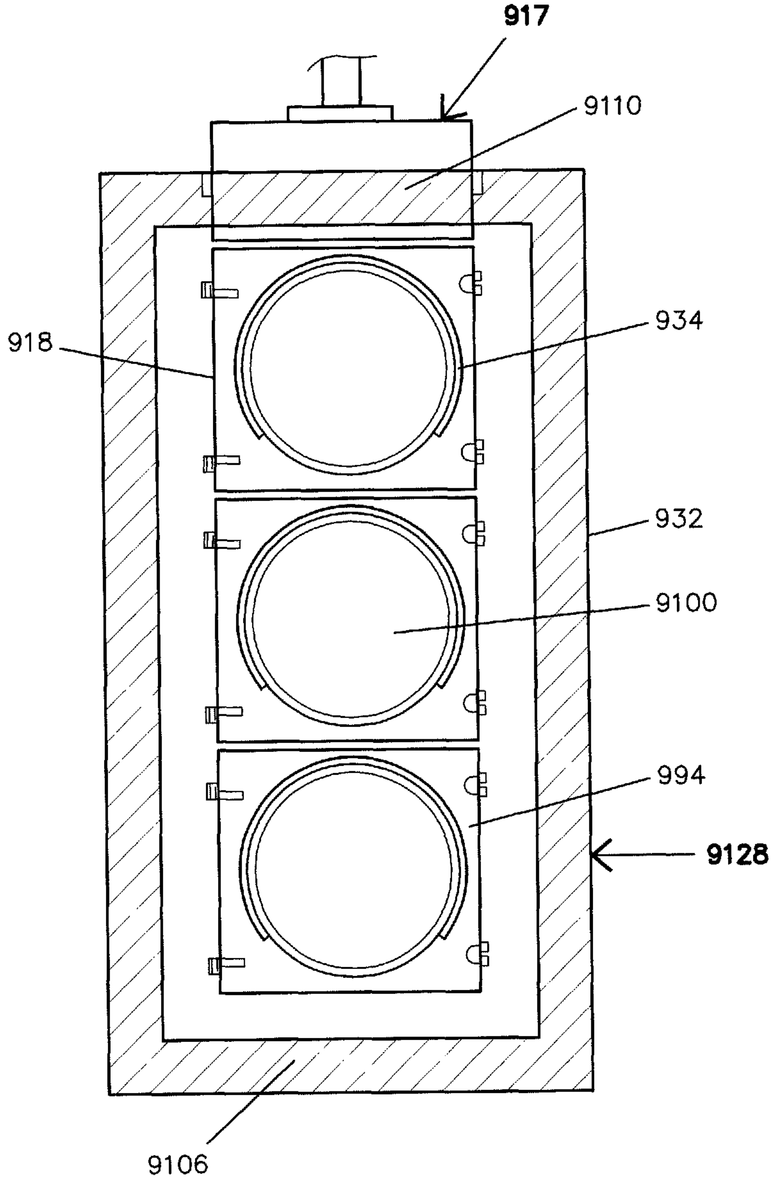
FIG. 48 shows a front view of the traffic control device that includes an integral backplate according to an embodiment of the invention.

In still another embodiment of the invention, a single unit housing 9128 can include an integral backplate along with the combined terminal housing 917 and traffic signal housing 918. FIG. 48 shows a front view of the integral backplate 9106. The integral backplate can be used to enhance the visibility of signal heads, especially backplates with retro-reflective borders, particularly at night or under low-visibility conditions. The integral backplates can also reduce crashes by improving driver awareness of traffic signals. The integral backplates can provide an uninterrupted surface for retro-reflective tape 9110.

By incorporating the backplate into the mold/manufacturing process and making the backplate integral to the signal housing, an attachment is created to the signal housings' periphery providing a structural improvement by way of a continuous connection during the manufacturing process. The integrated backplate can help reduce or eliminate stresses on attachment points to the traffic control device signal. These stresses are created from the extra wind loading produced from the increase in surface area as a result of adding a backplate. An integrated backplate eliminates the need for fasteners such as the weak, conventional, self-tapping screws to attach the backplate to the traffic control signal.

The single unit housing with integral backplate can help decrease the stresses caused by the extra wind loading due to the increase in surface area by allowing the system to shed most, if not all, horizontal wind loads. Not only is stress minimized on the traffic control device, but stress is also minimized on the signal wires, support poles, and hardware. The single unit housing with integral backplate, by incorporating the backplate into the mold/manufacturing process and making the backplate integral to the signal housing, creates an attachment to the signal housings' periphery providing a vast structural improvement by way of a continuous connection during the manufacturing process. Signal head backplates can be manufactured such that they are integral to the signal housings during the manufacturing process. For example, vacuum forming, injection molding, welding, and gluing are preferable methods of manufacturing an integral signal head backplate.

As depicted in FIG. 48, the backplate 9106, which in some embodiments receives open louvers to allow passage of air (not shown), is integral to the signal housing 918 except at the upper portion where the terminal housing 917 is located. The retro-reflective border is shown around the backplates 9106 peripheral outside edge, sized as appropriate to governmental specifications. The retro-reflective border can also, in some embodiments, continue across the terminal housings' 917 door using an appropriate retro-reflective tape 9110 to complete the border arrangement in span wire type installations.

EXAMPLE 14

Figure 49:
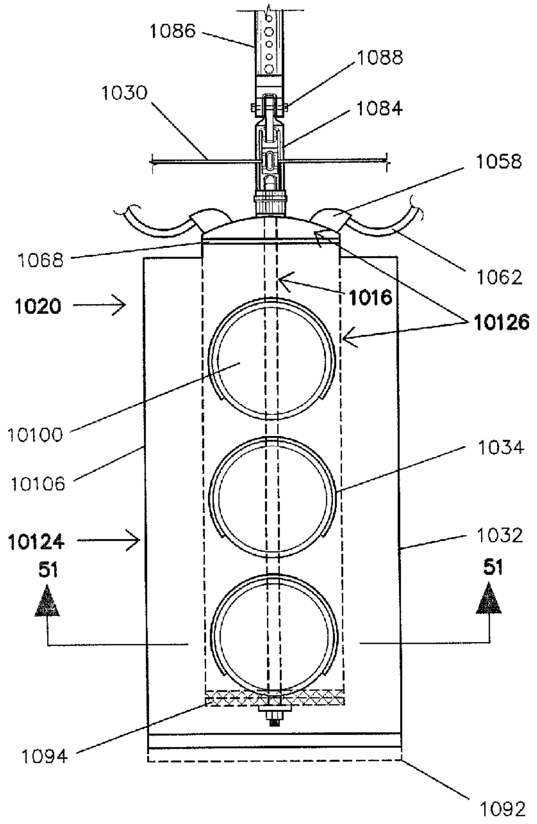
FIG. 49 shows a front view of a combined-single unit terminal housing and signal housing according to an embodiment of the invention.

FIG. 49 illustrates a front view according to yet another embodiment of the invention, a single case modular design comprising the terminal housing 1017 and signal housing 1018. The span wire attachments and lower connection device 1084 are shown in part and are substantially as previously described with respect to other embodiments. The single unit signal and terminal housing 10126 upper portion is shown with weather proof wire access 1058 and is depicted in phantom below gasketed joint 1068. The backplate 10106, as integral to the housing single unit door 10124, also provides a means for securement of the LED modules 10100, and an uninterrupted surface to add required retro-reflective tape as previously described. As a point of reference, the continuous load path hanger system 1016 is also shown in phantom in a vertical application in the traffic control device. The continuous load path hanger 1016, as previously described, is adaptable to alternative connections to existing span wire systems.

Figure 50:
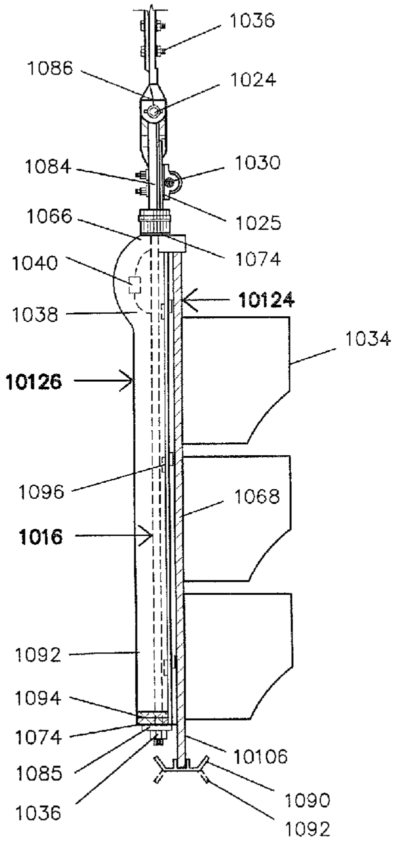
FIG. 50 shows a side view of the combination hanger, terminal and signal housings.

FIG. 50 provides a side view of the single housing's front portion 10124 and rear portion 10126. For additional weather protection, the top of 10124 is nested under 10126 and further made weather tight by utilizing compression type fasteners 1096 over the gasketed joint 1068. The pivotal hanger assembly 1024 connection can be used and is shown attached to the existing span wire 1030 as previously described with respect to other embodiments. Also as previously described, the continuous hanger system 1016 is shown in part and in phantom, and is used to mechanically secure the single unit door and backplate 10124 and the single unit signal and terminal housing 10126 by tightening the signal housing support shoe 1085 with appropriate fasteners 1036. The electrical terminal block 1040 and wiring 1038 are shown in phantom also as a point of reference along with the signal visors 1034 and backplate 10106.

Wind loading is always the main structural consideration when designing a traffic signal support system. Aerodynamic responses in general are typically classified into four different types: vortex shedding, galloping, flutter, and buffeting, all applicable to some extent to span wire signalization. When wind passes over an object, particularly a narrow object such as a traffic signal and/or a signal backplate, flow separation occurs. Alternating, and most of the time, harmful vortexes are then formed creating different lift forces on each side of the traffic signal which induces destructive resonating movements. In order to help sustain and resist harmful shock loads and fatigue related stresses, spoilers 1090 are sometimes provided along the bottom and even sometimes along the sides, and even in some embodiments around the entire periphery of the traffic control device. The spoiler 1090 is sometimes utilized to increase drag which in some embodiments will reduce or minimize torsional loads and stresses due to wind speed and direction.

In some embodiments the spoiler 1092 (shown in phantom) may preferably be positioned to deflect rather than capture as previously described spoiler 1090. The shape of the spoilers 1090, 1092 may be angular, concaved, convexed, or in some combination of angles and curvatures. In conjunction with utilizing control surface applications such as spoilers "mass balance weights" 1094 (shown in phantom) can be incorporated into the lower section of the signal assembly to resist wind induced lift by lowering the center of gravity. By increasing the weight toward the bottom of the signal and away front the point of securement 1030, 1025 the lateral force (wind) required for rotation is increased, therefore creating a beneficial resilience.

FIG. 51 shows a cross-sectional view taken along cross sectional plane 51 of FIG. 49 of an embodiment of the single unit signal and terminal housing 10126 and it's mating single unit door and backplate 10124. The single unit door and backplate can be utilized to hold the LED display modules 10100 in a fixed and appropriate position relative to the flow of traffic and vehicle movement. Also depicted is the hanger receiving tube 1057 which is integral to the single unit signal and terminal housing 10126 used in the securement of the single unit signal and terminal housing 10126 to the continuous hanger 1016 as previously described and to be more fully described with respect to FIG. 54 and FIG. 55. The rotational prevention serrations 1074 are shown in phantom as a point of reference and are generally located on the housing's exterior top and bottom, and in some horizontal embodiments, on the housing's ends. The compression operable connection of the two housings, the single unit door and backplate 10124 and the single unit signal housing, terminal housing, and backplate 10126, is provided by mating both bosses 1076, one with a pin and the other with an aperture to receive a pin. The pin is designed to allow for removal by lifting when the door 1094 is open and to prevent upper movement by the housing's 10126 upper portion when it is closed and secured with door latches 1096. This can provide weatherability for the electrical connections contained within the single unit housing.

FIG. 52 and FIG. 53 (depicting a vertical exploded and enlarged view, respectively), each show elevations of an embodiment of the continuous hanger 1016. In this embodiment, the lower connection device 1084 can be of any known type or quantity utilized in "hanging" signalization from single, dual, or three span wire installations. The installation and securement of housing to hanger 1016 is initiated by utilizing the aforementioned lower connecting device's 1084 protruding embedded stud 1087 by inserting into and through aperture 1053 in housing roof 1080. The secondary securement plate 1095 is placed over the stud 1087 adjacent to the housing interior roof 1080 portion and secured to the housing 10126 and the lower connection device's 1084 embedded stud 1087 by utilizing the serrated washer 1075 and tightening the jamb nut 1037 as appropriate. The hanger's 1016 solid round tubular portion 1056, which can be threaded, is then mated to the lower connection device 1084 stud 1087 utilizing serrated washer 1075.

In another embodiment, a "thread locker" such as "LOCTITE"™ red or blue is used before tightening to the hanger 1016 and tubular portion 1056 threaded portions utilizing the wrench receiving slot 1045 as appropriate. The rear housing 10126 (not shown) installation is completed by placing serrations 1074 of the signal housing support shoe 1085 to mate with the housing's serrations (also 1074) through shoe's 1085 aperture 1053 and securing as appropriate using fasteners 1036.

EXAMPLE 15

Figure 54:
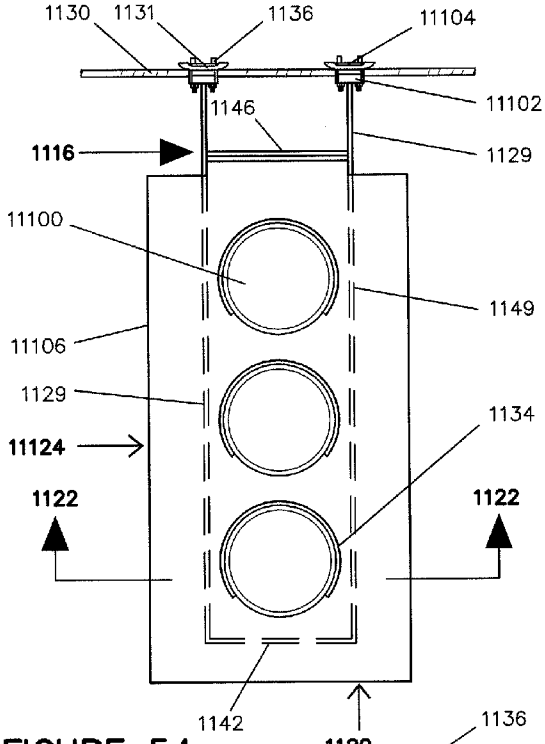
FIG. 54 shows a front view of the traffic control device according to an embodiment of the invention.
Figure 55:
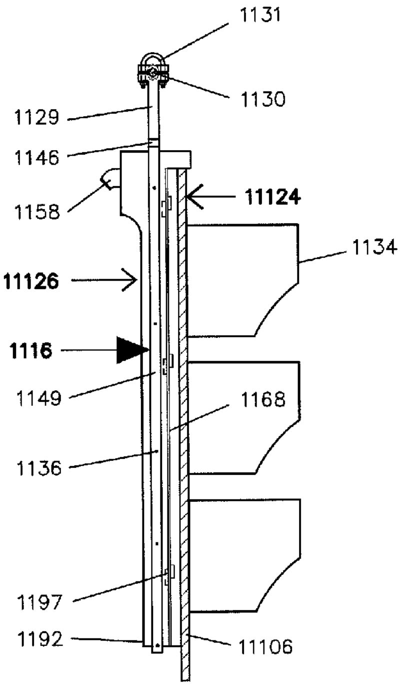
FIG. 55 shows a side view of the traffic control device.
Figure 56:
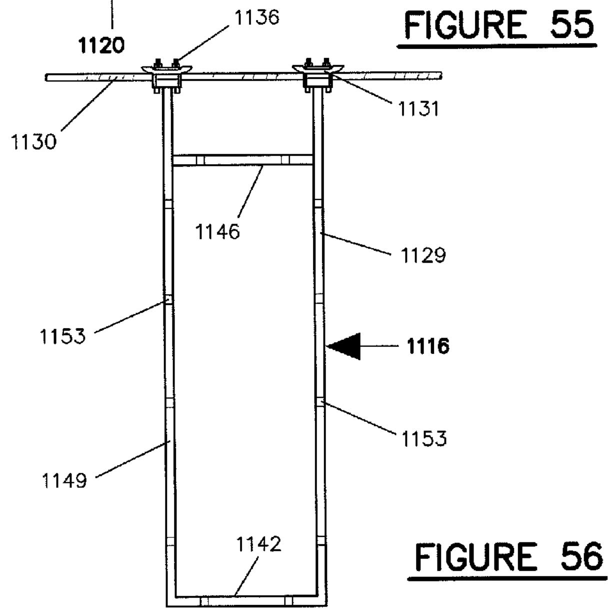
FIG. 56 shows a front view of the continuous hanger according to an embodiment of the invention.

FIG. 54, FIG. 55, and FIG. 56 illustrate another embodiment of the invention wherein the continuous load path hanger system now utilizes a continuous peripheral load path, to support a housing, and/or door and backplate assembly, also as previously described.

FIG. 54 and FIG. 55 show a front elevation and a side view, respectively, of the invention with attachments to a single span wire 1130 and comprising the continuous load path hanger 1116 that is mechanically connected to the existing span wire 1130 utilizing the clamp assembly 1131. The continuous load path hanger 1116 is shown in phantom surrounding the traffic control signal 1120.

The rectangular peripheral continuous load path hanger 1116 can provide additional load-dissipating support to the traffic control device 1120. In an embodiment, the traffic control signal's rear single unit signal and terminal housing 11126 is supported and captured between the hanger's 1116 vertical support flanges 1129, cradle base 1142, and transverse support 1146. The hanger 1116 is mechanically connected to the housing 11126 with suitable fasteners (not shown). The drawing also reveals the traffic control signal's single unit door and integral backplate 11124 utilized to secure LED lighting modules 11100. The traffic signal's visors 1134 are also shown for reference. In another embodiment, the continuous load path hanger 1116 is connected to housing 11124 front portion 1193 and then housing 11126 rear portion 1192 performs as the door to provide access as required.

FIG. 55 illustrates a side view of the present invention showing the continuous load path hanger 1116 secured to the traffic signal's rear single unit housing 11126 and span wire 1130 using span wire clamp 1131. The traffic signal's door and optional integral backplate 11124 is shown installed over the gasketed joint 1168 utilizing hinges 1197 and door latches (not shown). As a point of reference, the signals visors 1134 and backplate 11106 are shown. Other suitable means to secure housings 11124, 11126 together include through bolting, added overlay flanges, or any other appropriate fasteners 1136. Means of attachment to the hanger can be provided by fasteners 1136.

FIG. 56 shows a front view of the hanger 1116, ready for the electrical housing rear portion 1192 (not shown) installation, or in some embodiments, the electrical housing front portion 1193 installation, also not shown. The hanger 1116 is sometimes rectangular and can be connected to an existing span wire in two locations. The traffic control device of this embodiment will be vertical. Hanger 1116 comprises vertical support flanges 1129, a bottom support cradle base 1142, and the transverse support beam 1146. The traffic control signal (not shown) can be secured to the hanger 1116 utilizing the fastening apertures 1153. In some embodiments, the hanger 1116 may utilize a single point of connection to a single span wire and in other instances it may be preferable to attach to dual span wire systems as shown and/or referred to in FIG. 1, FIG. 9, FIG. 16, and FIG. 42.

FIG. 57 shows a back/interior isometric view of the door and backplate 11124. The electrical housing front portion 1193 comprises walls 1182, floor 1178, roof 1180, support beams 1146, and can also include an integral backplate 11106. The apertures 11101 are for installation of the LED light modules (not shown). Apertures 1153 utilize hanger mating apertures for attachment.

FIG. 58 shows an isometric exterior/rear view of the single unit housing 11126 that comprises a roof 1180, walls 1182, and floor 1178. The electrical housing rear portion 1192 can be reinforced using the transverse support beams 1146 and vertical flange 1151. Access for the grommetted wire access is provided with apertures 1152. In some embodiments, additional apertures 1153 are required at the roof 1180 and floor 1178 for hanger securement.

FIG. 57 and FIG. 58 illustrate a single housing unit that can include housing floors 1178, walls 1182, roofs 1180, and support beams 1146 that are designed to mate to one another creating a secure, weather-tight traffic signal housing assembly to be utilized as a traffic control device as previously described in other embodiments.

EXAMPLE 16

Figure 59:
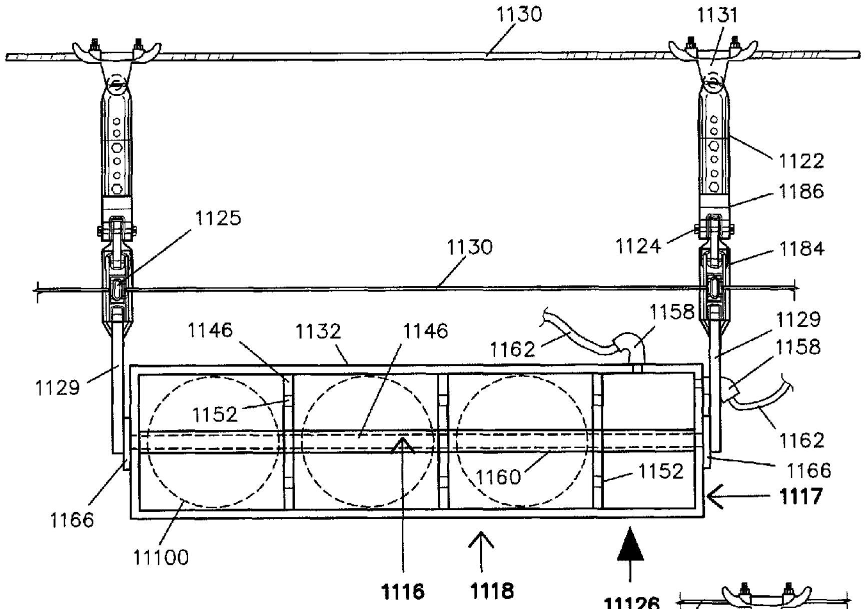
FIG. 59 shows a front view of the traffic control device installed horizontally according to an embodiment of the invention.

FIG. 59 shows an embodiment of the invention which can include a single unit housing 11126 as previously described with respect to FIG. 46. Also depicted is the hanger system adapted to a dual wire system as previously described with respect to FIG. 42. FIG. 59 depicts the internal central support configuration of a continuous load path hanger 1116 in a horizontal application. In some embodiments, it may be preferred to utilize the external, peripheral continuous load path hanger in a horizontal application, in which it can border the housing's 11126 exterior. In some embodiments, an integral backplate can be utilized as previously shown and described in FIG. 48, FIG. 49, FIG. 50, FIG. 54, FIG. 55, FIG. 57, and to be further described in FIG. 61.

EXAMPLE 17

Figure 60:
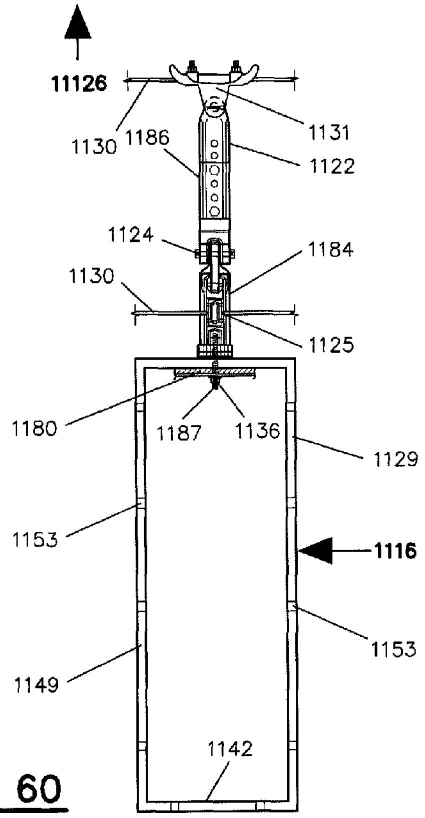
FIG. 60 shows a front view of the hanger system.

FIG. 60 illustrates yet another embodiment of the continuous hanger system 1116. As previously shown and described in FIG. 28, FIG. 29, FIG. 30, FIG. 31, FIG. 42, FIG. 53 FIG. 54, FIG. 55, and FIG. 56. In this embodiment, the hanger system is adapted to a dual span wire support system as previously described. The hanger's lower device 1184 is connectable to the support frame 1149 and housing's roof 1180 (shown in part for reference) mechanically secured together using embedded stud 1187 and fasteners 1136. The traffic control device is secured to the hanger frame 1149 utilizing appropriate fasteners through apertures 1153.

EXAMPLE 18

Figure 61:
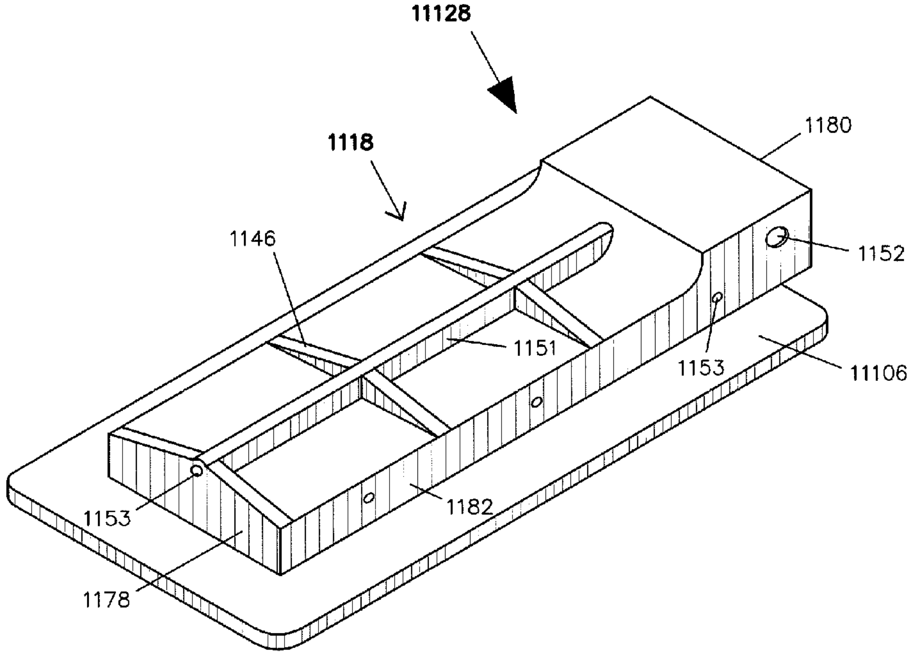
FIG. 61 shows an isometric view of the traffic control device single unit housing with integral backplate.

FIG. 61 shows an isometric view of the single unit housing 11128 comprising a traffic signal housing 1118, roof 1180, walls 1182, and floor 1178. Additional support can incorporate transverse beams 1146 and/or a vertical flange 1151. Apertures 1153, sometimes mating, provide access for fasteners to attach traffic signal housing 1118 to the hanger system (not shown). The integral backplate 11106 completes this embodiment of a basic element of the single unit signal and terminal housing and backplate 11128. Access for electrical components and securement of LED modules is provided. Front access for electrical components and securement of lighting modules can be provided as previously described and shown in FIG. 14, FIG. 23, FIG. 28, FIG. 29, FIG. 30, FIG. 32, FIG. 33, FIG. 34, FIG. 37, FIG. 38, FIG. 40, and FIG. 48.

EXAMPLE 19

Figure 62:
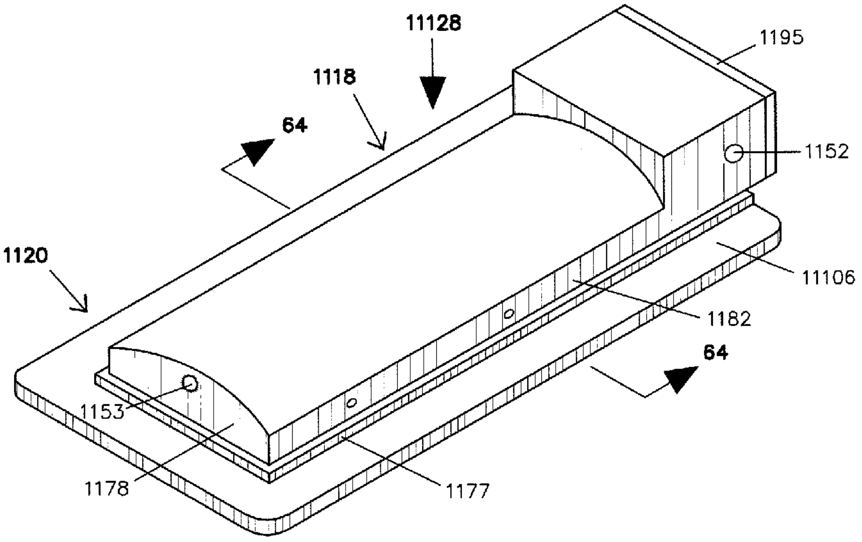
FIG. 62 shows an isometric view of the single unit housing without external support flanges.

FIG. 62 shows an isometric view of the single unit housing as previously described in FIG. 61, except that the support beams are now internal to the single unit housing, and a secondary support and securement plate 1195 is also shown, which can be utilized in some embodiments of the invention.

Figure 63:
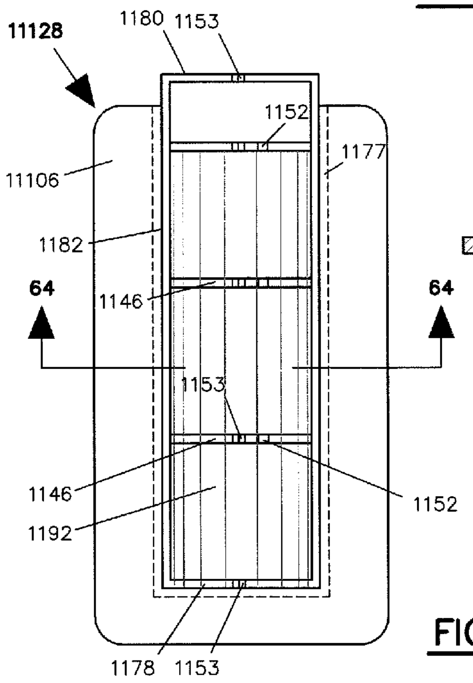
FIG. 63 shows a front view of the single unit housing with internal support flanges (Door and cover omitted for clarity) according to an embodiment of the invention.

FIG. 63 shows a front view of the single unit signal and terminal housing and backplate 11128. The support flanges 1146 now internal are shown adjacent to the rear portion 1192 of the housing's walls 1182. Attachment and support for the backplate 11106 is provided by connection flange 1177 (shown in phantom) that is adjacent to the housing's 1118 walls 1182 and floor 1178. The housing's roof 1180 is shown without the support plate 1195. Apertures for securement and wire access 1152, 1153 are also shown.

Figure 64:
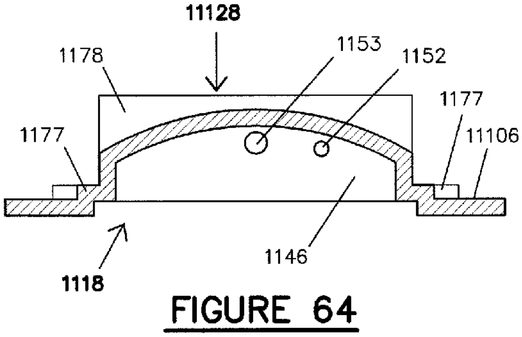
FIG. 64 shows a cross sectional view of the single unit housing taken along cross sectional plane 64 of both FIG. 62 and FIG. 63.

FIG. 64 shows a cross sectional view of the housing 1118, transverse support beams 1146 and the traffic signal backplates 11106, taken across cross sectional plane 64 of FIG. 62. The support flanges 1146 and backplate 11106 can be integral to the manufacturing process as part of a single mold, but it can also be part of the manufacturing process to produce the backplate 11106 or support beams 1146 separately and incorporate it by any suitable means such as ultrasonic welding and/or solvent welding glues, or any other means to achieve the proper connection strength. Also shown is the attachment/connection flange 1177. When it is preferred to attach the backplate 11106 post forming, then in those embodiments flange 1177 portion (shown in phantom) can be enlarged to provide a larger attachment surface, and is integral to the housing 1118.

Figure 65:
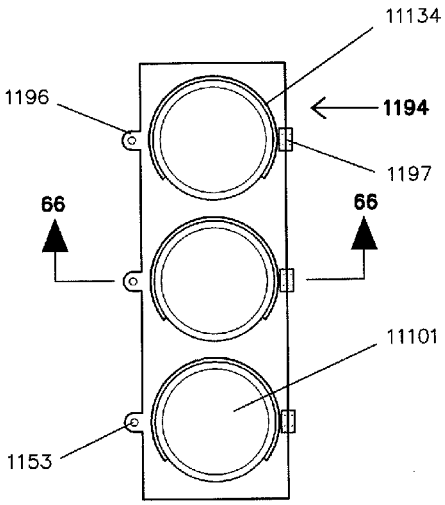
FIG. 65 shows a front view of the door according to an embodiment of the invention.

FIG. 65 shows a front view of the door 1194. The door 1194 provides a means to display and secure the traffic control device's LED modules and also provides weather-proof access to the housing (not shown) by incorporating one or more gasketed joints as previously described. The hinges 1197 can be attached to the door and housing utilizing any proper means such as welding, gluing, or even mechanical fasteners, such as by machine screws into threaded inserts, or as part of the manufacturing process including injection molding. The door's operational securement latches 1196 can be secured by placing "thumb bolts" through the apertures 1153 and into threaded inserts (not shown). Apertures 11101 for the LED modules are shown along with the traffic signal visors 1134.

Figure 66:
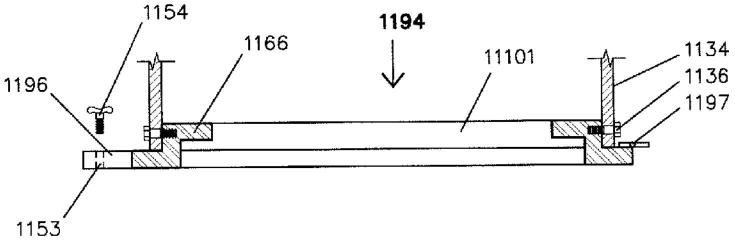
FIG. 66 shows a cross sectional view taken along cross sectional plane 66 of FIG. 65.

FIG. 66 illustrates a cross sectional view taken along cross sectional plane 66 of FIG. 65. The door 1194, when not providing access to the signal housing (not shown), can be attached by inserting the thumb bolt 1154 through the flange 1196 and into the housing's threaded boss (not shown). The thumb bolt 1154 is then tightened over the gasketed joint (also not shown, but is described and shown in future figures.)

Hinge 1197 can be welded or mechanically fastened to the door 1194 and is shown for reference.

Traffic signal visors can be very susceptible to wind damage. An embodiment of the invention can provide a means of attachment using fasteners 1136 that utilize a strong sheer type connection through the visor 1134 wall aperture 1153 without relying on small-weak attachment tabs. The fasteners 1136 are used to secure the visor 1134 by tightening into the doors 1194 threaded bosses 1144.

Figure 67:
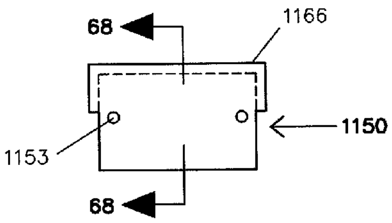
FIG. 67 shows a front view of the upper cover at main terminal portion according to an embodiment of the invention.

FIG. 67 illustrates the terminal's removable front cover portion 1150 that provides access to the traffic control device's primary connections between the LED modules and the main conductors from the controller. The front cover 1150 is on the same surface plane as the backplate, thereby allowing for an uninterrupted backplate and/or border applicable to span wire signalization; particularly advantageous to wind loading. The support flange 1166 also provides a weatherproofing edge along the top and sides as applicable to the plane of the door and backplate. Apertures for attachment to the housing's threaded boss (not shown) are also provided for appropriate fasteners, which preferably are flat head countersunk machine screws.

Figure 68:
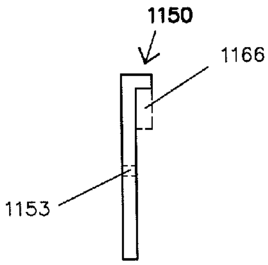
FIG. 68 shows a cross section view taken along cross sectional plane 68 of FIG. 67.

FIG. 68 shows a sectional view taken along cross-sectional plane 68 of FIG. 67 of the cover 1150 and support flange 1166 beyond (dash lines).

Figure 69:
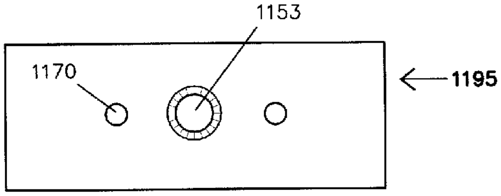
FIG. 69 shows a top view of the securement plate according to an embodiment of the invention.

FIG. 69 illustrates a top view of the secondary securement plate 1195. The secondary securement plate 1195, in some embodiments, can be required to reinforce the housing's roof to accept a serrated boss type flange. The secondary securement plate 1195 can be incorporated into the forming process, but can require separate fabrication. The attachment can then be performed as previously described as part of the manufacturing process. The receiving slot 1170 creates a shelf to allow a fixed positioned serrated boss to be positioned over the aperture 1153 to accept the hanger hardware as previously described.

Figure 70:
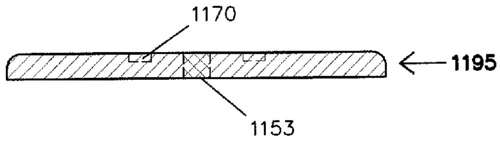
FIG. 70 shows a side view of securement plate.

FIG. 70 shows a side view of the secondary securement plate 1195 including the receiving shelf 1170 and aperture 1153.

EXAMPLE 20

Figure 71:
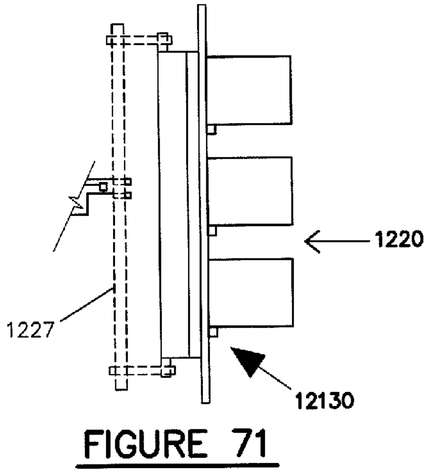
FIG. 71 shows a side view of the single unit signal housing and backplate adaptable to steel mast arm supports.

FIG. 71 illustrates another embodiment of the single unit housing and integral backplate 12130 adapted to a conventional mast arm bracket 1227 and including a central load path support structure.

Figure 72:
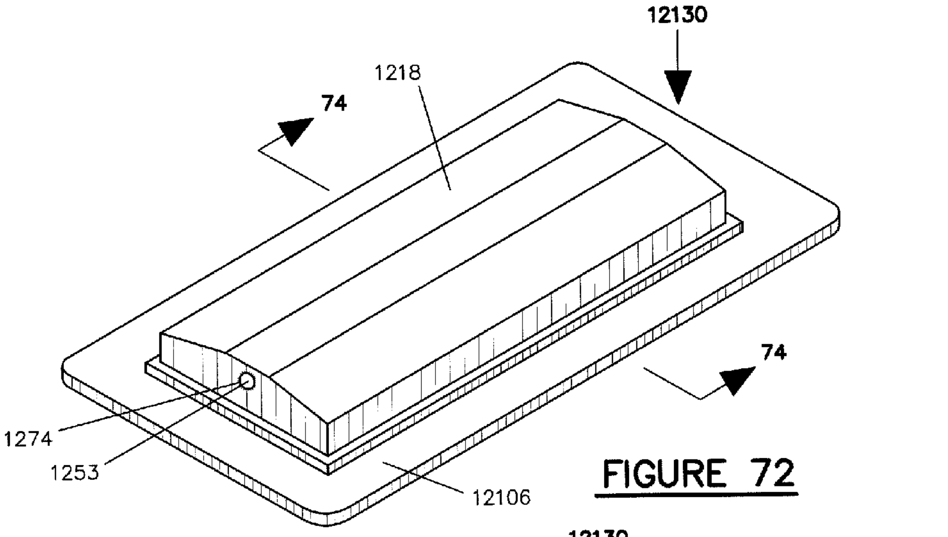
FIG. 72 shows an isometric rear view of the single unit housing with integral backplate.

FIG. 72 illustrates a rear isometric view of the single unit housing and backplate 12130. A means for attachment to rigid mounting brackets is provided by apertures 1253 and serrations 1274 to accommodate conventional span wire and mast arm bracket fasteners such as a tri-stud and pipe-type connections.

Figure 73:
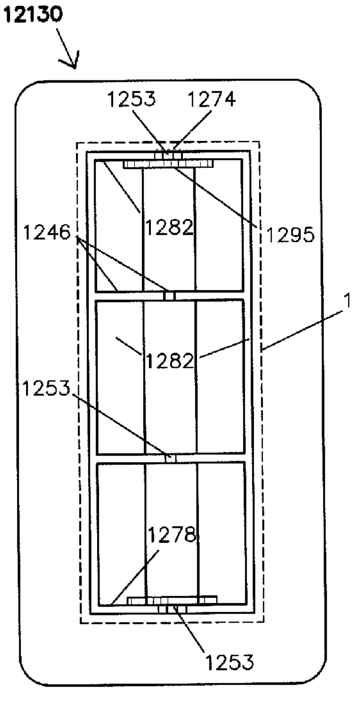
FIG. 73 shows a front view of the single unit housing and integral backplate without the door.

FIG. 73 shows a frontal view of the single unit signal housing and backplate 12130 without the door for clarity. The attachment serrations 1274 (shown in phantom) and apertures 1253 are adaptable to receive conventional hangers such as span wire, pole, and mast arm mounting brackets. In some embodiments, it may be preferable to add or incorporate into the manufacturing process securement plates 1295 for increased rigidity. The housing's support beams 1246 are shown adjacent to the housing's walls 1282.

Figure 74:
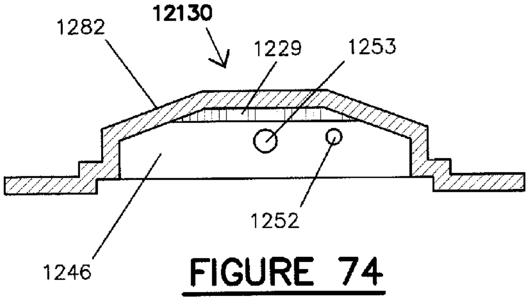
FIG. 74 shows a cross sectional view taken along cross sectional plane 74 of FIG. 72.

FIG. 74 shows a sectional view taken along cross sectional plane 74 of FIG. 72 showing transverse support beam 1246. In this embodiment the housing's 12130 rear wall 1282 is continuous and can include additional support flange 1229.

EXAMPLE 21

Figure 75:
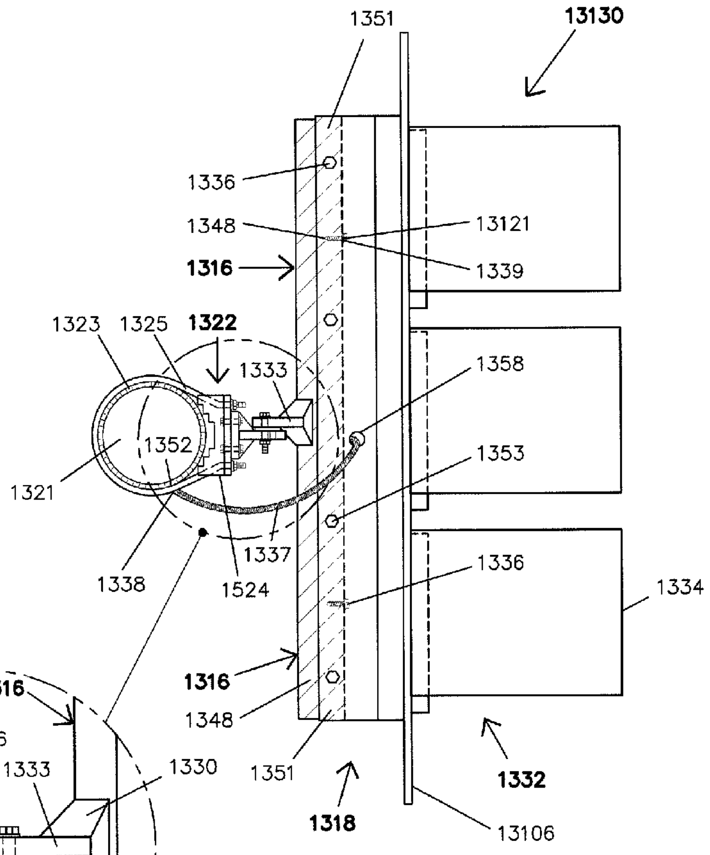
FIG. 75 shows a side view of the hanger and signal housing assembly according to an embodiment of the invention.

FIG. 75 illustrates a side elevation view according to a still further embodiment of the continuous load path hanger 1316 with the single unit signal housing and backplate 13130. The hanger's 1316 support flange 1333 is mechanically connected to the mast arm clamp 1322. The hanger 1316 is mutual and adaptable to the traffic signal housing portion 1318 by utilizing the housing's support channel attachment flange 1351 that is shown in greater detail in FIG. 82, FIG. 83 and FIG. 84. The hanger 1316 and support channel 1351 have apertures 1353 that are aligned to accept through fasteners 1336 and opposing bolts 13121 through washers 1339 into threaded apertures 1344.

In some embodiments, washers 1339 can be elongated or rectangular. Washers 1339 having an increased thickness can add more reinforced surface pressures. The weatherproof electrical conduit 1337, and the grommetted wire access 1358, provide access for the traffic control device's electrical conductors.

Figure 75A:
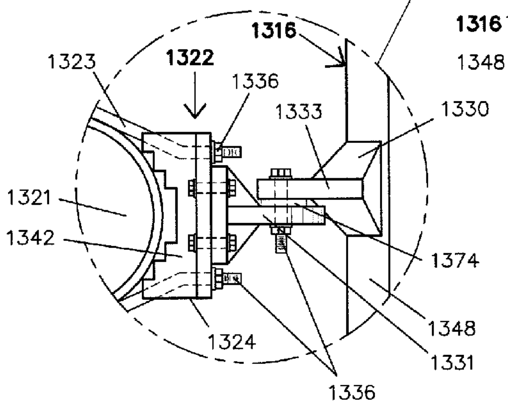
FIG. 75A shows a larger “bubble portion” of the embodiment of the invention shown in FIG. 75.
Figure 76:
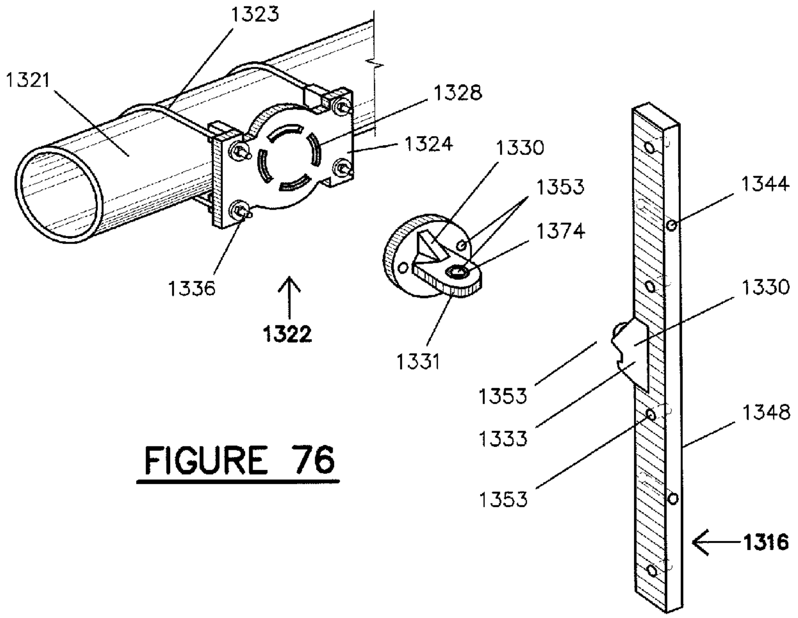
FIG. 76 shows an isometric view of the means of adjustments for skewed intersections according to an embodiment of the invention.

FIG. 75A is a larger "bubbled" portion as depicted in FIG. 75. The mast arm clamp 1322 is mechanically connected to the mast arm 1321 utilizing a conventional cable strap 1323. In another embodiment, a flat band can be utilized. The conventional cable 1323 wraps around the arm 1321 and is inserted into the saddle flange 1324 apertures. The conventional cable 1323 is then tightened with fasteners 1336 to secure the saddle flanges 1324 serrated cradle base 1342 to the mast arm 1321 at the desired axis. The desired axis can be perpendicular to the street or roadway below. In FIG. 76, the arcuate slots 1328, support flanges 1331, serrations 1374 and reinforcement gussets 1330 are shown for reference.

FIG. 76 shows an isometric exploded view of an embodiment of the invention providing a means of adjustment for skewed and off angled intersection arrangements as previously described in FIG. 75 and FIG. 75A. The mast arm clamp 1322 can be installed as previously described at a perpendicular angle such that the traffic traveling below can view the traffic control signal appropriately. The components of the traffic control signal, according to an embodiment of the invention, are adjustable and sometimes require adjustment as appropriate. The center support flange 1331 is shown along with the top portion of the reinforcement gusset 1330 apertures. The center support flange 1331 vertical apertures 1353 can be utilized for securement over the serrations 1374 for lateral adjustments. Flange 1331 horizontal apertures 1353 are utilized for rotational attachment to claim 1322. The hanger 1316 is shown with its integral support flange 1333 along with apertures 1353 for securement of flanges to each other and attachment of the one-piece signal housing (not shown).

Figure 77:
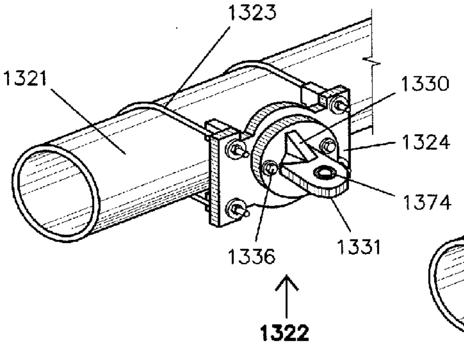
FIG. 77 shows an isometric view of the center flange attached to the main mast arm connection.

FIG. 77 shows an isometric view of the center connection flange 1331 attached to the previously installed mast arm clamp 1322. The support flange 1331 is placed over the saddle flanges 1324 and the arcuate slots 1328 and secured by placing fasteners (not shown in the FIG. 77) through the apertures 1353, after proper vertical positioning that is appropriate to the roadway below.

Figure 78:
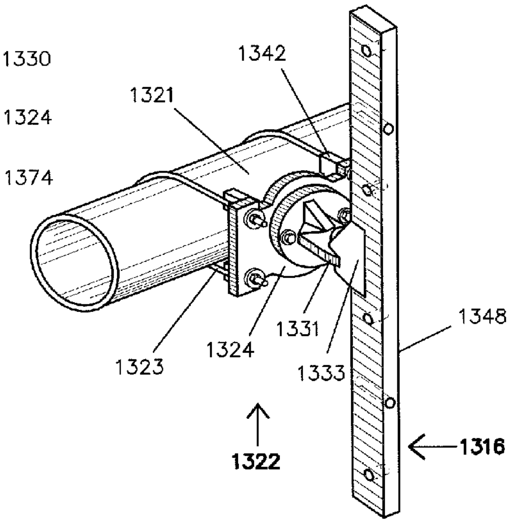
FIG. 78 shows an isometric view of parts of FIG. 76 and FIG. 77 assembled.

FIG. 78 illustrates an isometric view of the assembled components shown in the exploded view of FIG. 75. The hanger 1316 traffic signal support flange 1348 with integral support flange 1333 is attached to the center support flange 1331. The center support flange 1331 is mechanically connected to the mast arm clamp 1322. The mast arm clamp is also mechanically connected to a protruding mast arm 1321 as previously described.

EXAMPLE 22

Figure 79:
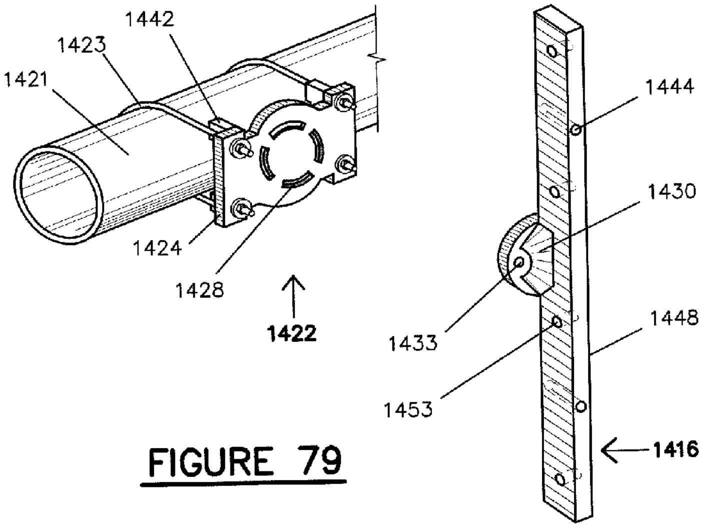
FIG. 79 shows an isometric view, exploded in portion, of the hanger according to an embodiment of the invention.

FIG. 79 shows an isometric exploded view according to yet another embodiment of the invention and comprises the mast arm clamp 1422 and hanger 1416. This embodiment is appropriate for 90 degree intersections where horizontal aiming and/or adjustments of the traffic control device is not required.

Figure 80:
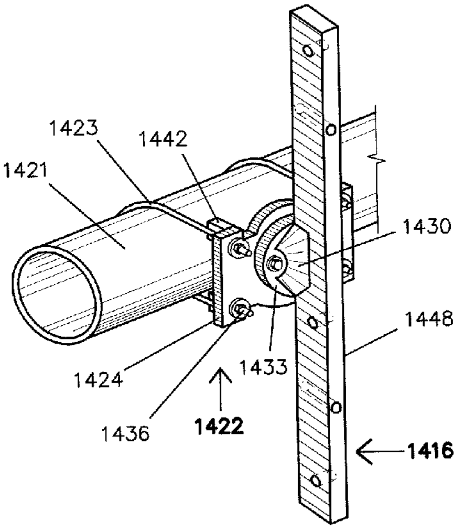
FIG. 80 shows an isometric view the hanger assembled according to an embodiment of the invention.

FIG. 80 illustrates the assembled portion of the clamp 1422 and hanger 1416.

Figure 81:
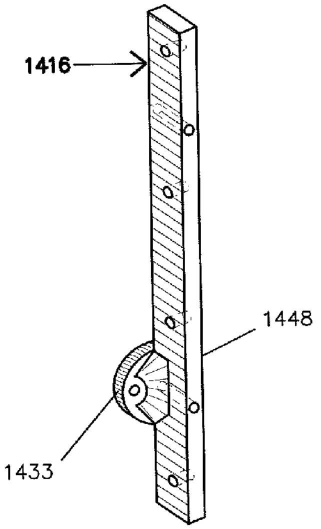
FIG. 81 shows an isometric view of the hanger’s adjustment offset hanger.

FIG. 81 illustrates an embodiment of the invention including the hanger 1416 with its integral support flange 1433 positioned to allow vertical height adjustments in a range of 25% to 75%. This hanger-traffic signals support flange 1448 can be utilized when the road clearance is greater than or less than the standard center mount procedure. For example, if additional height is required, the hanger 1416 can be utilized as shown. Conversely, if a lower installation is desired, the hanger can be inverted.

FIG. 82 illustrates an isometric view of a single piece traffic signal housing and backplate 14130. The housing's support channel attachment flange(s) 1451 is shown with apertures 1453 for attachment to a mutual hanger (not shown), for example, such as previously described and shown in FIG. 79. The connection flange 1477 is integral to the housing 1418 and can be utilized to support the backplate 14106. The backplate 14106 can also be attached to the connection flange 1477 as part of the manufacturing process. The manufacturing process can affix the backplate 14106 to the connection flange 1477 through methods that include but are not limited to thermoforming, gluing, or ultrasonic welding.

FIG. 83 shows a cross sectional view taken along cross sectional plane 83 of FIG. 82 and illustrates the traffic signal housing 1418 attached to a continuous hanger 1416, as previously described. The traffic signal support flange 1448 is inserted into the housing's support channel attachment flange 1451 and fastened with through fasteners 1436 and placing opposing bolt 14121 over the washer 1439, also previously described. The backplate 14106 connection flange 1477 is shown with extensions (shown in phantom) for additional reinforcement or attachment surface area if required. The gasketed joint 1468 can be used to weatherproof the connection of the door (not shown but previously described) to the housing 1418.

FIG. 84 shows a front view of the novel signal housing 1418 (door omitted) which can include the integral backplate 14106. In some instances it may be advantageous not to have the backplate integrated into the signal housing 1418 as a single unit and therefore optionally can be deleted from the manufacturing process. The housing's 1418 integral support beams 1446 are shown utilized to transverse some of the wind imparted loading. The grommetted wire access 1458 is shown for electrical wiring 1438 connected to the terminal block 1440.

EXAMPLE 23

Figure 85A:
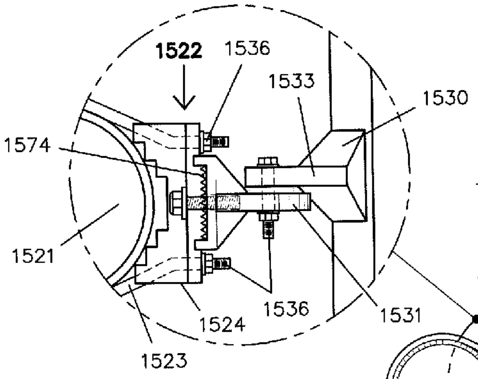
FIG. 85A shows a larger “bubble portion” of the embodiment shown in FIG. 85.
Figure 85:
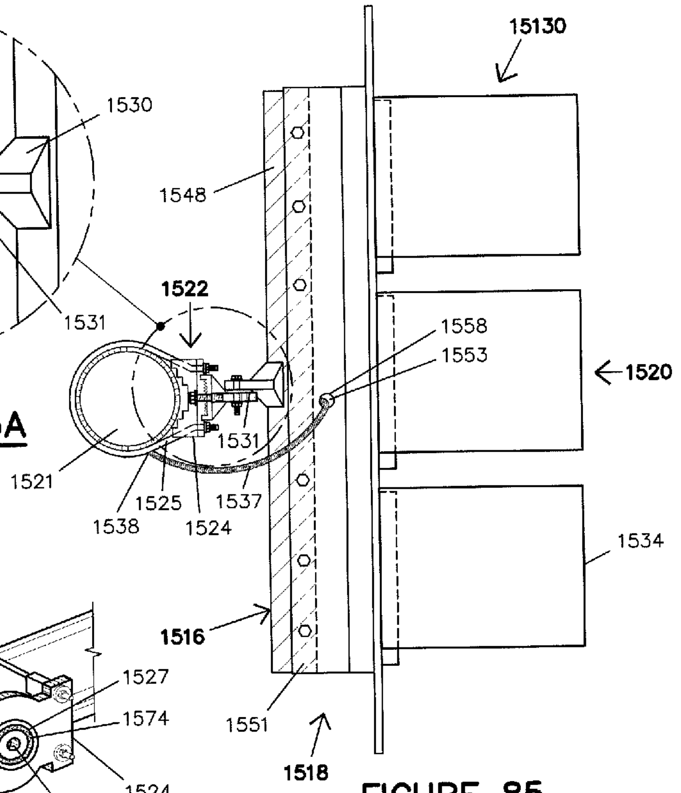
FIG. 85 shows a side view of an alternate means of vertical rotational adjustments according to an embodiment of the invention.

FIG. 85 illustrates a side view of an additional embodiment of the invention and reveals an alternative means for vertical rotational adjustments. The traffic control signal 1520 can comprise the hanger 1516, the single unit housing and backplate 15130. This embodiment of the invention is generally directed to the center support flange 1531 and the saddle flange 1524. All other aspects are as previously described in Example 22.

FIG. 85A illustrates a larger bubble portion of FIG. 85 for reference. This embodiment is primarily directed to the mating serrations 1574 and comprises a means of connecting the mast arm clamp 1522 to the center support flange 1531 which is connected to the hanger support flange 1533. This assembly is more fully described and shown in FIG. 86, FIG. 87, FIG. 88, and FIG. 89.

Figure 86:
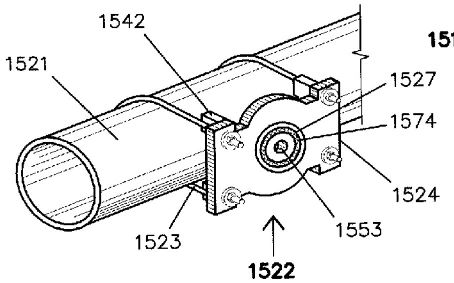
FIG. 86 shows an isometric view of the saddle flange attached to an existing mast arm.

FIG. 86 shows an isometric view of the saddle flange 1524 attached to an existing mast arm 1521.

Figure 87:
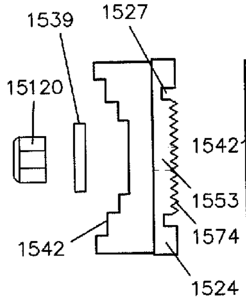
FIG. 87 shows a side view of the saddle flange.

FIG. 87 shows a side view of the saddle flange 1524 revealing the tooth-like projections of the cradle base 1542 that secure the saddle flange 1524 in a fixed rotational position after tightening attachment cables (not shown) as previously described. The saddle flange's alignment slot 1527 can receive the center flange's (1531 of FIG. 89) alignment protrusion (1526 of FIG. 89). Rotational adjustment and securement can be provided by mating the saddle flange 1524 serrations 1574 with the mutual serrations 1574 after proper alignment is achieved with center flange (1531 of FIG. 89).

Figure 88:
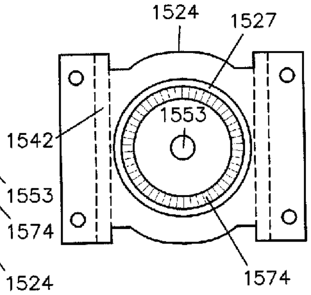
FIG. 88 shows a frontal view of the saddle flange.

FIG. 88 shows a front view of the previously described saddle flange 1524 of FIG. 85, FIG. 86, and FIG. 87. The cradle base 1542 is shown in phantom for reference.

Figure 89:
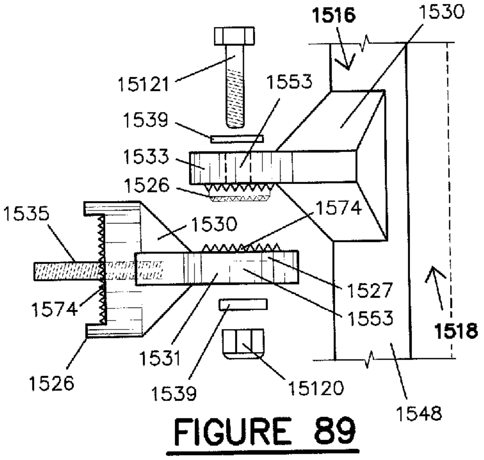
FIG. 89 shows a portional exploded side view of the multiple axis’s support members.

FIG. 89 illustrates a portional exploded side view of the center flange 1531 and the hanger's 1516 support flange 1533. The flange 1531 embedded stud 1535 can be utilized for securement of the flange 1531 to the saddle clamp 1524 as previously described. A bolt 15121 and washer 1539 can also be utilized by placing the bolt 15121 through the apertures 1553 and securing it with the washer 1539 and stay nut 15120 as shown in FIG. 86, FIG. 87, and FIG. 88. The adjustable attachment of the center flange 1531 to the hanger flange 1533 begins by placing the hanger flange's alignment protrusion 1526 into the center flange alignment slot 1527. After determining the proper rotation alignment, the mutual serrations and mating serrations 1574 are brought together and secured to each other by placing a bolt 15121 through washers 1539 and the apertures 1553. The assembly is tightened as appropriate using a stay nut 15120.

EXAMPLE 24

Figure 90:
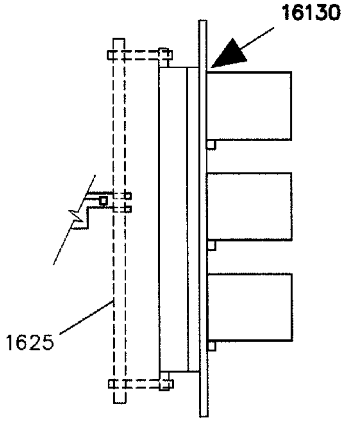
FIG. 90 shows a side view of the single unit signal housing and backplate utilized in a conventional rigid application such as steel mast arm supports according to an embodiment of the invention.

FIG. 90 illustrates the single housing unit and integral backplate 16130 according to a still further embodiment of the invention adapted to a conventional mast arm bracket 1625.

Figure 91:
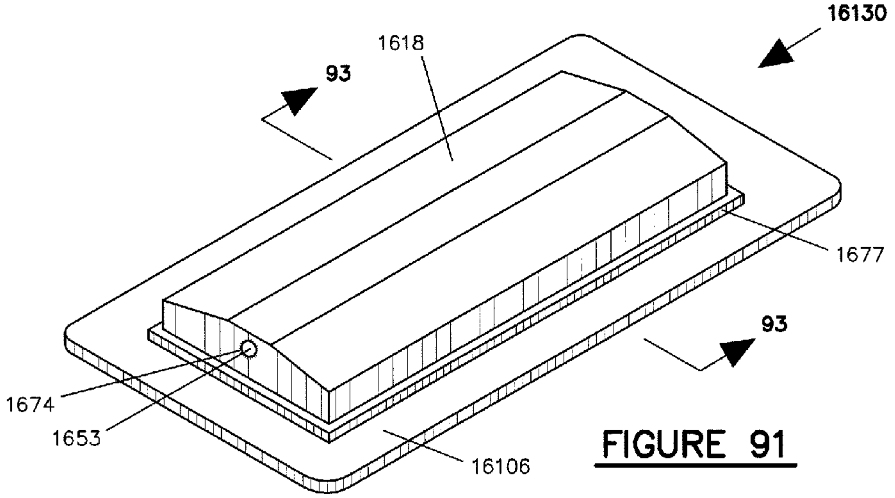
FIG. 91 shows an isometric rear view of the single unit with integral backplate according to an embodiment of the invention.

FIG. 91 illustrates a rear isometric view of the single unit housing and backplate 16130. A means for attachment to rigid type mounting brackets is provided by apertures 1653 and serrations 1674 to accommodate conventional span wire and mast arm bracket fasteners. Conventional span wire and mast arm bracket fasteners include, but are not limited to, tri-stud and pipe type connections utilizing conventional arms on the top and bottom or each end of a traffic control device, as appropriate.

Figure 92:
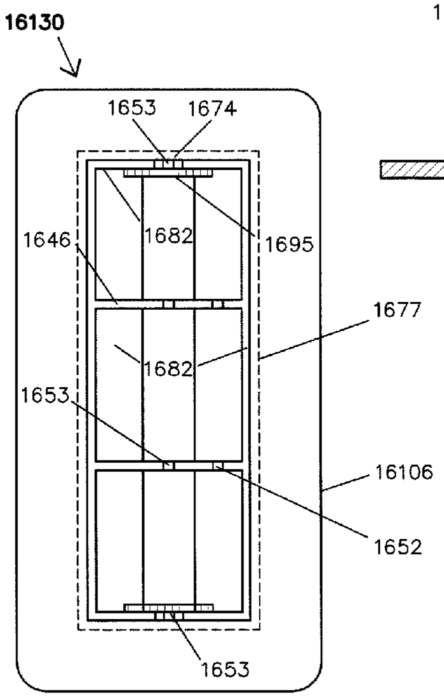
FIG. 92 shows a front view of an embodiment of the invention, without the door, revealing the structural features.

FIG. 92 shows a front view of an embodiment of the invention 16130 without the door for clarity. The attachment serrations 1674 and apertures 1653 are adaptable to receive conventional hangers such as span wire, poles and mast arm mounting brackets. In some embodiments, it may be preferred to add or incorporate securement plates 1695 into the manufacturing process for increased rigidity. The housing's support beams 1646 are shown adjacent to the housings walls 1682.

Figure 93:
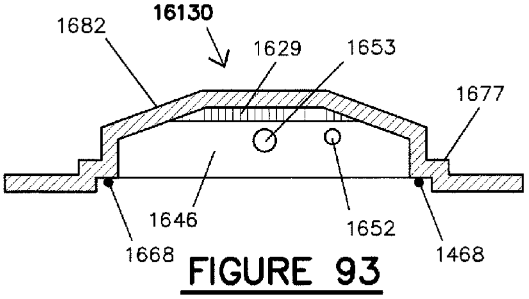
FIG. 93 shows a cross sectional view taken along cross sectional plane 93 of FIG. 91.

FIG. 93 illustrates a sectional view taken along cross sectional plane 93 of FIG. 91 as previously described, however, in this embodiment, the housing's rear wall 1682 is continuous and can include an additional support flange 1629.

EXAMPLE 25

Figure 94:
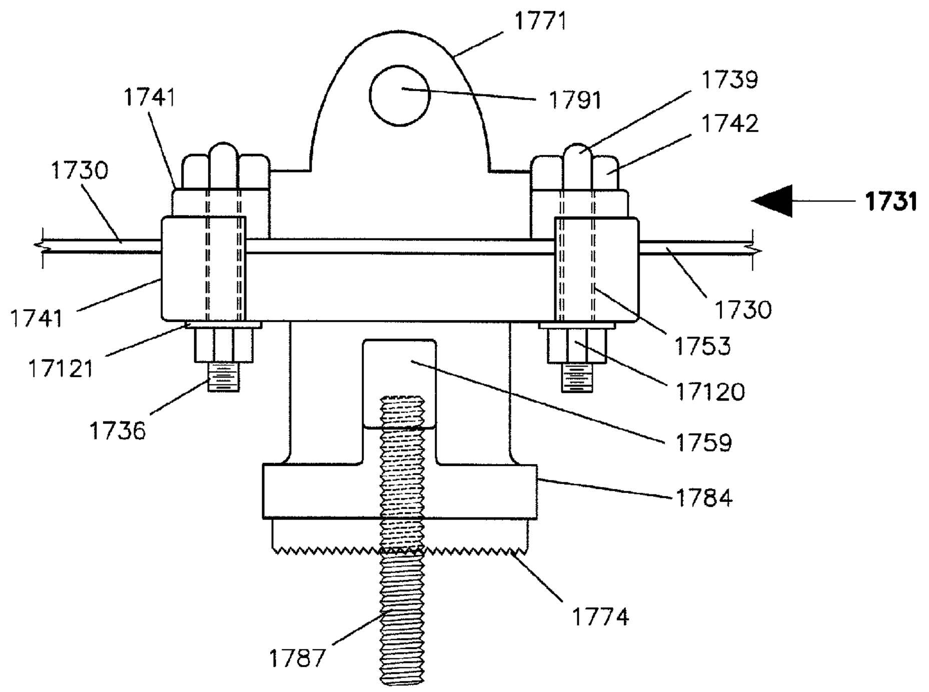
FIG. 94 shows a front view of the span wire clamp and hanger device according to an embodiment of the invention.

FIG. 94 represents a front view of another embodiment of the span wire saddle clamp and hanger device 1731. This device provides a rigid surface connection area increase of over 10 times greater than conventional span wire clamps and helps reduce potentially harmful orbital movement of the traffic signal by eliminating the commonly used below-the-span-wire clevis pin connection and providing an increased lateral connection to the span wire.

The span wire clamp 1731 top and bottom saddle flanges 1741 are continuous across the entire span wire 1730. Conventional span wire clamps can only apply direct pressure at the fasteners. Conventional span wire clamps can also require a second device that is attached pivotally to the signal which can require connecting to the span wire clamp by a clevis attachment. In an embodiment of the invention, the span wire clamp is provided to reduce opportunities for structural failure, minimize harmful movement that can be susceptible to wind, reduce the number of parts required, and reduce the amount of labor costs for installation.

The clamp 1731 as shown is adaptable to not only single span wire support systems, but also to a two span wire support system. Installation on a two span wire support system can be achieved by the attachment of a cable hanger (not shown) suspended from a second spay wire above, to the clamp's center support flange 1771 by inserting the cable hanger (not shown) through the drop cable aperture 1791 with the appropriate thimble and fasteners. The lower connection device 1784 can be attached to any suitable traffic control device (not shown) preferably by utilizing an embedded stud 1787. The top and bottom saddle flanges 1741 are placed adjacent to the span wire 1730, which fits into grooves (1735 shown in FIG. 95). The saddle flanges 1741 are then connected by placing the u-bolts 1739 into the cradle bases 1742 through the apertures and then fastening the u-bolts 1739 using washers 17121 and stay nuts 17120. The serrations 1774 and the integral reinforcement 1759 are also shown as a point of reference.

Figure 95:
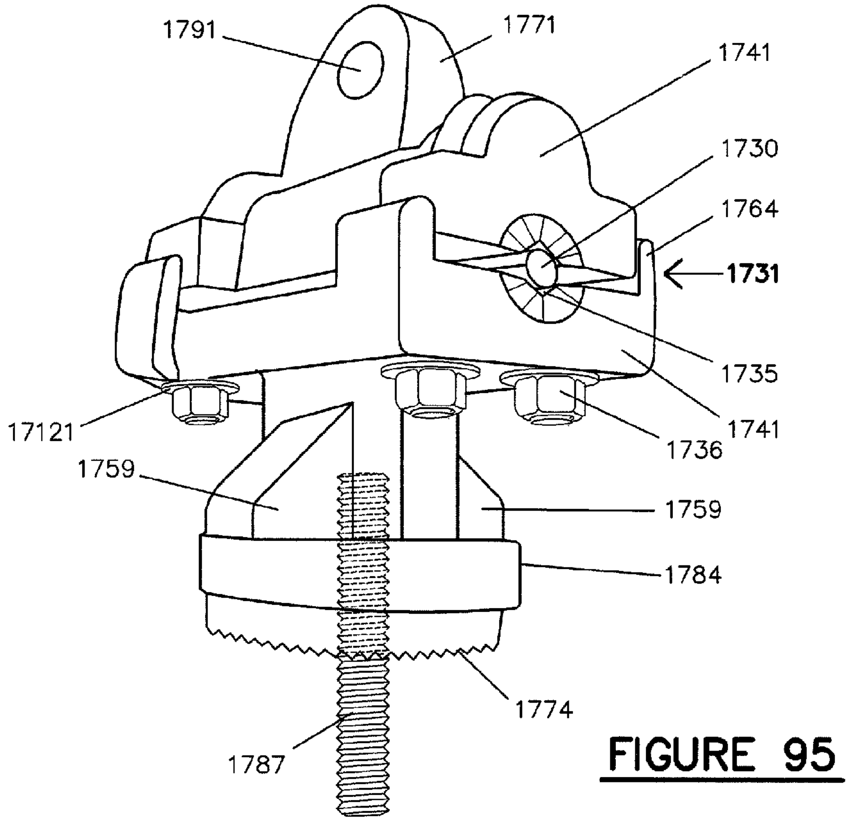
FIG. 95 shows a side view of the clamp/hanger device.

FIG. 95 shows a side angled perspective view of the clamp device 1731 as previously described. The clamp 1731 alignment protrusions 1764 can provide a positioning means for connecting the top and bottom saddle flanges 1741, bringing the cable receiving grooves 1735 into aligned contact with span wire 1730. The top and bottom saddle flanges 1741 and the cable receiving grooves can be fastened together to provide a secure attachment of the device 1784 to the span wire 1730.

Figure 96:
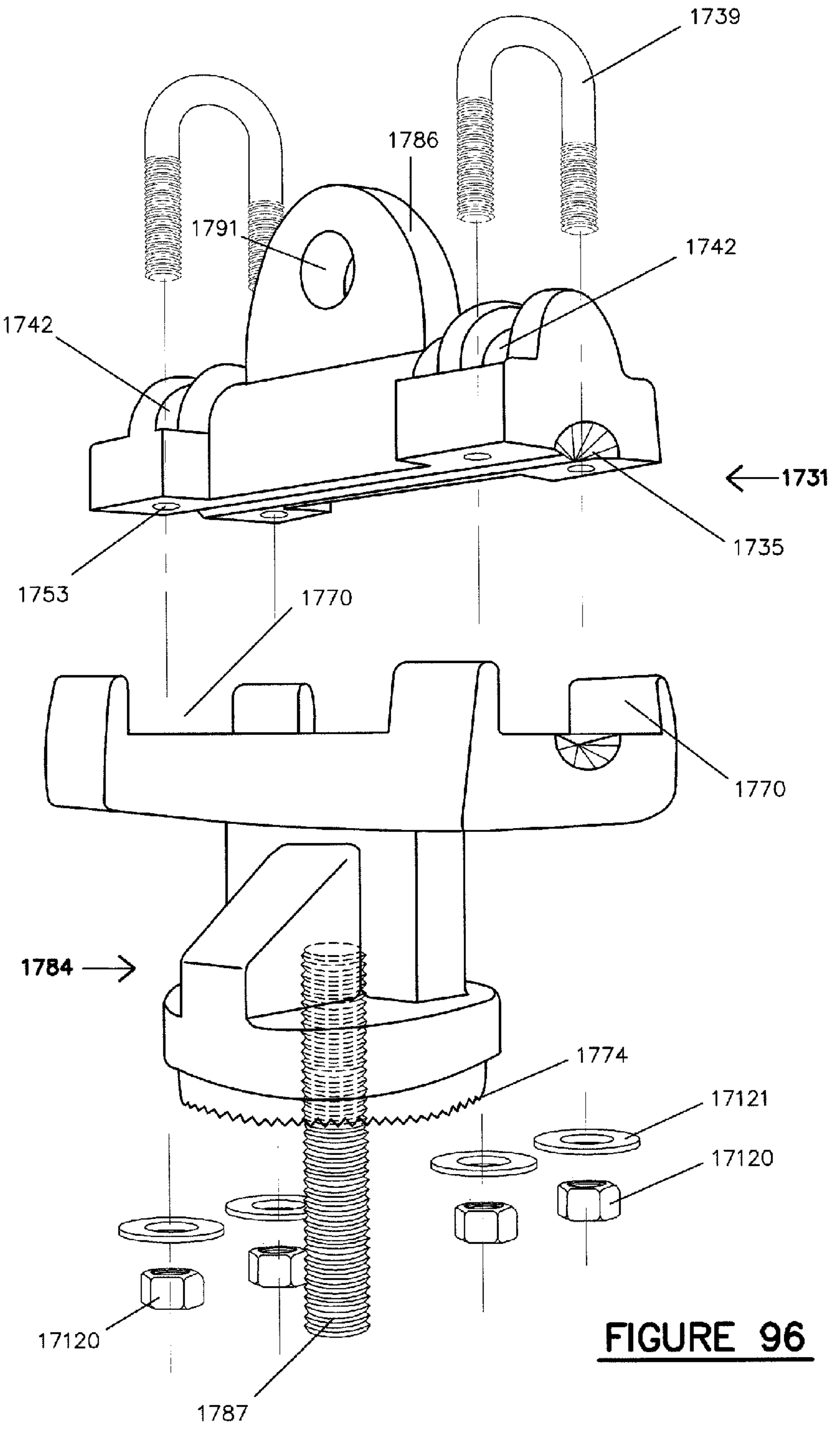
FIG. 96 shows an exploded view of the clamp/hanger device with fasteners.

FIG. 96 shows an exploded view of the previously described clamp 1731 for reference.

EXAMPLE 26

Figure 97:
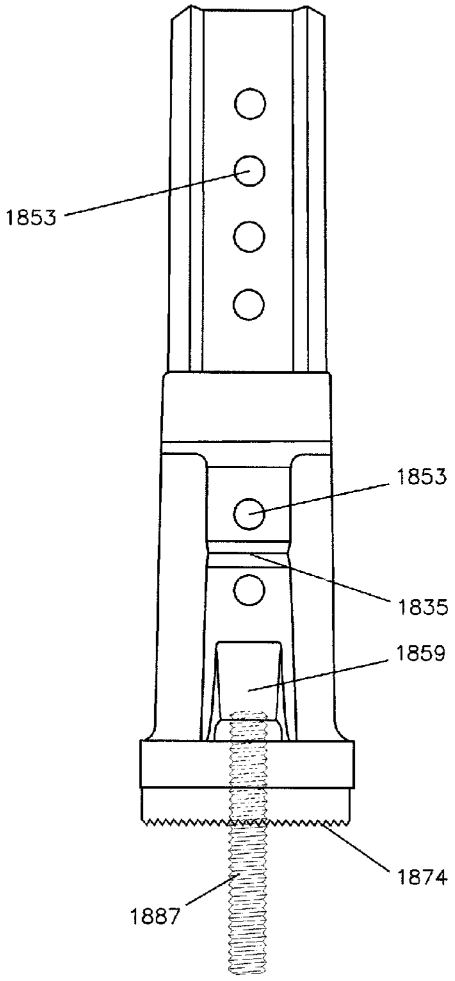
FIG. 97 shows a front view of the hanger system’s lower connection device adaptable to a conventional flat hanger system according to an embodiment of the invention.
Figure 98:
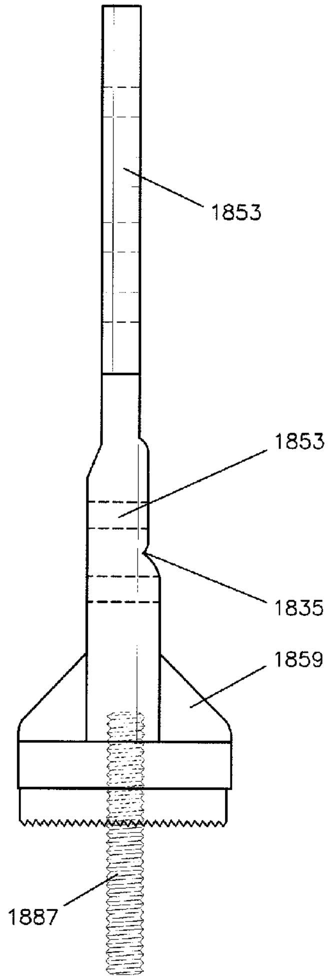
FIG. 98 shows a side view of FIG. 97.

FIG. 97 illustrates a front view according to another embodiment of the hanger system's lower connection device 1884 which is adaptable to a conventional flat, rigid hanger system common to a two span wire support system. Apertures 1853 for attachment to a span wire and an upper hanger extension and cable groove 1835 are shown for reference and accept appropriate fasteners as described and shown in previous embodiments. FIG. 98 shows a side view of the lower device 1884 as described in FIG. 97.

EXAMPLE 27

Figure 99:
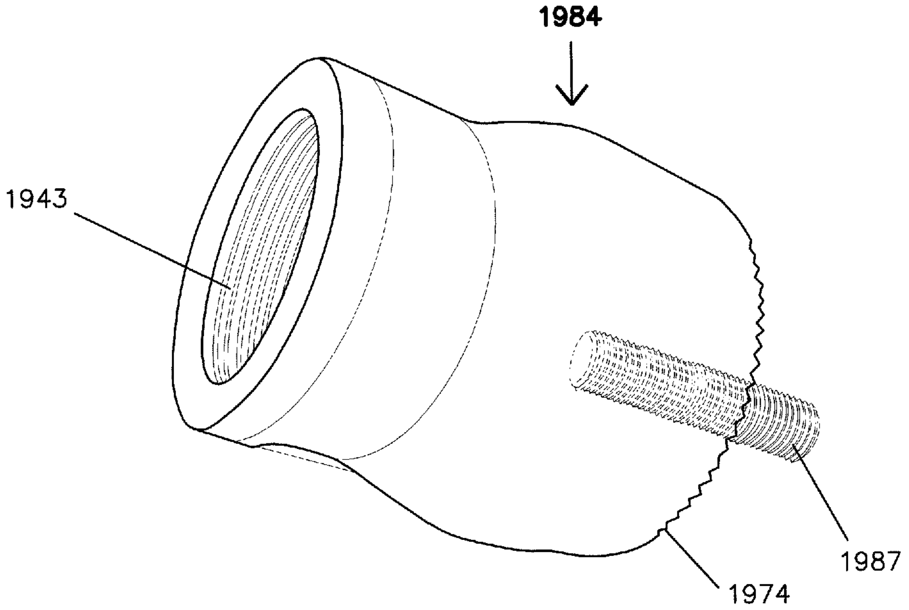
FIG. 99 shows an isometric view of the hanger system’s lower connection device adaptable to a conventional pipe hanger system according to an embodiment of the invention.

FIG. 99 illustrates an isometric view according to another embodiment of the hanger system's lower connection device 1984 which is adaptable to a conventional pipe hanger system, and can be utilized in one and two span wire support systems. The device 1984 has an embedded stud 1987 used to attach a traffic control signal as described in previous embodiments. The lower portion of the device 1984 can be male and is used for connecting a conventional pipe hanger support system.

Figure 100:
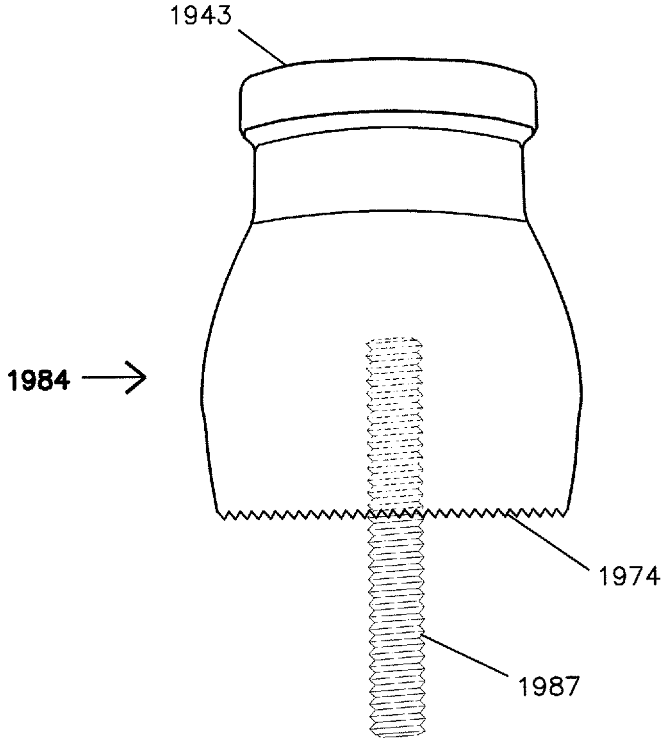
FIG. 100 shows a front view of FIG. 99.

FIG. 100 shows a front view of the previously described embodiment of FIG. 99.

EXAMPLE 28

Figure 101:
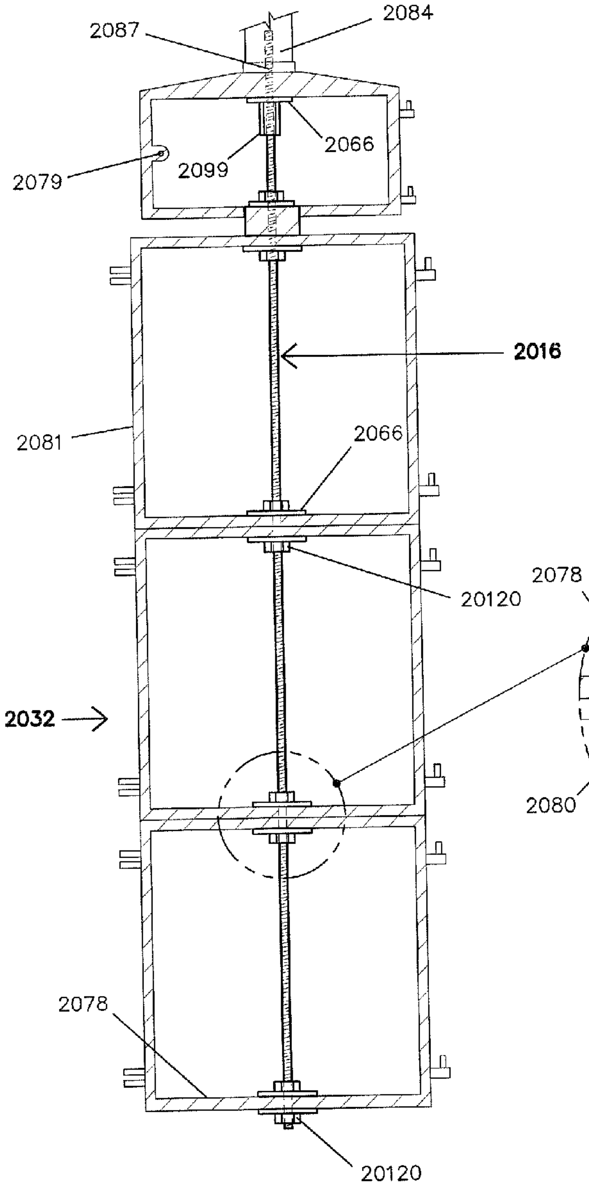
FIG. 101 shows a front view of the central hanger system utilizing a threaded rod adapted to a housing with intermittent connections according to an embodiment of the invention.

FIG. 101 illustrates a front view according to yet another embodiment of the central hanger system 2016 utilizing a threaded rod adapted to a conventional terminal housing 2079 and conventional traffic signal housing 2081 with intermittent connections. This embodiment provides a means to adapt the continuous central load path hanger support system 2016 to existing conventional terminal housings 2079 and conventional traffic signal housings 2081. The lower connection device 2084 is attached to terminal housing 2079 utilizing embedded stud 2087 and support plate 2066 as described in previous similar embodiments. The continuous hanger 2016, as depicted is a threaded rod, and is connected to the embedded stud 2087 utilizing connection coupling 2099. The threaded rod runs continuously through the conventional terminal housing 2079 and conventional traffic signal housing 2081 and provides intermittent connections at each housing juncture and at the bottommost housing floor 2078.

Figure 101A:
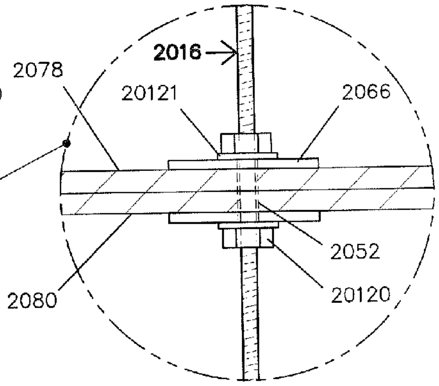
FIG. 101A shows a bubble portion of the flanged connection.

FIG. 101A illustrates an enlarged bubble portion of FIG. 100 showing the connection of the housings by inserting the threaded rod through the housing apertures 2053 and fastening the housing's floor 2078 to an adjacent housing's roof 2080 with support plates 2066, washers 20121 and stay nuts 20120, thereby providing a secure compression-type connection.

Figure 102:
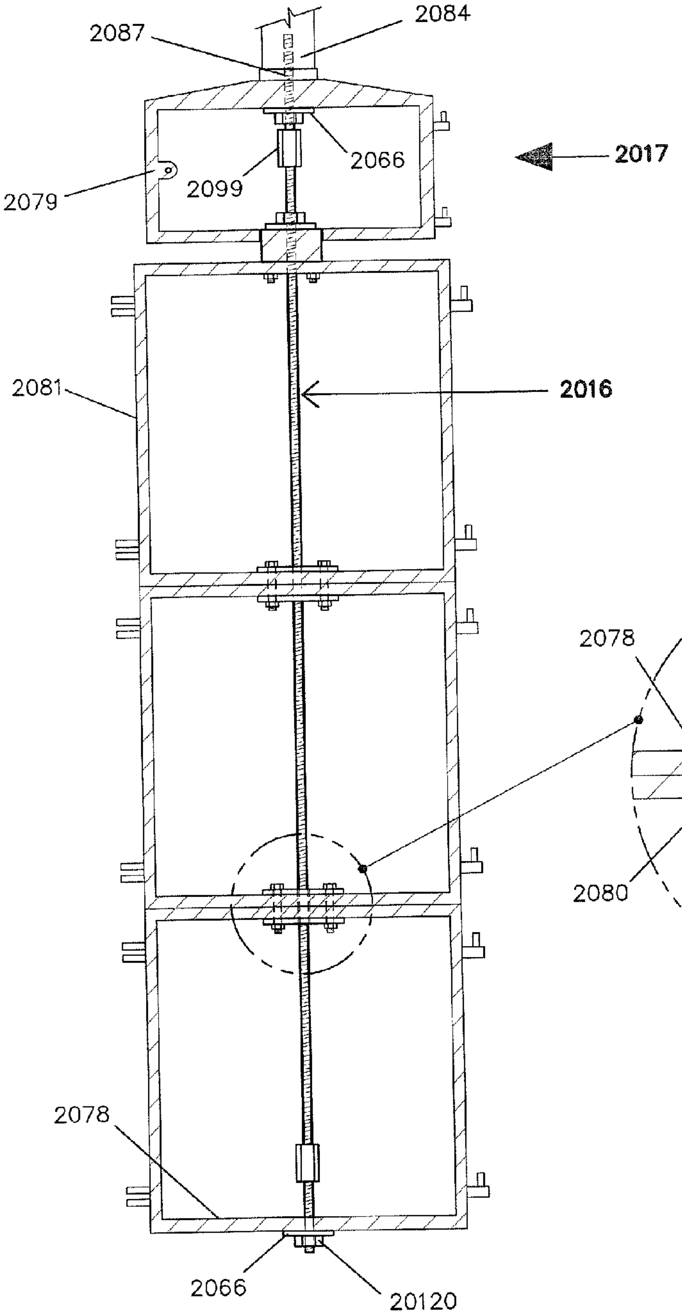
FIG. 102 shows a continuous threaded rod with no intermittent connections according to an embodiment of the invention.

FIG. 102 shows a front view of an embodiment of the invention as just described, however, the threaded rod 2016 is also continuous, and has no intermittent connections.

Figure 102A:
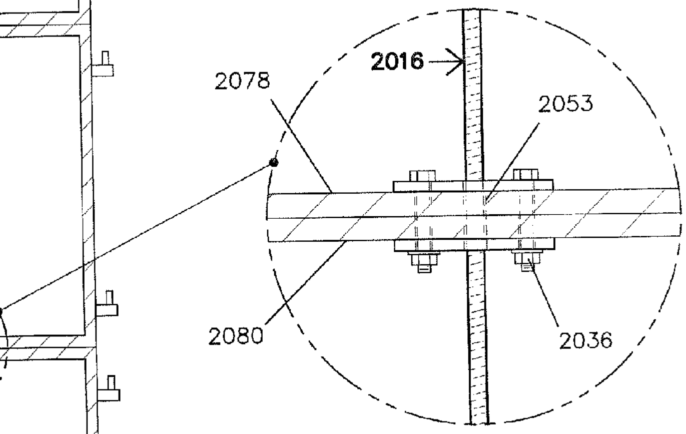
FIG. 102A shows a bubble portion at the tri-stud fasteners.
Figure 103:
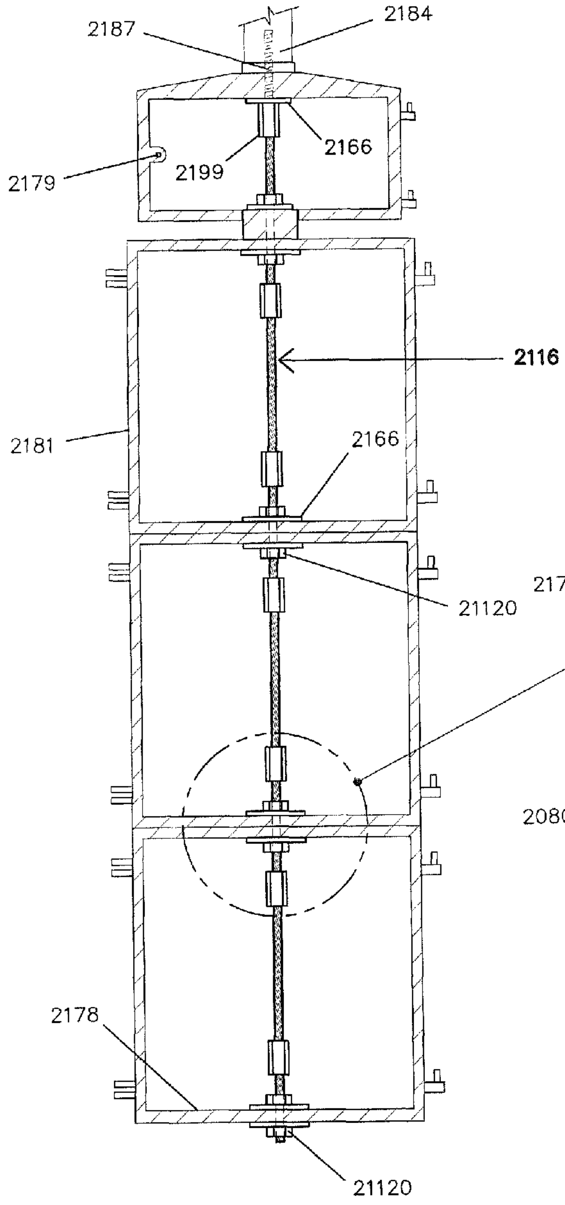
FIG. 103 shows a front view of the central hanger system utilizing a flexible cable adapted to housings with intermittent connections according to an embodiment of the invention.
Figure 103A:
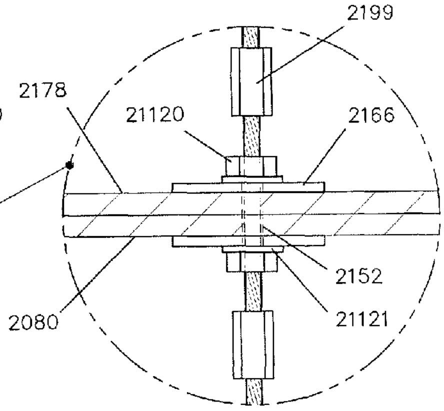
FIG. 103A shows a bubble portion of the flange connection.
Figure 104:
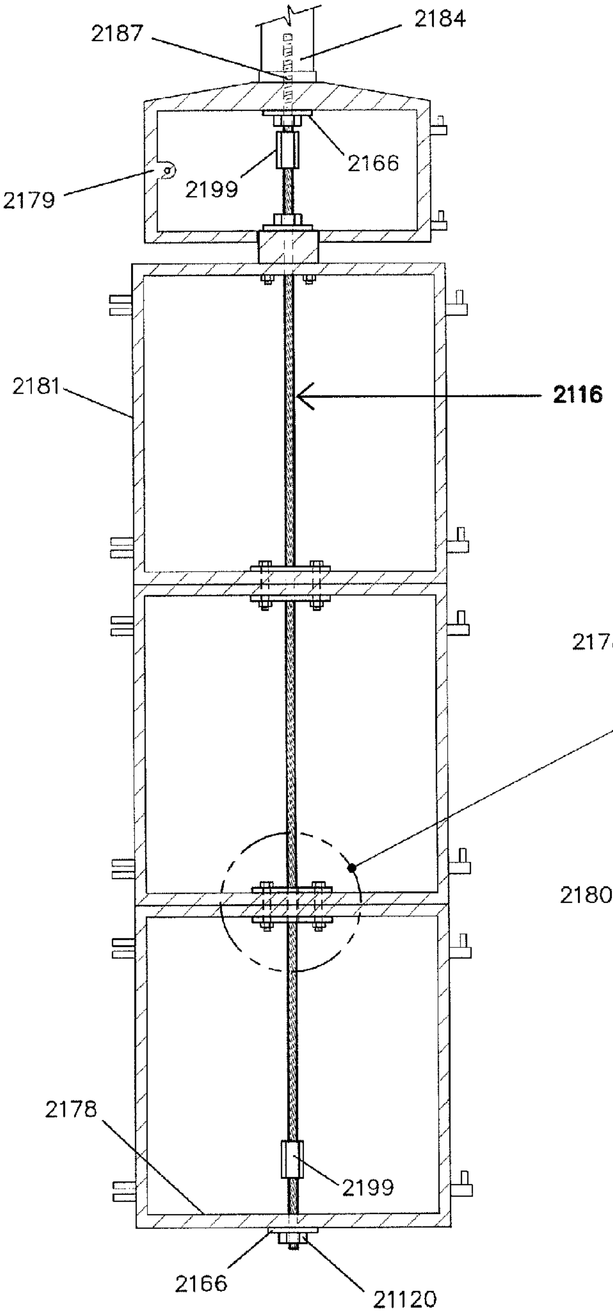
FIG. 104 shows a flexible cable that is continuous with no intermediate connections according to an embodiment of the invention.
Figure 104A:
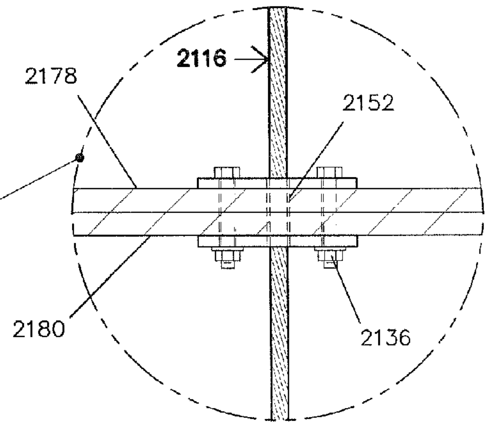
FIG. 104A shows a bubble portion showing the tri-stud connections for reference to the novel hanger and prior art housings.

FIG. 102A shows an enlarged bubble portion wherein the conventional housing floor 2078 and the conventional housing roof 2080 are connected together with the conventional fasteners 2036 placed through an aperture 2053. The treaded rod runs continuously through the conventional housings to the bottom connections as previously described.

FIG. 103, FIG. 103A, FIG. 104 and FIG. 104A are front views according to an additional embodiment of the continuous central load path hanger system utilizing a flexible steel cable/hanger 2116 (rather than a threaded rod) adapted to conventional housings as just described with respect to FIG. 101, FIG. 101A, FIG. 102 and FIG. 102A.

EXAMPLE 29

Figure 105:
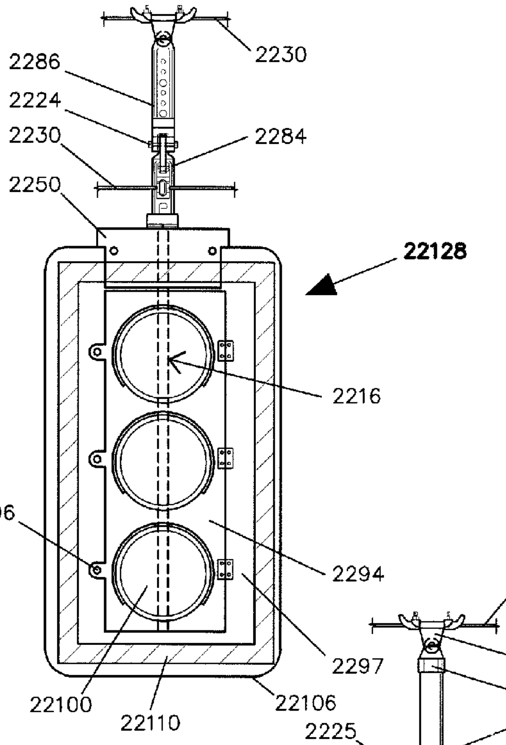
FIG. 105 shows a front view of an embodiment of the invention utilizing a pivotal hanger to support the invention while attached to two span wires.

FIG. 105 shows a front view according to a still further embodiment of the invention utilizing a pivotal hanger support device as previously described, attached to two span wires 2230 above the traffic signal. The lower connection device 2284 is connected to a span wire 2230 as previously described. The lower connection device 2284 is also connected to the single unit signal and terminal housing 22128 utilizing the continuous load path hanger 2216 (in phantom). The traffic control device's electrical terminal cover 2250, door 2294, door hinges 2297, door latches 2296, visors 2234, LED modules 22100 and integral backplate 22106 with reflective tape 22110 are all shown for reference.

The installation of the present invention as shown depicts the central hanger 2216 top portion connected to the upper span wire 2230 and the hanger's lower portion connected to the lower span wire, also 2230. In some applications, subject to pole strength, it may be preferable in having the traffic signal secured between the two span wires. The installation of the hanger to the span wires as described distributes the load evenly and also reduces "galloping" common to all span wire installations. Conventional prior art systems commonly would break or pull apart due to multiple connections between the span wires that were only designed to resist gravitational loading and not harmful dynamic wind forces that create shock loads during vertical movements such as galloping. The central load path hanger 2216 overcomes the prior art failures by providing a means to eliminate or greatly reduce the dynamic loads by creating an equal load distribution system, throughout the traffic control device signal.

EXAMPLE 30

Figure 106:
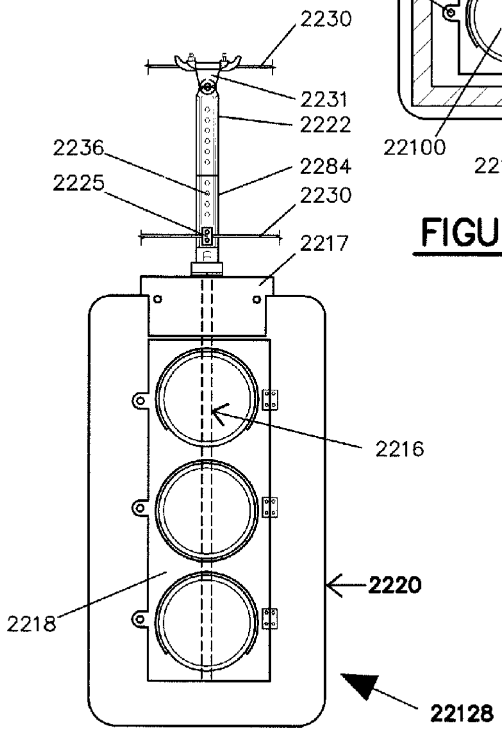
FIG. 106 shows a front view of an embodiment of the invention utilizing a rigid flat hanger.

FIG. 106 is a front view of an embodiment of the invention 2215 utilizing the conventional common rigid flat hanger system as described and shown in FIG. 97 and FIG. 98.

EXAMPLE 31

Figure 107:
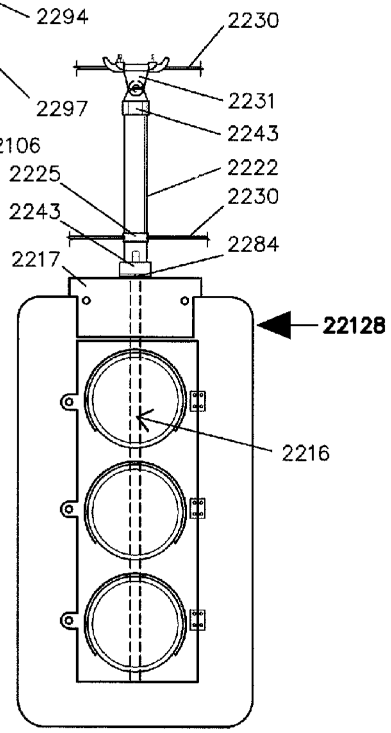
FIG. 107 shows a front view of an embodiment of the invention utilizing a rigid pipe hanger.

FIG. 107 shows a front view of an embodiment of the invention 2215 wherein a common rigid pipe hanger system is used along with the lower connecting device 2284 as described and shown in FIG. 99 and FIG. 100. The pipe hanger 2222, after determining the proper length, is male threaded at each end and then mated to and between female threaded hubs 2243 which are connected to the span wires 2230 by the saddle clamp 2231 and tether clamp 2225 with the appropriate fasteners. The lower device 2284 is connected to the central hanger 2216 and housing 22128 as previously described.

EXAMPLE 32

Figure 108:
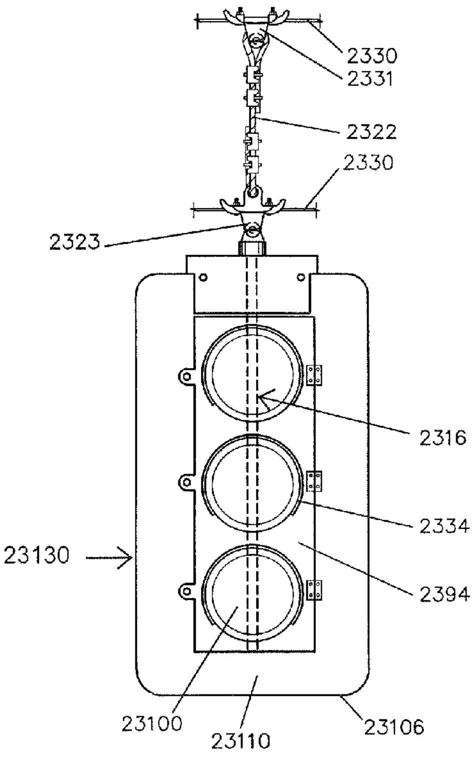
FIG. 108 shows a front view of an embodiment of the invention utilizing a conventional cable hanger system to support the invention while attached to two span wires above the traffic signal.

FIG. 108 shows a front view according to another embodiment of the invention wherein a conventional cable drop hanger system 2322 is used to support the continuous central load path hanger 2316, the single unit signal housing and backplate 23130.

EXAMPLE 33

Figure 109:
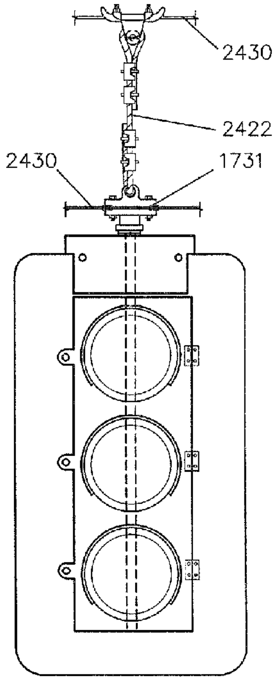
FIG. 109 shows a front view of an embodiment of the invention utilizing a conventional hanger connected to the novel span wire clamp as shown in FIG. 94 to support the invention while attached to two span wires above the traffic signal.

FIG. 109 shows a front view according to yet another embodiment wherein a conventional cable drop hanger 2422 is connected to the span wire clamp 1731 as described and shown in FIG. 94 to support the invention while attached to two span wires 2430 above the traffic signal.

EXAMPLE 34

Figure 110:
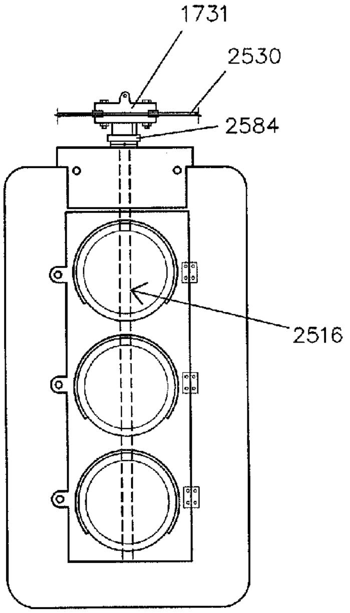
FIG. 110 shows a front view of an embodiment of the invention utilizing the span wire clamp as shown in FIG. 94 to support the invention while attached to a single span wire above the traffic signal.

FIG. 110 shows a front view according to still another embodiment utilizing the span wire clamp 1731 as described in FIG. 94 to support the invention 2515 while attached to a single span wire above the traffic signal.

EXAMPLE 35

Figure 111:
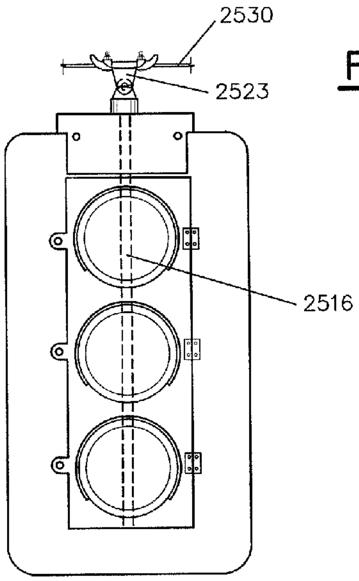
FIG. 111 shows a front view of an embodiment of the invention utilizing a conventional span wire clamp.

FIG. 111 shows a front view of the invention utilizing a conventional span wire clamp assembly 2523 attached to a single span wire 2530.

EXAMPLE 36

Figure 112:
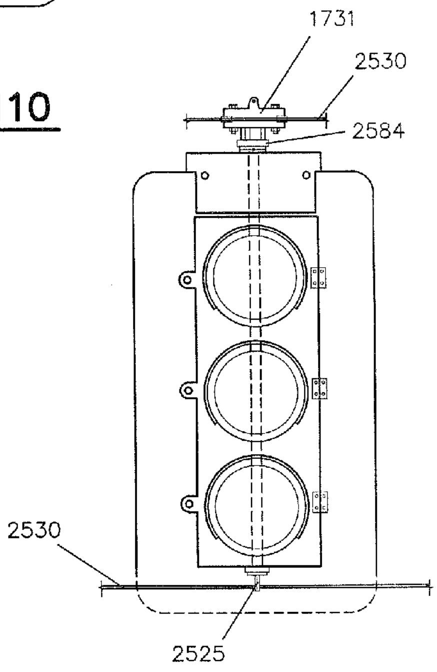

FIG. 112 shows a front view utilizing the invention's span wire clamp 1731 supporting the traffic signal, and a second tether wire 2530 attached below the traffic signal at tether clamp assembly 2525.

EXAMPLE 37

FIG. 113-FIG. 118 illustrate a further embodiment of the single unit traffic signal comprising a combined signal and terminal housing 26128 with an integral backplate. This embodiment can utilize the central continuous hanger system as previously described and can sometimes be specific to the hanger systems previously described and shown in FIG. 49-FIG. 53. This embodiment of the invention can also be suitable to the external hanger support system as previously described and shown in FIG. 54, FIG. 55, FIG. 56, FIG. 59, and FIG. 60.

FIG. 113 shows an isometric view of the traffic signal housing 2618 and terminal housing 2617 portion that is adaptable to a central continuous load path hanger support system. The side walls 2682 of the housings 2617/2618 portion are connectable to the cover 2650 (of FIG. 114) and are also adaptable to an external peripheral continuous load path hanger system (as has been previously described). In an embodiment of the invention, a preferred hanger system is the internal central load path system using apertures 2653 extending through the approximate center of the single housing unit such that a continuous hanger system can be inserted within for support. The hanger mating serrations 2674 can provide the signal with fixed rotational movement by securing the span wire clamp, the lower connection device or any other component to the serrations 2674. The floor 2678 and roof 2680 of the single unit signal and terminal housing 2617/2618 portion are shown for reference. A second aperture 2652 can provide access for the main electric conductors.

FIG. 114 illustrates an isometric view of the front cover 2650. The front cover 2650 can be comprise an integral backplate 26106 (shown from back side and in FIG. 115), a door receiving frame 2670 to provide flush mounting of the door and gasketing (not shown) as previously described. The floor 2678, roof 2680, and walls 2682 of the front cover 2650 are appropriately sized such that the front cover 2650 can be placed over the floor 2678, roof 2680 and walls 2682 of the single unit signal and terminal housings portion 2617/2618 backplate (shown in FIG. 113). The front cover 2650 can be mechanically secured to signal and terminal housing 2617/2618 to result in the single unit signal and terminal housing with backplate 26128 by aligning apertures 2653 and using fasteners 2636 as shown in FIG. 115 and FIG. 118.

FIG. 115 shows a front view of the single unit signal and terminal housing with backplate 26128 (without the door for clarity) wherein the signal and terminal housing 2617/2618, as described previously in regards to FIG. 113, is mated and connected with the front cover 2650 to form a single unit, as described previously in regards to FIG. 114. The support members 2646, roof 2680 and floor 2678 of the single unit signal and terminal housing with backplate 26128 are shown. Some embodiments of the invention can provide access for the central hanger in apertures 2653 aligned through the supports 2646, roof 2680 and floor 2678. Electrical access is provided through specified weatherproof apertures 2652 through which electrical wires can be run. The fasteners 2636 can also be used to connect an external hanger system as previously described with respect to FIG. 54-FIG. 60.

FIG. 116 illustrates a cross sectional view taken along cross sectional plane 116 of FIG. 113. The transverse support beam 2646 is adjacent to the housing walls 2682 and can be secured by any appropriate means. For example, the traverse support beam 2646 can be secured during the forming process or the traverse support 2646 can be attached with the proper adhesives or weld applications. An aligned aperture 2653 is contained within the traverse support beam 2646 that can provide, in some embodiments, access for the central hanger system. Electrical wiring access is provided by aperture 2652.

FIG. 117 shows a cross sectional view taken along cross sectional plane 117 of FIG. 114. The single unit signal and terminal housing portion 2617/2618 and the front cover 2650 as shown can be attached to one another with fasteners 2636. The inside face of the support flange 2666 can be placed over the outside face of the housing's rear portion wall 2682. For reference, the housing's backplate 26106 and door receiving recess 2670 and aperture 26101 for the LED modules are also shown.

FIG. 118 illustrates another cross sectional view taken along cross sectional plane 118 of FIG. 115 showing the housing 26128 mated to the front cover 2650 using fasteners 2636 as previously described.

EXAMPLE 38

Figure 119:
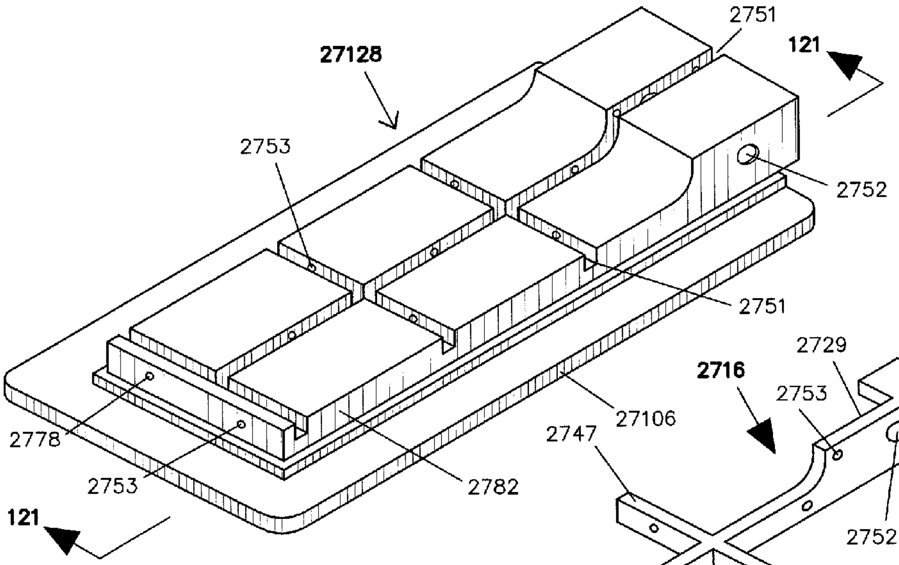
Figure 120:
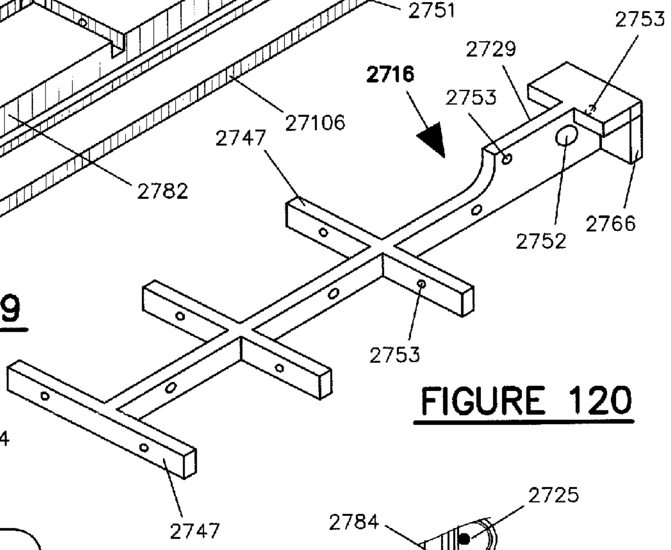
Figure 121:
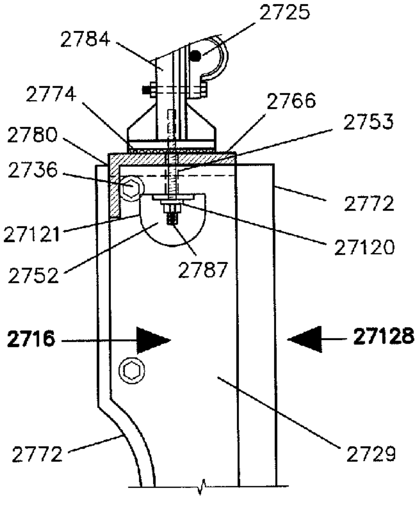

Additional embodiments as shown in FIGS. 119-121 utilize lateral supports integral to the hanger as an alternative to the lateral support beams integral to the housing, such as previously described in FIGS. 41, 46, 57, 59, 61, 63, 64, 72, 83, 84, 92, 93, 115, 116, and 118.

Turning now to FIG. 119 representing an isometric view of an embodiment of the present invention's single unit signal and terminal novel housing 27128 comprising channeled attachment flanges 2751 utilized for support and connection to the central load path hanger system 2716 shown and described in FIG. 120. The channels 2751 are preferably located with one vertical central axis and multiple 90-degree axis appendages providing lateral support to resist torsional forces that occur during high wind events such as hurricanes. Access for attachments is provided utilizing apertures 2753. For reference the housing 27128, floor 2778, wall 2782, and backplate 2706 are shown along with electrical conductor access provided by aperture 2752 and as previously described in earlier embodiments.

Figure 122:
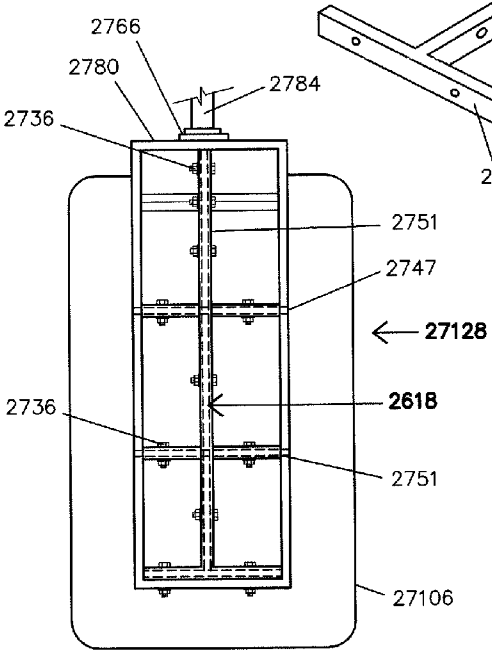

FIG. 120 is also an isometric view of the present invention's novel continuous load path hanger 2716 that is adaptable to the housing 27128 in FIG. 119 and as shown installed in FIG. 122. The hanger's vertical central support flange 2729 upper portion is adaptable and connectable to span wire attachment devices as previously described and shown in FIGS. 105-112, and any other suitable type span wire attachment device as appropriate. The continuous hanger's vertical central support flange 2729 has integral lateral supports 2747 extending perpendicular to the longitudinal dimension of vertical central support flange 2729 that provide lateral reinforcement to the housing in resisting torsional forces created by wind gust. Later described attachments utilize apertures 2753.

FIG. 121 depicts a side proportional view of the continuous load path hanger 2716. For points of reference, the housing's roof 2780 and wall/side beyond 2772 are shown with span wire connection device 2784 mechanically connected by hanger 2716 upper flanged portion 2729 utilizing the embedded stud 2782 of span wire connection device 2784 inserted through hanger support flange 2766 fastening access 2752 utilizing aperture 2753, with final securement accomplished by tightening stay nut 27120 over washer 27121 as appropriate. Rotational adjustments and securements are provided by mating serrations 2774 integral to connection device 2784 and integral to hanger support flange 2766.

FIG. 122 is a front view of the novel continuous central load path hanger 2716 and single unit signal and terminal housing 27128 with door/cover omitted for clarity. The attachment of hanger 2716 and housing 27128 is begun by placing the housing's channeled attachment flanges 2751 over hanger vertical central support flange 2729 and lateral supports 2747. Additional support is provided by the placement of the bottom surface of flange 2766 against the exterior surface of housing roof 2780. Hanger 2716 with previously installed (as described in FIG. 121) span wire connection device is secured to the housing 27128 utilizing appropriate fasteners 2736.

EXAMPLE 39

Figure 123:
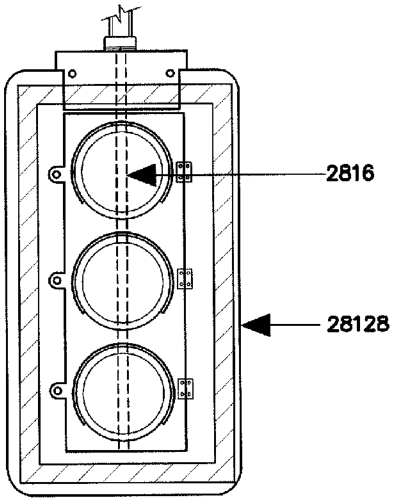

FIG. 123 is a frontal view illustrating yet another embodiment of the present invention continuous load path hanger and housing. The traffic control device comprises 1) the continuous central load path hanger system 2816 (shown in phantom) and 2) the single unit signal and terminal housing and backplate 28128.

FIG. 124 is a front sectional drawing illustrating the invention's continuous central load path hanger adapted to the combined terminal and signal housings 2817 and 2818, respectively. The installation begins utilizing the continuous hanger mid-portion 2856 that comprises an embedded stud 2887 at each end with appropriate thread length protrusions. The mid-portion 2856 of hanger 2816 may be of any suitable type, size, or material such as cast aluminum, extruded metal, threaded rod, or even flexible cable as desired and as previously described above with regard to other embodiments. The hanger 2816 is inserted through the housing roof 2880 and transverse supports 2846 utilizing apertures 2853. Prior to inserting hanger 2876 through the housing floor 2878, stay nut 2837 is threaded on until it meets the tubular portion 2856. Washer 28121 at this time is placed adjacent to nut 2837. The securement plate 2895 is placed into the housing's recessed/receiving area 2870 after which the hanger mid-portion 2856 embedded stud 2887 is placed over securement plate 2895 in housing floor recess 2870, then through apertures in plate 2895 and housing floor recess 2870.

The installation continues by inserting the metal connection flange 2877 with integral serrations 2874 and protrusions 2864 into the housing's roof 2880 mating receiving apertures utilizing a proper sealant such as silicone caulk. Sealant is again applied at the flange's serrations 2874. A suitable type of span wire lower connection device 2884 is attached by inserting the embedded stud 2887 into and through the previously installed flange 2877, housing roof 2880 and secondary securement plate 2895. After proper rotational alignment is determined, rotational movement is secured by mating serrations of lower connection device 2884 to serrations of flange 2877, then fastened as appropriate utilizing washer 28121 adjacent to plate 2895 and to coupler 28118, which is then tightened to create compression type connection of the hanger 2816 upper portion to both the span wire lower connection device 2884 and housing 2817, 2818. Coupler 28118 is of an appropriate length so that the embedded stud 2887 of the connection device 2884 is totally secured at approximately half of the coupler's 28118 overall length.

The hanger's upper portion is now ready for receiving of the hanger mid portion 2856 by threading the tubular mid-portion's embedded stud 2887 into the previously installed coupler 28118 and tightening as appropriate using the wrench receiving slot 2845. The installation of the central load path hanger 2816 is completed by threading the stay nut 2837 downward creating a snug type pressure over washer 28121 and previously installed securement plate 2895. The snugging as described can be used to adjust any "plastic-creeping" if in some instances it is required. The support shoe 2885 is adjacent to the housings floor 2878 and wall 2882 and secured tightening the stay nut 28120 over washer 28121 as appropriate creating a secure-compression type means of attachment. Support shoe 2885 provides both vertical and lateral reinforcement utilizing the housing's offset as a protrusion surface captured by the shoe 2885 and by mechanically connecting to plate 2895 that is also captured by the interior surface of housing floor recess 2870. The integral support channel attachment flange 2860 in some embodiments is molded in as part of the manufacturing process to receive lateral transverse supports 2846.

FIG. 125 is an isometric view of the housing 28128 showing housing floor area 2878, which in the present embodiment is offset creating an exterior protrusion and interior housing floor recess 2870 utilized with the central hanger system to provide additional lateral support. External protrusions of support channel attachment flanges 2860 are shown as previously described in FIG. 124.

EXAMPLE 40

There are variable steps in the installation of traffic control signals that are span wire supported. Final determination is generally decided by the contractor or his employs at a span wire intersection. After the span wire or wires (one or more) are installed with appropriate tensions and sag as required, the traffic signal's location is determined and identified appropriate to the travel direction of the vehicles below.

The installation process begins by installing a saddle-type cable clamp to the load bearing span wire which is designed to accept a hanger device below. After the saddle clamp is secured to the span wire in its appropriate location, it is now ready for connection to a hanger device. Although other embodiments were described previously, the following installation procedure is directed to a dual wire span wire system also as previously described.

The next operation is a mechanical connection of the saddle clamp and the hanger extension using a clevis and cotter pins. After final determination of the hanger extension length, it is then mechanically attached to the upper connection device using two sets of appropriate fasteners spaced a minimum of 3 inches apart. At this stage, the continuous hangers' lower connection device portion is secured to the second, lower span wire, also known as the "messenger cable", by utilizing an appropriate tether clamp system previously as described in and shown in FIG. 16.

After the lower connection device is attached to the lower span wire, the continuous hanger support system is completed by pivotally connecting the prior described upper connection device to the hanger's lower connection device and inserting a pivot pin (generally parallel to the span wires) through the upper and lower devices' apertures, and then securing using a cotter pin or pins as appropriate. A final check that all mechanical connections are appropriately tightened should be performed before installation of the electrical component housings.

The installation of the housing begins with the upper terminal housing. First, the housing is placed (minus the cover) over the hanger's square tubular portion such that the housing's open slot is pushed toward the hanger and to the hanger's top support plate. It is then secured with the appropriate fasteners which can be placed in through the apertures provided in the housing and hanger. It can be beneficial to attach the terminal housing to the lower connection device of the hanger system prior to the hanger's installation. The electrical wiring process begins with bringing the main conductors into and out of the electrical terminal housing after the appropriate connections are completed to the housing's prior-installed terminal blocks.

The hanger system can now receive the traffic signal housing. The housing can be installed without the doors at this stage. The signal housings' bottom portion is positioned over the hanger's shoe and is pushed forward while temporarily supported by the hanger's shoe until the housings vertical attachment channel's cradle base fits tightly to the hanger's round tubular portion. The appropriate clamping fasteners are inserted through the housing's channel type flanges and tightened enough to secure the housing, but loose enough to properly orient the signal to the travel direction below. After the required alignment is established, the signal housing can then be secured to the hanger by tightening the clamping type fasteners as appropriate.

The wiring from the upper terminal housing's terminal blocks is routed through the upper housing's arcuate slots into the traffic signal housing's receiving apertures to the traffic signal housing's terminal blocks as appropriate. The installation is completed by attaching the signal doors over the housing's boss-pins, then installing the LED modules and making final electrical connections. The doors are then closed and secured with provided thumb screws. The installation of the signal's visors using appropriate fasteners can complete the traffic control device.

Different connections of the load bearing attachment of the present invention can be included. This method of operation is just one example of the many possible arrangements that are acceptable.

The various embodiments described herein capture all the benefits of subject invention, which provides a support system that eliminates deficiencies of the prior art by changing the terminal housing's purpose from requiring structural loading of traffic signals to merely the purpose of providing a weather-proof housing for wiring of traffic signals.

The preceding descriptions provide a method and an improved traffic control device comprising a continuous load path hanger support system and traffic signal housings adaptable to the support system of the subject invention. Also revealed is a method allowing a change in the required fabrication materials to cost effective plastics from more costly cast aluminum, which provides an enormous reduction of manufacturing cost utilizing a means that incorporates 3 or more traffic control signal components never before contemplated or possible until the present invention.

Also, the various features and aspects disclosed herein may be combined with one another. All such variations and combinations are contemplated within the scope of the present disclosure. Other modifications, variations, and alternatives are also possible. Any reference in this specification to "one embodiment," "an embodiment," "example embodiment," et cetera, means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to utilize or combine such features, structures, or characteristics in connection with other ones of the embodiments.

What is claimed is:

1. A traffic signal support apparatus for a traffic control device, wherein the traffic control device has a housing containing electrical connections and is held from a mounting structure, said traffic signal support apparatus comprising:

a continuous load path hanger; and signal connection hardware that connects said continuous load path hanger to a traffic signal housing;

wherein said continuous load path hanger is not a span wire or a housing containing electrical connections and includes a vertical component that comprises at least one of a solid rod portion, a hollow rod portion, or a cable; and wherein a majority of said continuous load path hanger in operation is deployed closer to a vertical central axis of a traffic control device than are the external edges of the traffic signal housing or a backplate of the traffic signal housing, the traffic signal housing is fixedly secured in both a vertical and lateral direction with respect to the continuous load path hanger, and the continuous load path hanger receives the load of at least most of the gravitational and wind-induced stresses of the traffic signal housing and transmits those stresses past the housing containing the electrical connections and to the mounting structure.

2. A traffic control signal device comprising a traffic signal support apparatus according to claim 1 and comprising a single unit signal housing having an integral backplate.

3. A traffic signal support apparatus according to claim 1, wherein said continuous load path hanger comprises a lower-most support portion wherein, when connected to a traffic signal housing and in operation with the traffic signal vertically mounted, said lower-most support portion is beneath a roof of the traffic signal housing.

4. A traffic signal support apparatus according to claim 3, wherein said lower-most support portion is beneath a floor of the traffic signal housing.

5. A traffic signal support apparatus according to claim 1, wherein the continuous load path hanger comprises an upper attachment flange, a lower attachment flange, and a central load-bearing member extending between said upper attachment flange and said lower attachment flange.

6. A traffic signal support apparatus according to claim 3, wherein said continuous load path hanger is configured to extend substantially centrally through a terminal housing or a traffic signal housing.

7. A traffic signal support apparatus according to claim 6, wherein said lower-most support portion comprises a signal housing support shoe.

8. A traffic control signal device comprising a traffic signal support apparatus according to claim 7 and comprising a single unit signal housing having an integral backplate.

9. A traffic control signal device according to claim 2, further comprising a rear portion and a front portion, said rear portion comprising a plurality of hanger attachment apertures; and said front portion comprising a door and at least one light module aperture in said door.

10. A traffic control signal device according to claim 9, wherein said rear portion comprises a hanger receiving tube.

11. A traffic control signal device according to claim 8, wherein said single unit signal housing is a single unit signal and terminal housing that is manufactured from a thermoplastic, and further comprises a front portion and a rear portion, and wherein said continuous load path hanger extends internal to said rear portion.

12. A traffic control signal device comprising a traffic signal support apparatus according to claim 4 and comprising a single unit signal housing having an integral backplate.

13. A traffic control signal device comprising a traffic signal support apparatus according to claim 5 and comprising a single unit signal housing having an integral backplate.

14. A traffic control signal device comprising a traffic signal support apparatus according to claim 6 and comprising a single unit signal housing having an integral backplate.

15. A traffic control signal device according to claim 9, further comprising at least two signal light modules.

16. A traffic control signal device according to claim 2, wherein said single unit signal housing is a single unit signal and terminal housing.

17. A traffic control signal device according to claim 16, wherein said device is adapted to be held from a span wire mounting structure, beneath a span wire in a vertical orientation such that a red light and a green light of the traffic control device are located one above the other.

18. A traffic control device according to claim 17, wherein the span wire mounting structure is a dual span wire mounting structure and wherein said device is beneath both span wires.

19. A traffic control signal device according to claim 16, wherein said device is adapted to be held from a horizontal mast arm mounting structure.

20. A traffic control signal device according to claim 2, wherein said single unit signal housing having an integral backplate is manufactured from a thermoplastic.

21. A traffic control signal device according to claim 2, wherein said single unit signal housing having an integral backplate is manufactured from a formed metal.

22. A traffic control signal device according to claim 21, wherein the formed metal comprises aluminum.

23. A traffic control signal device according to claim 14, where said single unit signal housing is a single unit signal and terminal housing.

24. A traffic control signal device according to claim 14, wherein said single unit signal housing is a single unit signal and terminal housing that is manufactured from a thermoplastic, and further comprises a front portion and a rear portion, and wherein said continuous load path hanger extends internal to said rear portion.

25. A traffic control signal device according to claim 23, wherein said single unit signal housing having an integral backplate is manufactured from a formed metal.

26. A traffic control signal device according to claim 25, wherein the formed metal comprises aluminum.

27. A traffic control signal device according to claim 23, wherein said single unit signal housing having an integral backplate is manufactured from a thermoplastic.

28. A traffic control signal device according to claim 11, wherein the thermoplastic is an acrylic.

29. A traffic control signal device according to claim 20, wherein the thermoplastic is an acrylic.

30. A traffic control signal device according to claim 24, wherein the thermoplastic is an acrylic.

* * * * *